(12) United States Patent
Miyano

(10) Patent No.: US 9,582,533 B2
(45) Date of Patent: Feb. 28, 2017

(54) CONTENT REPRODUCTION DEVICE, CONTROL METHOD FOR CONTENT REPRODUCTION DEVICE, CONTROL PROGRAM, AND RECORDING MEDIUM

(75) Inventor: Yasuhiro Miyano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 804 days.

(21) Appl. No.: 13/699,233

(22) PCT Filed: May 27, 2011

(86) PCT No.: PCT/JP2011/062237
§ 371 (c)(1),
(2), (4) Date: Nov. 20, 2012

(87) PCT Pub. No.: WO2011/155350
PCT Pub. Date: Dec. 15, 2011

(65) Prior Publication Data
US 2013/0151555 A1   Jun. 13, 2013

(30) Foreign Application Priority Data

Jun. 8, 2010 (JP) ................................. 2010-131163
Jun. 8, 2010 (JP) ................................. 2010-131165
Jun. 8, 2010 (JP) ................................. 2010-131166

(51) Int. Cl.
*G06F 17/30* (2006.01)
*G09B 5/02* (2006.01)
(Continued)

(52) U.S. Cl.
CPC .. *G06F 17/30424* (2013.01); *G06F 17/30817* (2013.01); *G09B 5/00* (2013.01);
(Continued)

(58) Field of Classification Search
CPC .................................................. G06F 17/30389
(Continued)

(56) References Cited

U.S. PATENT DOCUMENTS 6,266,683 B1 * 7/2001 Yehuda ............. G06F 17/30011
707/E17.005
6,366,699 B1    4/2002 Kuwano et al.
(Continued)

FOREIGN PATENT DOCUMENTS

CN   101114285 A   1/2008
CN   101410774 A   4/2009
(Continued)

OTHER PUBLICATIONS

International Search Report for PCT/JP2011/062237 dated Jun. 21, 2011.

*Primary Examiner* — Baoquoc N To
(74) *Attorney, Agent, or Firm* — Birch, Stewart, Kolasch & Birch, LLP

(57) ABSTRACT

An electronic learning device (1) disclosed herein includes: a search process section (21) for searching dictionary data (31) by a keyword inputted during reproduction of moving image data (30) and displaying the result of the search; and a historical data generating section (22) for generating historical data (32) including, in association with one another, (i) a content reproduction time point at which the search process section (21) ran a search, (ii) the keyword that the search process section (21) used in the search, and (iii) a dictionary used for the search based on the keyword.

23 Claims, 27 Drawing Sheets

(51) Int. Cl.
  *G11B 27/10* (2006.01)
  *H04N 5/76* (2006.01)
  *H04N 5/783* (2006.01)
  *G09B 5/00* (2006.01)
  *H04N 9/82* (2006.01)

(52) U.S. Cl.
  CPC .............. *G09B 5/02* (2013.01); *G11B 27/105* (2013.01); *H04N 5/76* (2013.01); *H04N 5/783* (2013.01); *H04N 9/8205* (2013.01)

(58) Field of Classification Search
  USPC ........................................ 707/705, 706, 770
  See application file for complete search history.

(56) References Cited

U.S. PATENT DOCUMENTS

| | | | |
|---|---|---|---|
| 7,574,381 B1* | 8/2009 | Lin-Hendel | G06F 3/04815 705/26.9 |
| 7,680,850 B2* | 3/2010 | Oda | 707/706 |
| 7,801,875 B2* | 9/2010 | Kim | 707/706 |
| 7,822,720 B2* | 10/2010 | Choi et al. | 707/688 |
| 7,899,719 B2* | 3/2011 | Lin-Hendel | G06F 3/04815 705/26.1 |
| 8,433,616 B2* | 4/2013 | Lin-Hendel | G06F 3/04815 705/26.1 |
| 8,538,235 B2* | 9/2013 | Nabeshima | 386/239 |
| 8,903,738 B2* | 12/2014 | Lin-Hendel | G06F 3/04815 705/26.1 |
| 9,135,654 B2* | 9/2015 | Lin-Hendel | G06F 3/04815 |
| 2002/0085116 A1 | 7/2002 | Kuwano et al. | |
| 2003/0190147 A1* | 10/2003 | Lee | H04N 5/445 386/244 |
| 2005/0262449 A1 | 11/2005 | Anderson et al. | |
| 2007/0204025 A1* | 8/2007 | Cox | G06Q 30/02 709/223 |
| 2007/0253678 A1* | 11/2007 | Sarukkai | G06F 17/30787 386/241 |
| 2009/0055254 A1* | 2/2009 | Madhavan | G06Q 30/0242 705/14.41 |
| 2009/0076637 A1* | 3/2009 | Kameyama | G06F 17/30766 700/94 |
| 2009/0129749 A1* | 5/2009 | Oyamatsu | G11B 27/11 386/241 |
| 2009/0147139 A1* | 6/2009 | Watanabe | H04N 5/45 348/564 |
| 2009/0292686 A1* | 11/2009 | Carter | G06F 17/30731 |
| 2010/0005009 A1* | 1/2010 | Lin-Hendel | G06F 3/04815 705/26.1 |
| 2010/0036797 A1* | 2/2010 | Wong | G06F 17/3087 706/55 |
| 2010/0058220 A1* | 3/2010 | Carpenter | G06Q 30/02 715/772 |
| 2010/0094865 A1* | 4/2010 | Haswell | G06Q 10/00 707/723 |
| 2010/0121821 A1* | 5/2010 | Kinoshita et al. | 707/661 |
| 2010/0306249 A1* | 12/2010 | Hill et al. | 707/769 |
| 2011/0213680 A1* | 9/2011 | Lin-Hendel | G06F 3/04815 705/27.1 |
| 2012/0023104 A1* | 1/2012 | Johnson | G06F 17/30613 707/740 |
| 2013/0226744 A1* | 8/2013 | Lin-Hendel | G06F 3/04815 705/27.2 |
| 2015/0088687 A1* | 3/2015 | Lin-Hendel | G06F 3/04815 705/26.8 |
| 2015/0242096 A1* | 8/2015 | Carro | G09B 21/001 715/277 |
| 2016/0231963 A1* | 8/2016 | Ware | G11C 11/40615 |

FOREIGN PATENT DOCUMENTS

| | | |
|---|---|---|
| JP | 11-177899 A | 7/1999 |
| JP | 2002-24250 A | 1/2002 |
| JP | 2005-115790 A | 4/2005 |
| JP | 2007-150552 A | 6/2007 |
| JP | 2009-182473 A | 8/2009 |
| JP | 2009-243435 * | 10/2009 |
| JP | 2010-15042 A | 1/2010 |
| WO | WO 2007/060968 A1 | 5/2007 |

* cited by examiner

F I G. 1
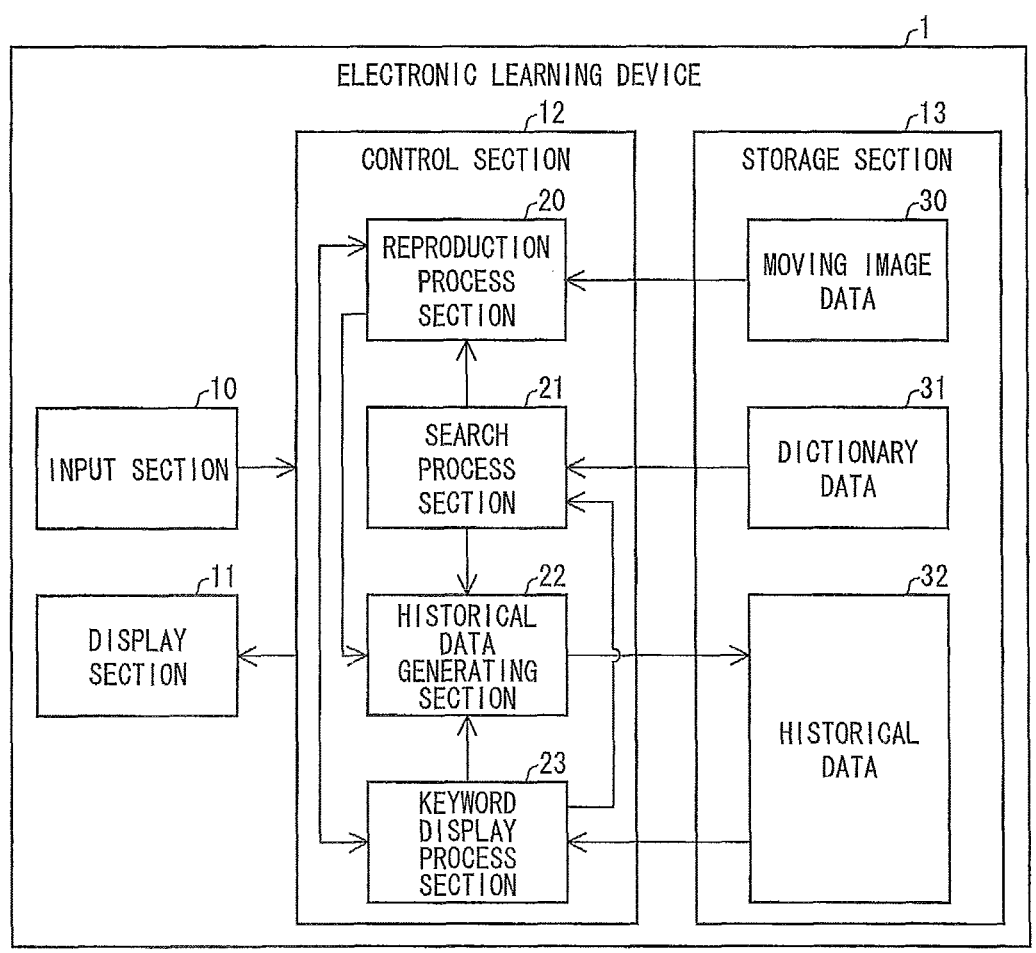

FIG. 2

| Training Moving Image 1-1 | | | |
|---|---|---|---|
| Number | Reproduction Time Point | Dictionary Used | Keyword |
| 1 | 13"45' | Japanese-Language Dictionary | コンプライアンス |
| 2 | 25"19' | English-Japanese Dictionary | CSR |
| ⋮ | ⋮ | ⋮ | ⋮ |

FIG. 3

| Training Moving Image 1-1 | | | | | |
|---|---|---|---|---|---|
| Number | Reproduction Time Point | Dictionary Used | Keyword | Dictionary ID | Keyword ID |
| 1 | 13"45' | Japanese-Language Dictionary | コンプライアンス | 0001 | 0128 |
| 2 | 25"19' | English-Japanese Dictionary | CSR | 0002 | 0130 |
| ⋮ | ⋮ | ⋮ | ⋮ | ⋮ | ⋮ |

F I G. 1 1
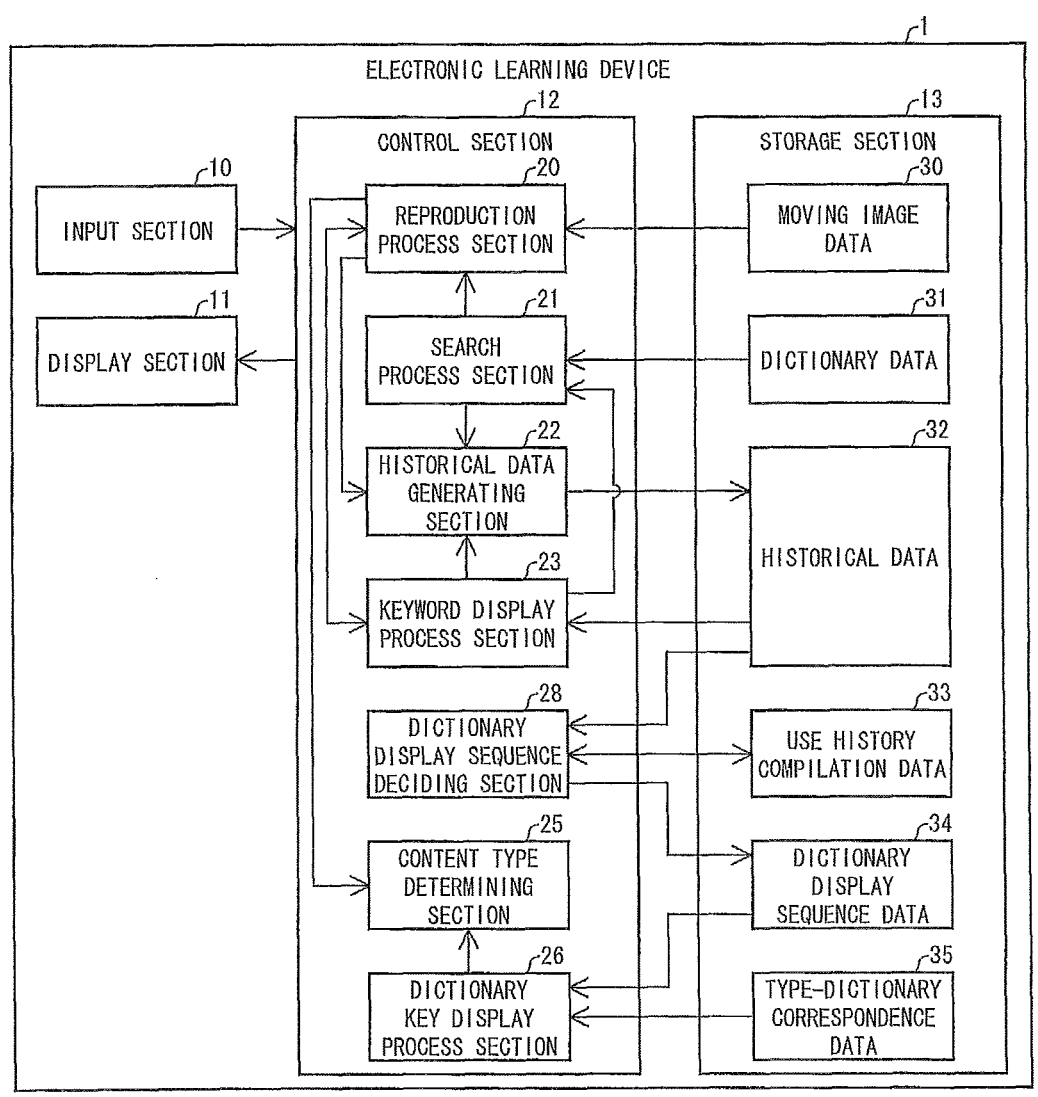

F I G. 1 2

| Dictionary ID | Count |
|---|---|
| 0001 | 6 |
| 0002 | 13 |
| 0003 | 10 |
| 0004 | 8 |
| ⋮ | ⋮ |

F I G. 1 3

| Sequence | Dictionary |
|---|---|
| 1 | English-Japanese Dictionary G |
| 2 | English-Japanese Dictionary P |
| 3 | English-English Dictionary O |
| 4 | Japanese-language Dictionary K |
| ⋮ | ⋮ |

F I G. 1 4

| Number \ Type | Japanese | English | Social |
|---|---|---|---|
| 1 | Japanese-Language Dictionary K | English-Japanese Dictionary G | People Reference Book A |
| 2 | Japanese-Language Dictionary D | English-Japanese Dictionary P | Map B |
| 3 | Japanese-Language Dictionary M | English-English Dictionary O | Map C |
| ⋮ | ⋮ | ⋮ | ⋮ |

F I G. 1 7
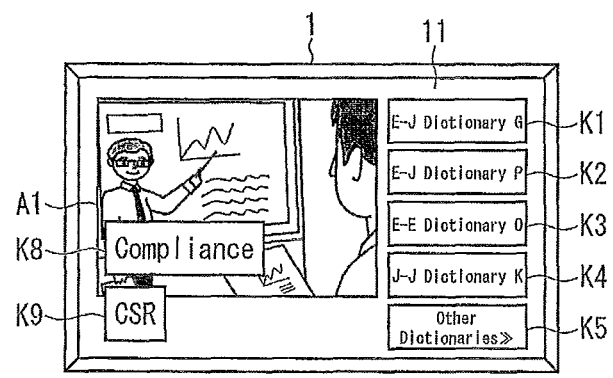
F I G. 1 8
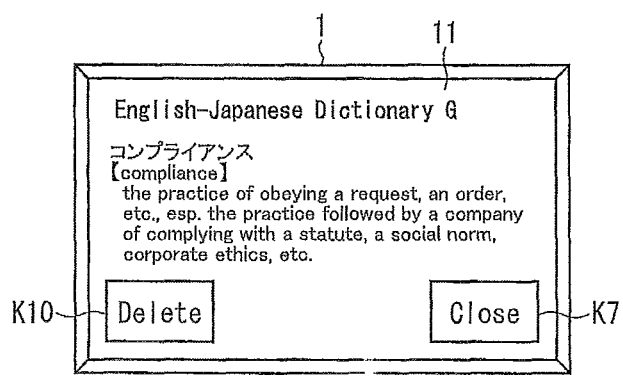

| Content Rewind Time Period | 60 Seconds |
|---|---|
| Display Timing Correction Time Period | 30 Seconds |

CONTENT REPRODUCTION DEVICE, CONTROL METHOD FOR CONTENT REPRODUCTION DEVICE, CONTROL PROGRAM, AND RECORDING MEDIUM

TECHNICAL FIELD

The present invention relates to (i) a content reproduction device for reproducing content such as a moving image, (ii) a method for controlling a content reproduction device, (iii) a control program, and (iv) a recording medium.

BACKGROUND ART

Recent years have witnessed widespread use of a learning system for a study involving use of a terminal device such as a personal computer. Such a learning system (i) causes a terminal device to reproduce learning content such as an image and a sound, and (ii) allows the user to view the learning content for a study.

The above learning system advantageously allows the user to hear a lecture without actually visiting the lecturer, and can also give the same lecture to a large number of people in far places. There have thus been proposed various techniques for further improving the convenience of the above learning system.

Patent Literature 1 below, for example, discloses (i) prompting the user to input a comment during reproduction of an electronic learning material and (ii) storing, in association with each other, the inputted comment and information on a time of reproduction of the electronic learning material which time was reached when the comment was inputted. Patent Literature 1 further discloses (i) displaying the comment and (ii) in the case where the displayed comment has been selected, reproducing the electronic learning material from the reproduction time associated with the comment, that is, allowing the user to use the comment as a bookmark and review the electronic learning material.

Patent Literature 2 below discloses a technique of attaching an electronic label to learning content. Specifically, Patent Literature 2 discloses a technique of (i) in the case where an input operation for attaching a label has been carried out during reproduction of learning content, prompting the user to input information on text to be written on the label and (ii) storing, in association with each other, the inputted text information and information on a time of reproduction of the learning content. Patent Literature 2 further discloses (i) displaying a list of label images each containing text information and (ii) in the case where a displayed label has been selected, reproducing the learning content from the reproduction time associated with that label. In other words, Patent Literature 2, as in Patent Literature 1, allows the user to use the label as a bookmark.

CITATION LIST

Patent Literature 1

Japanese Patent Application Publication, Tokukai, No. 2007-150552 A (Publication Date: Jun. 14, 2007)

Patent Literature 2

Japanese Patent Application Publication, Tokukai, No. 2010-015042 A (Publication Date: Jan. 21, 2010)

SUMMARY OF INVENTION

Technical Problem

The above learning system may reproduce a moving image or a sound that include a term or the like that the user does not know. In the case where the user encounters such a term during a study, the user often consults, for example, a dictionary to look up the meaning of the term in order to understand it. The above conventional technique, however, problematically fails to consider convenience for running a search in a dictionary or the like.

In the case where, for instance, the user has looked up the meaning of a term in, for example, a paper dictionary or an electronic dictionary during reproduction of learning content, the respective techniques of Patent Literatures 1 and 2 can each store, in association with each other, (i) text indicative of the term looked up and/or the result obtained by thus looking it up and (ii) information on a time of reproduction of the learning content.

Storing in a terminal device information on the term looked up, however, requires the user to input the term in the terminal device. Such a process is troublesome to the user. Further, Patent Literatures 1 and 2 each use a comment as a bookmark for learning content. Selecting one of the comments displayed as a list starts reproduction of the learning content from the reproduction time point associated with that comment.

Thus, the user is, if wanting to check the meaning of the term after selecting a comment to start reproduction, forced to take the trouble of stopping the reproduction of the learning content and looking up the term in a dictionary again.

Such a problem arises in not only a terminal device used in a learning system, but also any content reproduction device for reproducing content such as a moving image, a still image, and a sound. This is because the need to search a database in relation to content during reproduction of that content exists not only for learning content.

The present invention has been accomplished in view of the above problem. It is an object of the present invention to provide, for example, a content reproduction device that when reproducing the same content for the second or subsequent time, facilitates, at the timing of a past keyword search, accessing the result of the past search based on that keyword.

Solution to Problem

In order to solve the above problem, a content reproduction device of the present invention is a content reproduction device for reproducing content, the content reproduction device including: search means for (i) searching a database by a keyword inputted while the content reproduction device is reproducing content and (ii) displaying a result of the search; and historical data generating means for generating historical data including, in association with each other, (i) position information indicative of a position of the reproduction of the content at which position the search means searched the database and (ii) access information for access to the search result.

In order to solve the above problem, a method of the present invention for controlling a content reproduction device is a method for controlling a content reproduction device for reproducing content, the method including: a searching step for (i) searching a database by a keyword inputted while the content reproduction device is reproducing content and (ii) displaying a result of the search; and a historical data generating step for generating historical data including, in association with each other, (i) position information indicative of a position of the reproduction of the content at which position the searching step searched the database and (ii) access information for access to the search result.

The above arrangement (i) searches a database by a keyword inputted while the content device is reproducing content and (ii) displays the result of the search. The above arrangement thus allows the user to, during the content reproduction, run a search based on a keyword and see the result of that search.

Further, the above arrangement generates historical data including, in association with each other, (i) position information indicative of a content reproduction position at which a search was run and (ii) access information for access to the result of that search.

With the use of the historical data, when the content is reproduced, the user can, at a reproduction position at which a past search based on a keyword was run, access the result of the search based on that keyword.

The above arrangement thus facilitates a keyword search during content reproduction, and allows the user to, when the content is reproduced for the second or subsequent time, easily access the result of the search based on that keyword.

Advantageous Effects of Invention

As described above, a content reproduction device of the present invention includes: search means for (i) searching a database by a keyword inputted while the content reproduction device is reproducing content and (ii) displaying a result of the search; and historical data generating means for generating historical data including, in association with each other, (i) position information indicative of a position of the reproduction of the content at which position the search means searched the database and (ii) access information for access to the search result.

As described above, a method of the present invention for controlling a content reproduction device includes: a searching step for (i) searching a database by a keyword inputted while the content reproduction device is reproducing content and (ii) displaying a result of the search; and a historical data generating step for generating historical data including, in association with each other, (i) position information indicative of a position of the reproduction of the content at which position the searching step searched the database and (ii) access information for access to the search result.

The above arrangement thus facilitates a keyword search during content reproduction, and allows the user to, when the content is reproduced for the second or subsequent time, easily access the result of the search based on that keyword.

BRIEF DESCRIPTION OF DRAWINGS

FIG. 1 is a block diagram illustrating a main configuration of an electronic learning device of an embodiment of the present invention.

FIG. 2 is a diagram illustrating an example of historical data stored in the electronic learning device.

FIG. 3 is a diagram illustrating another example of the historical data.

FIG. 11 is a block diagram illustrating a main configuration of an electronic learning device of another embodiment of the present invention.

FIG. 12 is a diagram illustrating an example of use history compilation data stored in the electronic learning device.

FIG. 13 is a diagram illustrating an example of dictionary display sequence data stored in the electronic learning device.

FIG. 14 is a diagram illustrating an example of typedictionary correspondence data stored in the electronic learning device.

FIG. 17 is a diagram illustrating an example of the electronic learning device displaying a plurality of keywords simultaneously.

FIG. 18 is a diagram illustrating an example display screen displayed by the electronic learning device to let the user select whether to delete a log from historical data.

DESCRIPTION OF EMBODIMENTS

Embodiment 1

Figure 4:
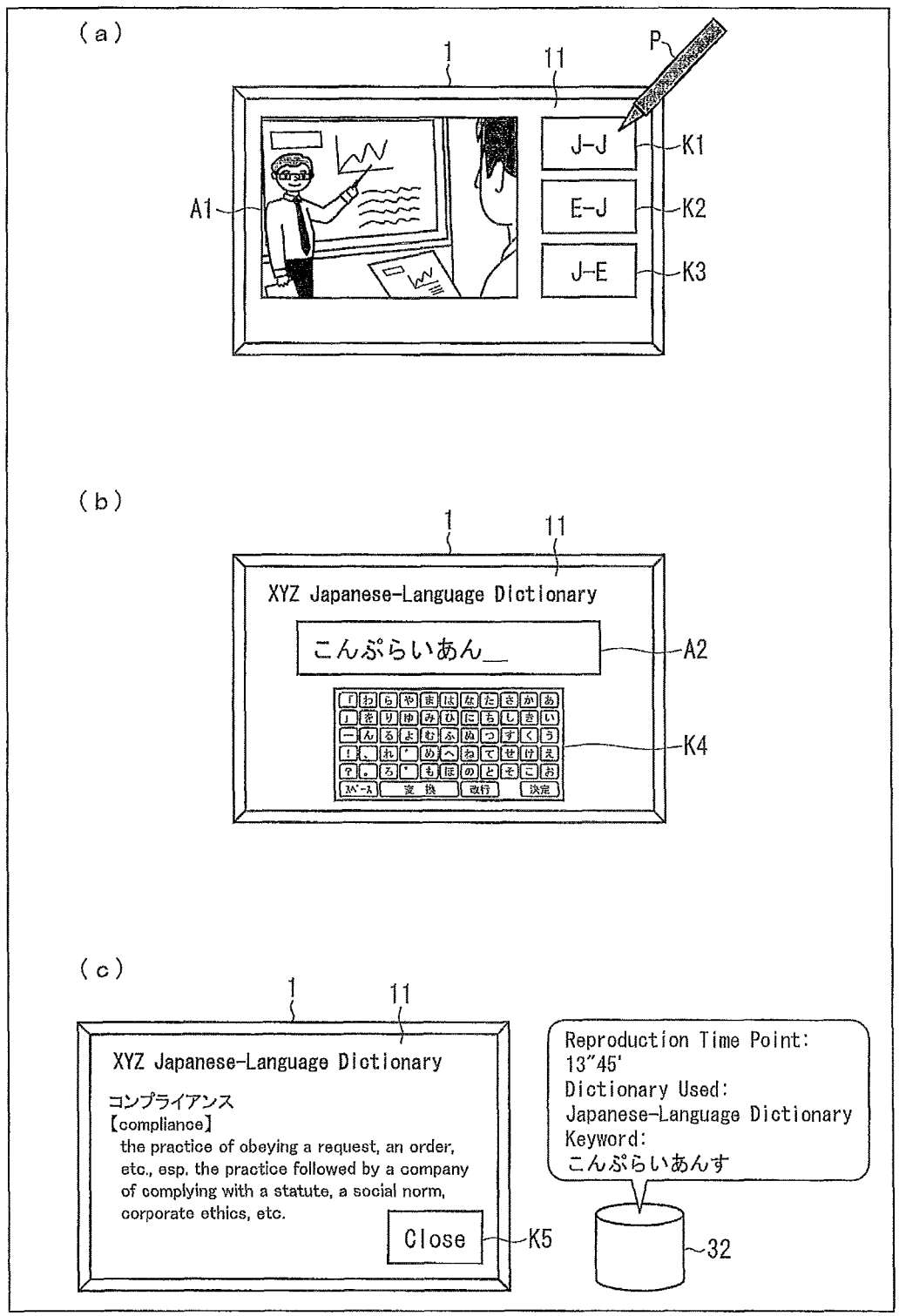
FIG. 4 shows diagrams illustrating an example operation of the electronic learning device, where (a) illustrates an operation example observed before a dictionary is selected, (b) illustrates an operation example observed when a keyword search is run with use of a selected dictionary, and (c) illustrates an operation example observed after a keyword search is run.

The description below deals in detail with an embodiment of the present invention with reference to FIGS. 1 through 10. The following first describes an arrangement of an electronic learning device of the present embodiment with reference to FIG. 1. FIG. 1 is a block diagram illustrating a main configuration of the electronic learning device (content reproduction device) 1.

The electronic learning device 1 is a device for reproducing content, and as illustrated in FIG. 1, includes: an input section 10; a display section 11 for displaying an image; a control section 12; and a storage section 13.

The input section 10 accepts an input operation by the user. The user controls the operation of the electronic learning device 1 through the input section 10. The present embodiment assumes that the input section 10 is a so-called touch panel that (i) detects an input operation performed with respect to a display surface of the display section 11 and (ii) accepts the input operation thus detected. The input section 10, needless to say, simply needs to be capable of accepting an input operation by the user, and may include, for example, an entry key and/or a keyboard. Further, the present embodiment describes an example in which the input section 10 is included in the electronic learning device 1. The input section 10 may alternatively be a device separate from the electronic learning device 1.

The display section 11 displays an image under control of the control section 12, and may be, for example, a liquid crystal display device or an EL display device. The display section 11 may alternatively be, as with the input section 10, a device separate from the electronic learning device 1.

The control section 12 centrally controls the operation of the electronic learning device 1, and includes: a reproduction process section 20; a search process section (search section, search result display section) 21; a historical data generating section (historical data deleting section) 22; and a keyword display process section 23.

The reproduction process section 20 carries out a process of reproducing content. Specifically, the reproduction process section 20 (i) reads, from the storage section 13, content corresponding to the content of an input operation accepted by the input section 10, and (ii) causes the display section 11 to display that corresponding content. The present embodiment assumes that the reproduction process section 20 reproduces content of a moving image. The reproduction process section 20 may alternatively (i) carry out a slideshow display of content including still images or (ii) reproduce content including a sound. In the case where content to be reproduced includes a sound, the reproduction process section 20 outputs the sound of the content from a loudspeaker (not shown).

The search process section 21 (i) searches a database by a keyword inputted while the reproduction process section 20 is reproducing content, and (ii) displays, as a search result, an image based on data detected. Specifically, the search process section 21 (i) causes the display section 11 to display a keyword input screen for input of a keyword, (ii) searches a database by a keyword the input of which has been accepted by the input section 10 while the keyword input screen was being displayed, and (iii) causes the display section 11 to display the result of the search. The present embodiment assumes that the database to be searched is dictionary data stored in the storage section 13.

The historical data generating section 22 generates historical data indicative of a history of keyword searches. Specifically, the historical data generating section 22 (i) generates historical data that associates (a) position information indicative of a position (reproduction position relative to the top of the content) in the content at which position the content was being reproduced when a keyword search was run with (b) access information for access to the result of the search based on that keyword, and (ii) stores the historical data in the storage section 13. The present embodiment assumes that the position information is information on a time point of reproduction of content and that the access information is a combination of (i) information indicative of a database as a search target and (ii) a keyword used in the search.

Needless to say, (i) the position information simply needs to indicate a position of reproduction of the content at which position the content was being reproduced when a keyword search was run, and is not limited to the above example, and (ii) the access information simply needs to allow access to the search result, and is not limited to the above example.

The keyword display process section 23, while content is being reproduced, causes the display section 11 to display, at the timing of a past keyword search, the keyword used in that search. Specifically, the keyword display process section 23 (i) refers to historical data, stored by the historical data generating section 22, to specify the timing of a past keyword search and the keyword used in that search, and (ii) carries out the above display.

The keyword display process section 23, in the case where a displayed keyword has been selected, (i) refers to the access information in the historical data to obtain the result of the search based on that keyword, and (ii) displays the search result, Specifically, the keyword display process section 23, in the case where a displayed keyword has been selected, (i) notifies the search process section 21 of the selected keyword and the database searched by that keyword, (ii) causes the search process section 21 to search the database by the keyword, and (iii) causes the search process section 21 to display the result of the keyword search.

The storage section 13 stores various data for use by the electronic learning device 1. The storage section 13 stores moving image data (content) 30, dictionary data (database) 31, and historical data 32.

The moving image data 30 is moving image data of content to be reproduced by the reproduction process section 20. The reproduction process section 20 reads and reproduces the moving image data 30. The present embodiment describes an example in which the moving image data 30 is stored in the storage section 13. The moving image data 30, however, simply needs to be stored such that the reproduction process section 20 can reproduce it. The moving image data 30 may be stored in, for example, an external memory device connected to the electronic learning device 1. The moving image data 30 may alternatively be stored in, for example, a device, such as a server, that is communicably connected to the electronic learning device 1. In this alternative case, the moving image data 30 may be (i) downloaded to the electronic learning device 1 for reproduction or (ii) reproduced by streaming without being downloaded.

The dictionary data 31 is a database to be searched by the search process section 21 by a keyword. The present embodiment assumes that the storage section 13 stores, as the dictionary data 31, respective databases of three dictionaries, namely a Japanese-language dictionary, an English-Japanese dictionary, and a Japanese-English dictionary. These databases each include (i) entry words (that is, words as a target of a keyword search) and (ii) data indicative of the meaning and/or the like of each entry word, the entry words and the data being associated with each other. This makes it possible to, by running a search by a keyword identical to an entry word, access data associated with that entry word and indicative of the meaning and/or the like of the entry word.

The historical data 32 is, as described above, data generated and stored by the historical data generating section 22. The historical data 32 is data including, in association with each other, (i) information on a time point of reproduction of content at which time point a keyword search was run and (ii) access information for access to the result of the search based on that keyword.

[Historical Data 32]

The historical data 32 may be, for example, data as shown in FIG. 2. FIG. 2 is a diagram illustrating an example of the historical data 32. The historical data 32 of FIG. 2 is data generated for content named "Training Moving Image 1-1", and is data that associates the items "Number", "Reproduction Time Point", "Dictionary Used", and "Keyword" with one another.

The item "Number" indicates a number for use in managing information on a set of a reproduction time point, a dictionary used, and a keyword, the information being included in the historical data 32. A "Number" is assigned when the historical data generating section 22 stores information on a reproduction time point, a dictionary used, and a keyword.

The item "Reproduction Time Point" indicates a time point of reproduction of content which time point was reached when a keyword search was run. A "Reproduction Time Point" is obtained by the historical data generating section 22 (i) obtaining information on a time point of reproduction of content which time point was reached when a keyword search was run and (ii) storing that information on the time point in the storage section 13.

The item "Dictionary Used" indicates a dictionary used for a keyword search. A "Dictionary Used" is obtained by the historical data generating section 22 (i) specifying a dictionary used for a keyword search and (ii) storing information on that dictionary in the storage section 13.

The item "Keyword" indicates a keyword used in a keyword search. A "Keyword" is obtained by the historical data generating section 22 (i) obtaining a keyword when a keyword search was run and (ii) storing the keyword in the storage section 13.

The use of the above historical data 32 makes it possible to, when the "Training Moving Image 1-1" is reproduced, display, at the timing of a past keyword search, the keyword used in that keyword search. This in turn makes it possible to, in the case where a displayed keyword has been selected, run a search by that keyword again to display the result of the search.

The historical data 32 simply needs to allow the electronic learning device 1 to (i) display, at the timing of a past keyword search, the keyword used in that search and (ii) in the case where a displayed keyword has been selected, display the result of the search based on that keyword. The historical data 32 is thus not limited to the example of FIG. 2.

The historical data 32 may be, for example, data as shown in FIG. 3. FIG. 3 is a diagram illustrating another example of the historical data 32. The historical data 32 of FIG. 3 differs from the historical data 32 of FIG. 2 in that it further includes data on the items "Dictionary ID" and "Keyword ID".

The item "Dictionary ID" specifies a dictionary used for a keyword search. The item "Keyword ID" specifies a position in a dictionary used for a search at which position the keyword is stored. The arrangement described here assumes that the entry words (that is, words as a target of a keyword search) in each dictionary are each assigned a keyword ID in advance. The arrangement described here further assumes that in the case where a search has been run by a keyword and found an entry word identical to that keyword used in the search, the historical data generating section 22 generates historical data 32 including the keyword ID assigned to that entry word.

The above arrangement makes it possible to (i) specify a storage position for an entry word identical to a keyword without carrying out a process of comparing each entry word in a dictionary with a keyword and searching for an entry word identical to the keyword, and (ii) access data indicative of the meaning and/or the like of the entry word, that is, the result of the search. The above arrangement can thus reduce, as compared to an arrangement of running a search by the keyword again, the time necessary to reach the result of a search by the keyword.

As described above, the examples of FIGS. 2 and 3 each show historical data 32 including, as information for access to the result of a search by a keyword, (i) information on a keyword and a dictionary used or (ii) a dictionary ID and a keyword ID. The historical data 32, however, simply needs to include (i) information on a reproduction time point and (ii) access information for access to the result of a search by a keyword, and is not limited to the above examples. The access information may be, for example, information (for example, an address) indicative of a storage position for a search result.

[Example Operation of Electronic Learning Device 1 (Generation and Recording of Historical Data)]

The description below deals with an example operation of the electronic learning device 1 with reference to FIG. 4. FIG. 4 shows diagrams illustrating an example operation of the electronic learning device 1, where (a) illustrates an operation example observed before a dictionary is selected, (b) illustrates an operation example observed when a keyword search is run with use of a selected dictionary, and (c) illustrates an operation example observed after a keyword search is run.

The example of (a) of FIG. 4 displays (i) an image of content in an image display region A1 and (ii) keys K1 to K3 next to the image display region A1. The keys K1 to K3 are so-called software keys: Performing a touching operation with respect to the keys K1 to K3 with use of, for example, a touch pen P or a finger can cause the electronic learning device 1 to carry out respective processes assigned in advance to the keys K1 to K3.

Specifically, the key K1 is a key for calling a Japanese-language dictionary. In response to a touching operation with respect to the key K1, the electronic learning device 1 displays a screen for a keyword search that uses a Japanese-language dictionary. This allows the user to, in the case where the user has, during a study, encountered a term of which the user wants to check the meaning, easily run a search for that term.

The key K2 is a key for calling an English-Japanese dictionary. In response to a touching operation with respect to the key K2, the electronic learning device 1 displays a screen for a keyword search that uses an English-Japanese dictionary. This allows the user to, in the case where the user has, during a study, encountered an English term of which the user wants to check the meaning, easily run a search for a Japanese translation of that English term.

The key K3 is a key for calling a Japanese-English dictionary. In response to a touching operation with respect to the key K3, the electronic learning device 1 displays a screen for a keyword search that uses a Japanese-English dictionary. This allows the user to, in the case where the user has, during a study, encountered a term that the user wants to translate into English, easily translate that term into English.

A touching operation with respect to the key K1 causes the electronic learning device 1 to (i) temporarily stop reproduction of content and (ii) display a screen as illustrated in (b) of FIG. 4. The example in (b) of FIG. 4 displays (i) the name (XYZ Japanese-language dictionary) of the dictionary to be used for the keyword search, (ii) a keyword display region A2, and (iii) a keyboard K4.

The example of (b) of FIG. 4 assumes that the user (i) selects, with use of, for example, a touch pen P, characters and/or the like included in the keyboard K4, and thus (ii) inputs characters constituting a keyword (that is, a term that the user wants to look up in a dictionary) to be used in a search. The inputted characters are displayed in the keyword display region A2. Selecting "決定" (Enter) in the keyboard K4 causes the electronic learning device 1 to run a search on the basis of the inputted character string as a keyword.

The example of (b) of FIG. 4 assumes that the user types in "こんぷらいあんす" (Japanese phonetic hiragana characters for "compliance") and starts a search by that entry. This operation causes the electronic learning device 1 to carry out a display as illustrated in (c) of FIG. 4. The example of (c) of FIG. 4 displays (i) the name of the dictionary used for the keyword search, (ii) the result of the search for "こんぷらいあんす" in that dictionary, and (iii) a key K5 for ending the display of the dictionary search result and returning to reproduction of the content.

The electronic learning device 1, in the case where such a keyword search has been run, generates historical data 32 that includes, in association with one another, (i) information on a time point of reproduction of the content which time point was reached when the keyword search was run, (ii) information on the dictionary as a target of the keyword search, and (iii) the keyword used in the search. The electronic learning device 1 thus stores the historical data 32.

The electronic learning device 1, in the case where the content is reproduced for the next time, (i) refers to the above historical data 32 and (ii) displays, at the timing of the past keyword search, the keyword used in the search. The following describes an example operation carried out in the case where a keyword is displayed.

[Example Operation of Electronic Learning Device 1 (Displaying Keyword)]

Figure 5:
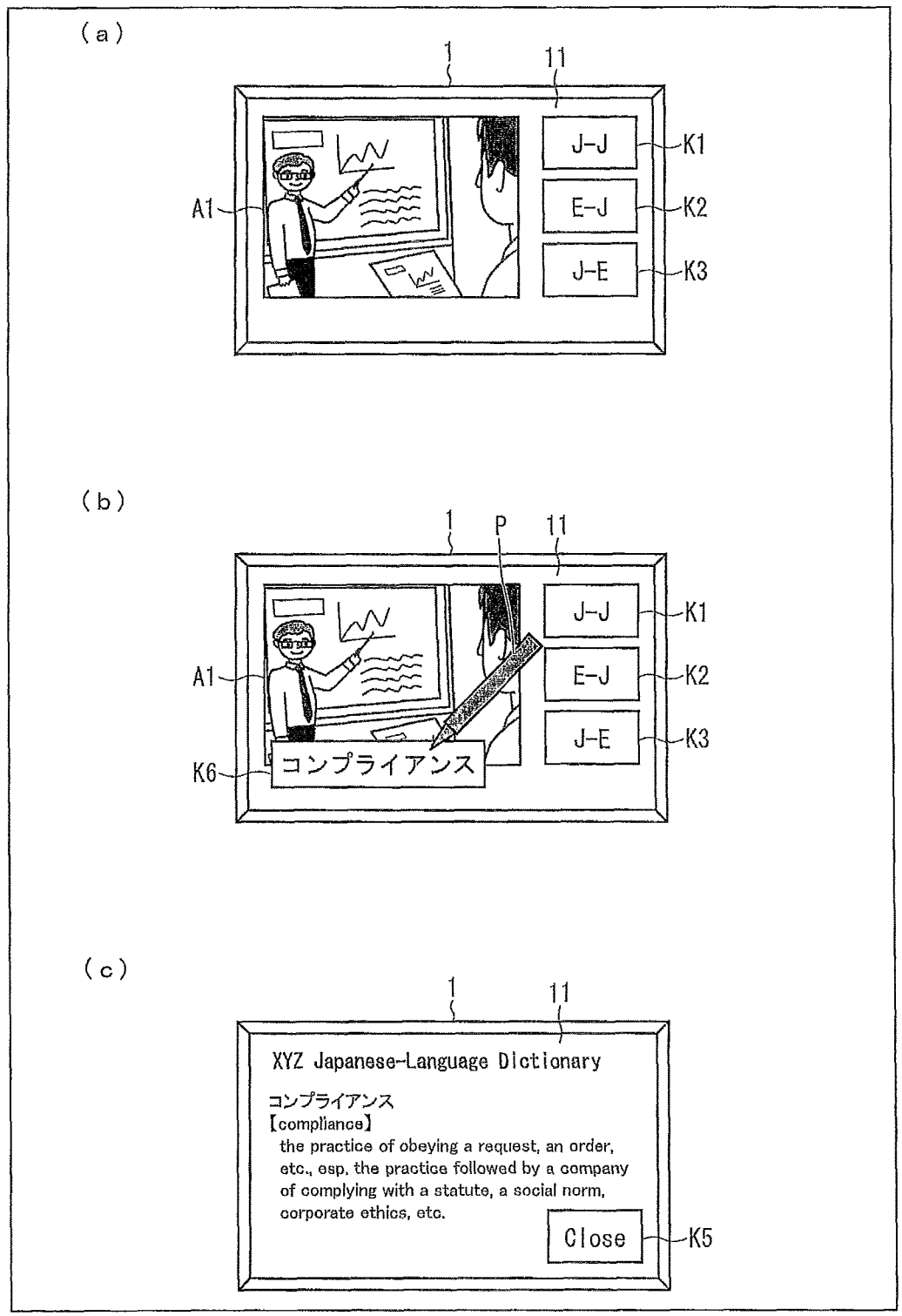
FIG. 5 shows diagrams illustrating an example operation of the electronic learning device for displaying a keyword during reproduction of content, where (a) illustrates a screen example observed when no keyword is displayed, (b) illustrates a screen example observed when a keyword is displayed, and (c) illustrates a screen example observed when a displayed keyword has been selected.

With reference to FIG. 5, the description below deals with an example operation of the electronic learning device 1 for displaying a keyword on the basis of historical data 32. FIG. 5 shows diagrams illustrating an example operation of the electronic learning device 1 for displaying a keyword during reproduction of content, where (a) illustrates a screen example observed when no keyword is displayed, (b) illustrates a screen example observed when a keyword is displayed, and (c) illustrates a screen example observed when a displayed keyword has been selected.

As illustrated in (a) of FIG. 5, the electronic learning device 1, when no keyword is displayed, displays (i) an image of content in the image display region A1 and (ii) the keys K1 to K3, as in the example of (a) of FIG. 4.

The electronic learning device 1 monitors a current time point of reproduction of the content for whether the current reproduction time point matches a reproduction time point on which information is stored as historical data 32. The electronic learning device 1, in the case where it has determined that the two reproduction time points match, displays a keyword associated with the reproduction time point that matches the current reproduction time point.

For instance, as in the example of (c) of FIG. 4, when the current reproduction time point reaches 13 minutes 45 seconds, which is a reproduction time point associated with the keyword "コンプライアンス" (Japanese phonetic katakana characters for "compliance"), the electronic learning device 1 displays the key K6 showing the keyword "コンプライアンス" as illustrated in (b) of FIG. 5.

In the case where the displayed key K6 has been selected with use of a touch pen P, a finger or the like, the electronic learning device 1 displays the result of the search based on the keyword "コンプライアンス" as illustrated in (c) of FIG. 5.

As described above, the electronic learning device 1 displays, at timing of a past keyword search, the keyword used in that search. This keyword is something by which the user searched the dictionary data 31 in the past. Thus, in the case where the user currently remembers the meaning and/or the like of that keyword, there is no need to display again the result of the search based on that keyword, and reproduction of content is desirably continued. The user may, on the other hand, have forgotten the result of a past search.

In view of the above point, the electronic learning device 1, (i) in the case where a displayed keyword has not been selected, does not display the result of a search based on that keyword, and (ii) in the case where a displayed keyword has been selected, does display the result of a search based on that keyword.

With the above arrangement, the user can, in the case where the user has determined that the search result does not need to be displayed, cause content reproduction to continue. Further, the above arrangement displays only a keyword, and does not prevent content viewing. The above arrangement thus allows the user to, in the case where the user wants to see the search result, see the search result without having to take the trouble of inputting characters as illustrated in (b) of FIG. 4.

The electronic learning device 1 may display a search result instead of a keyword. However, in the case where the search result is a long passage, such a search result will prevent content viewing and make it difficult for the user to determine whether the user remembers the result of the search based on the keyword. The electronic learning device 1 thus preferably displays a keyword and, in the case where that keyword has been selected, displays the corresponding search result.

The electronic learning device 1 is simply required to display a keyword in such a manner as to allow the user to recognize that keyword. The manner is thus not limited to that illustrated in the example of (b) of FIG. 5. The electronic learning device 1 may display a keyword in such a manner that, for instance, the keyword is superimposed on an image of content as in subtitles.

Figure 6:
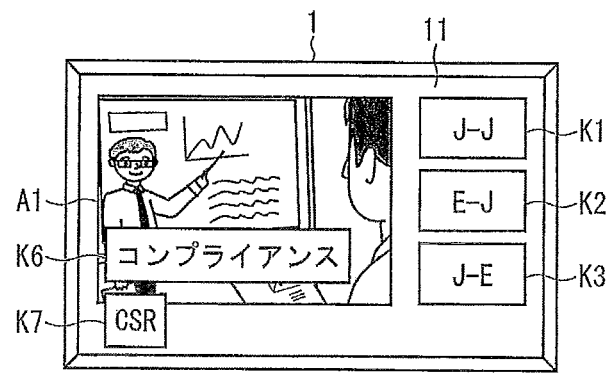
FIG. 6 is a diagram illustrating an example of the electronic learning device displaying a plurality of keywords simultaneously.

In the case where the electronic learning device 1 stores a plurality of keywords in correspondence with a single reproduction time point or with reproduction time points close to each other, the electronic learning device 1 may display such a plurality of keywords simultaneously as in the example of FIG. 6. FIG. 6 is a diagram illustrating an example of displaying a plurality of keywords simultaneously.

The example of FIG. 6 displays the keyword "CSR" in addition to the keyword "コンプライアンス". The user can select either of those keywords. Selecting a keyword allows the user to see the result of a search based on that keyword.

The user may, after selecting a displayed keyword and seeing the result of a search based on that keyword, determine that the keyword does not need to be displayed when the same content is reproduced for the next time. The user can, as a result of repeated reproduction of the content, acquire firmly established knowledge. Thus, the user can preferably change, in correspondence with how well the user's knowledge is firmly established, keywords to be displayed.

Figure 7:
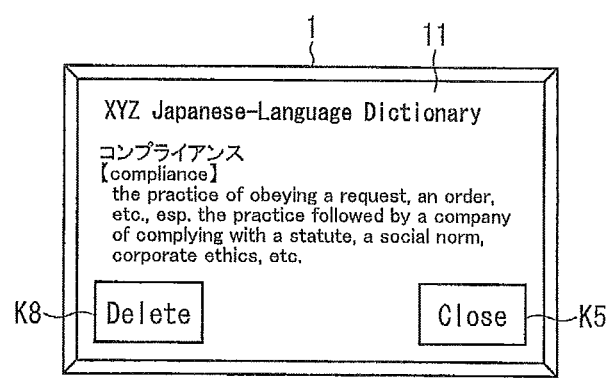
FIG. 7 is a diagram illustrating an example display screen displayed by the electronic learning device to let the user select whether to delete a log from historical data.

The electronic learning device 1 may, for instance, display a screen as illustrated in FIG. 7 and allow the user to select whether to delete a log from the historical data 32. FIG. 7 is a diagram illustrating an example display screen that allows the user to select whether to delete a log from the historical data 32.

The example of FIG. 7 displays (i) the key K5 showing the word "Close" as in the example of (c) of FIG. 5 and (ii) a key (deletion object) K8 showing the word "Delete". The user can select the key K8 to delete the data on the keyword "コンプライアンス" from the historical data 32.

The electronic learning device 1 will, in consequence, not display the keyword "コンプライアンス" when the same content is reproduced for the next time.

The timing at which the key K8 for deleting historical data is displayed is not limited to the above example. The key K8 may be displayed at timing at which, for instance, the keyword is displayed. This arrangement allows the user to delete historical data on a keyword even without seeing the corresponding search result.

In the case where a displayed keyword has not been selected, that may indicate that the user has determined that the result of a search based on that keyword does not need to be displayed. The electronic learning device 1 may thus alternatively be arranged to delete historical data 32 on a keyword that has not been selected.

[Historical Data Generating Process]

Figure 8:
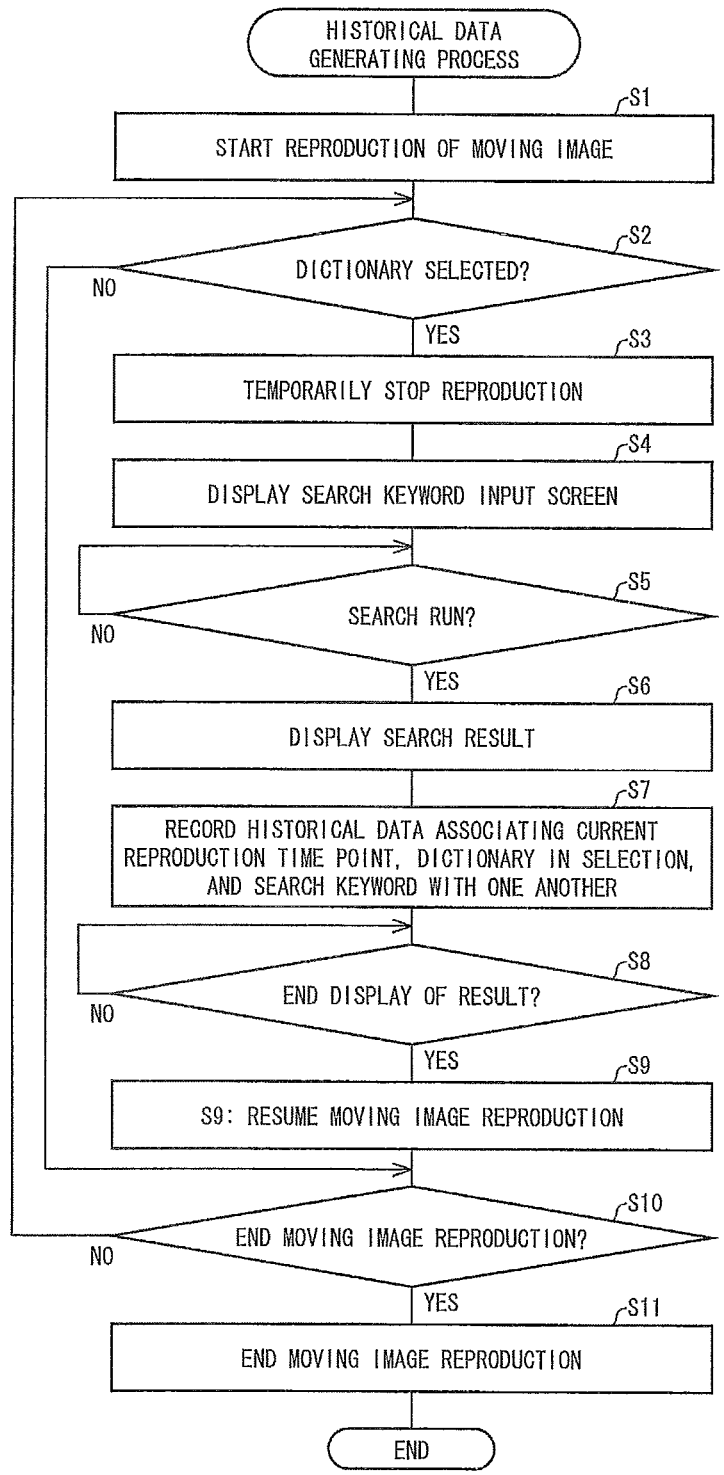
FIG. 8 is a flowchart illustrating an example of a historical data generating process carried out by the electronic learning device.

With reference to FIG. 8, the description below deals with a historical data generating process, through which the electronic learning device 1 generates historical data 32. FIG. 8 is a flowchart illustrating an example of the historical data generating process. The historical data generating process is a process that is carried out during reproduction of content.

The reproduction process section 20, upon recognition of a content reproduction instruction on the basis of an input operation performed with respect to the input section 10, (i) reads, from the moving image data 30 in the storage section 13, the content that the reproduction process section 20 has been instructed to reproduce and (ii) starts reproduction of the content (S1). This example assumes that the content to be reproduced is content of a moving image.

The search process section 21 is, at this stage, waiting for selection of a dictionary (S2). In the case where the search process section 21 has recognized that a dictionary has been selected (YES in S2), the search process section 21 causes the reproduction process section 20 to temporarily stop the content reproduction (S3). The process then proceeds to S4. In the case where the search process section 21 has not recognized that a dictionary has been selected (NO in S2), the process proceeds to S10.

The search process section 21, in S4, causes the display section 11 to display a keyword input screen (S4) and waits for a search to be run (S5). Characters to be inputted vary according to the dictionary (as for the case of an English-Japanese dictionary and the case of a Japanese-English dictionary, for example) to be used for the search. The above keyword input screen is thus preferably a keyword input screen that uniquely corresponds to the dictionary to be used.

The search process section 21, upon input of a keyword and an instruction to run a search, searches the dictionary, selected in S2, by the keyword, and causes the display section 11 to display the result of the search (S6). Further, the search process section 21 notifies the historical data generating section 22 of the keyword and dictionary used for the search.

The historical data generating section 22, upon notification of the keyword and dictionary, obtains from the reproduction process section 20 information on a current time point of reproduction of the content, that is, a reproduction time point at which the reproduction process section 20 temporarily stopped the content reproduction in S3. The historical data generating section 22 then generates historical data 32 including, in association with each other, (i) the obtained reproduction time point and (ii) the keyword and dictionary of which the historical data generating section 22 has been notified by the search process section 21, and stores the historical data 32 in the storage section 13 (S7).

The search process section 21, after displaying the search result in S6, determines whether the display of the search result is to be ended (S8). In the case where the search process section 21 has determined in S8 that the display of the search result is to be ended (YES in S8), the search process section 21 instructs the reproduction process section 20 to resume the reproduction of the content. This ends the display of the search result and causes the display section 11 to display an image of the content instead (S9).

The reproduction process section 20, after resuming the reproduction, determines whether the moving image reproduction is to be ended (S10). In the case where the reproduction process section 20 has determined that the moving image reproduction is not to be ended (NO in S10), the process returns to S2. In the case where the reproduction process section 20 has determined that the moving image reproduction is to be ended (YES in S10), the process proceeds to S11, whereby the reproduction process section 20 ends the reproduction of the moving image. This ends the historical data generating process.

The reproduction process section 20, in the case where in S10 (i) it has reproduced the currently reproduced content until the content reaches its end time point or (ii) the input section 10 has accepted an input operation to the effect that the reproduction is to be ended, determines that the moving image reproduction is to be ended.

The reproduction process section 20 may resume the reproduction from a position in the content at which position the reproduction was stopped, or alternatively from a reproduction position before (that is, closer to the top of the content) the position at which the reproduction was stopped (that is, the reproduction position reached when an input operation for starting a search was performed). This alternative arrangement takes into consideration the difference between (i) the timing at which a search becomes needed (for instance, the time at which the user encounters a term that the user does not know) and (ii) the timing at which the user performs an input operation for starting a search. In the case where the content reproduction is resumed from a position before a reproduction position in the content at which position a search became needed, the user can, with the understanding of the search result, go through the scene that necessitated a search (for instance, a scene in which the user encountered a term that the user did not know). This arrangement allows the user to deepen the user's understanding of the content.

[Keyword Display Process]

Figure 9:
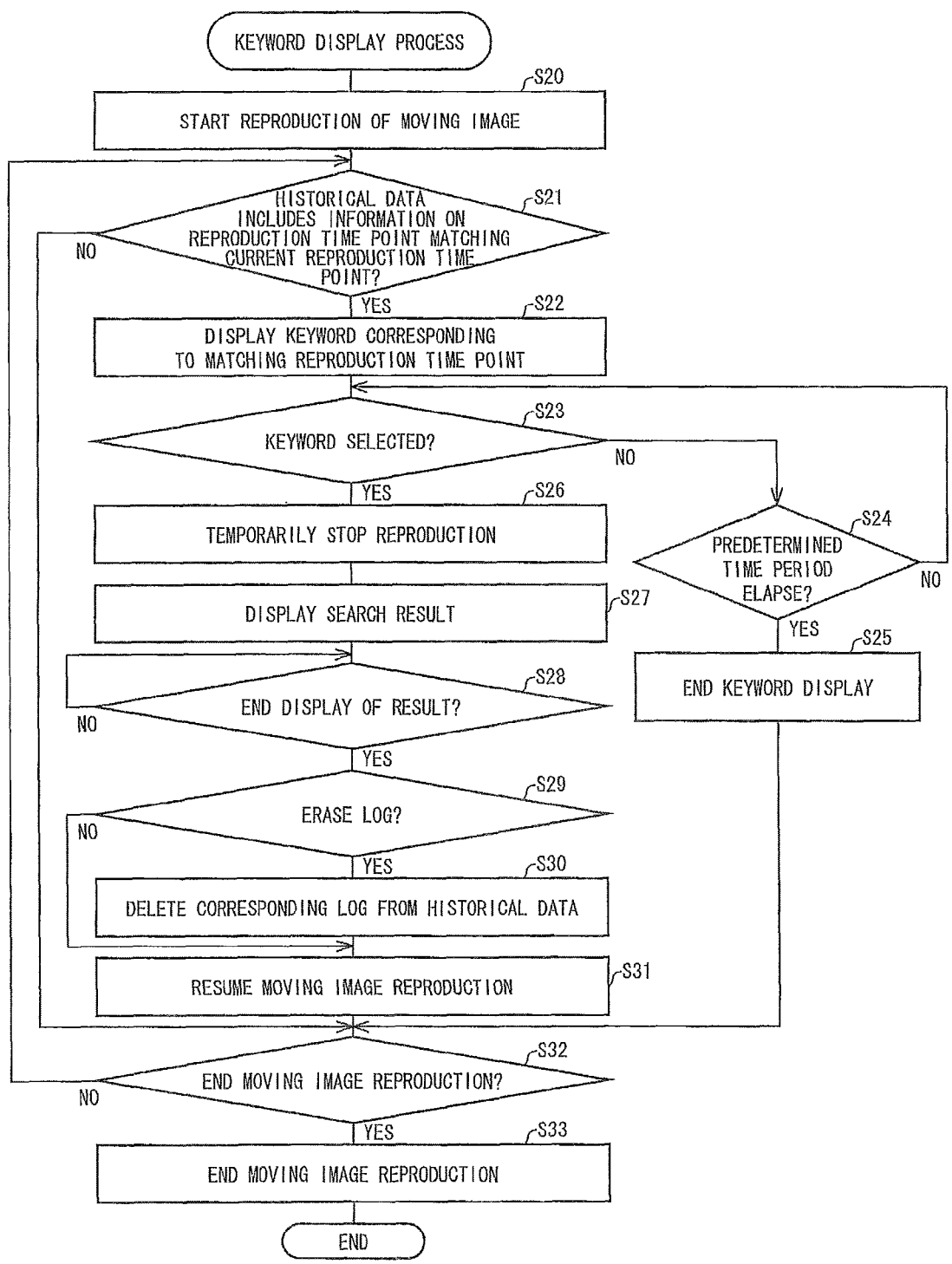
FIG. 9 is a flowchart illustrating an example of a keyword display process carried out by the electronic learning device.

With reference to FIG. 9, the description below deals with a keyword display process, through which the electronic learning device 1 displays a keyword. FIG. 9 is a flowchart illustrating an example of the keyword display process. The keyword display process is, as well as the historical data generating process, a process that is carried out during reproduction of content.

The reproduction process section 20, upon recognition of a content reproduction instruction on the basis of an input operation performed with respect to the input section 10, (i) reads, from the moving image data 30 in the storage section 13, the content that the reproduction process section 20 has been instructed to reproduce and (ii) starts reproduction of the content (S20).

The keyword display process section 23, after the start of the content reproduction, refers to the historical data 32 to determine whether the historical data 32 includes information on a reproduction time point that matches the current time point of reproduction of the content (S21).

In the case where the keyword display process section 23 has determined that the historical data 32 includes no information on a reproduction time point that matches the current time point of reproduction of the content (NO in S21), the process proceeds to S32. In the case where the keyword display process section 23 has determined that the historical data 32 includes information on a reproduction time point that matches the current time point of reproduction of the content (YES in S21), the keyword display process section 23 specifies a keyword in the historical data 32 which keyword is associated with the reproduction time point that matches the current time point of reproduction of the moving image data. The keyword display process section 23 then causes the display section 11 to display the keyword thus specified (S22). The keyword display process section 23 then determines whether the displayed keyword has been selected (S23).

In the case where the keyword display process section 23 has determined that the displayed keyword has not been selected (NO in S23), the keyword display process section 23 determines whether a predetermined time period has elapsed after the display of the keyword (S24).

In the case where the keyword display process section 23 has determined that the predetermined time period has elapsed (YES in S24), the keyword display process section 23 ends the display of the keyword (S25). The process then proceeds to S32. In the case where the keyword display process section 23 has determined that the predetermined time period has not elapsed (NO in S24), the process returns to S23.

In the case where the keyword display process section 23 has determined in S23 that the displayed keyword has been selected (YES in S23), the keyword display process section 23 instructs the reproduction process section 20 to temporarily stop the reproduction (S26). Further, the keyword display process section 23 notifies the search process section 21 of information on (i) the selected keyword and (ii) the dictionary searched by that keyword. The search process section 21, upon receipt of that notification, searches the dictionary by the keyword, both of which the search process section 21 has been notified of, and causes the display section 11 to display the result of that search (S27).

The search process section 21, after displaying the search result, determines whether the display of the search result is to be ended (S28). In the case where the search process section 21 has determined that the display of the search result is to be ended (YES in S28), the search process section 21 determines whether a log in the historical data 32 is to be erased which log corresponds to the keyword for which the search result has been displayed (S29).

For instance, in the case where the search result has been displayed in S27 with use of a screen as illustrated in FIG. 7, the search process section 21 determines, in the case where the key K8 has been selected, that (i) the display of the search result is to be ended (YES in S28) and that (ii) the log is to be erased (YES in S29). On the other hand, the search process section 21 determines, in the case where the key K5 has been selected in the screen example of FIG. 7, that (i) the display of the search result is to be ended (YES in S28) and that (ii) the log is not to be erased (NO in S29).

In the case where the search process section 21 has determined in S29 that the log is to be erased (YES in S29), the search process section 21 notifies the historical data generating section 22 to that effect. The historical data generating section 22, upon receipt of that notification, deletes the log from the historical data 32. For instance, in the case where the key K5 has been selected in the screen example of FIG. 7, the historical data generating section 22 deletes historical data corresponding to the keyword "コンプライアンス".

In S31, the search process section 21 instructs the reproduction process section 20 to resume reproduction of the content. This ends the display of the search result, and causes an image of the content to be displayed instead.

The reproduction process section 20, after resuming reproduction of the content, determines whether the moving image reproduction is to be ended (S32). In the case where the reproduction process section 20 has determined that the moving image reproduction is not to be ended (NO in S32), the process returns to S21. In the case where the reproduction process section 20 has determined that the content reproduction is to be ended (YES in S32), the process proceeds to S33, whereby the reproduction process section 20 ends the reproduction of the content. This ends the keyword display process.

The above example is arranged such that the electronic learning device 1, in the case where the current time point of reproduction of content matches a reproduction time point on which information is stored as historical data 32, displays the keyword associated with that reproduction time point. The electronic learning device 1 may, however, alternatively display a keyword before such a reproduction time point on which information is stored as historical data 32.

For instance, in the case where timing at which a keyword is displayed has been shifted to be before the reproduction position in the content at which reproduction position the input section 10 accepted an input operation for starting a search, the electronic learning device 1 can preferably reduce the difference between (i) the reproduction position in the content at which reproduction position a search became needed and (ii) the reproduction position at which a search was actually run.

[Variation of Storage Location for Dictionary Data]

The arrangement described above is an example in which dictionary data 31 is stored in the storage section 13 included in the electronic learning device 1. The dictionary data 31 may, however, be stored in another device as long as the electronic learning device 1 is arranged to be capable of presenting the user with the result of a search of the dictionary data 31. The present embodiment may further alternatively be arranged such that (i) the search of the dictionary data 31 also is carried out by a device other than the electronic learning device 1 and that (ii) the electronic learning device 1 obtains the result of that search.

Figure 10:
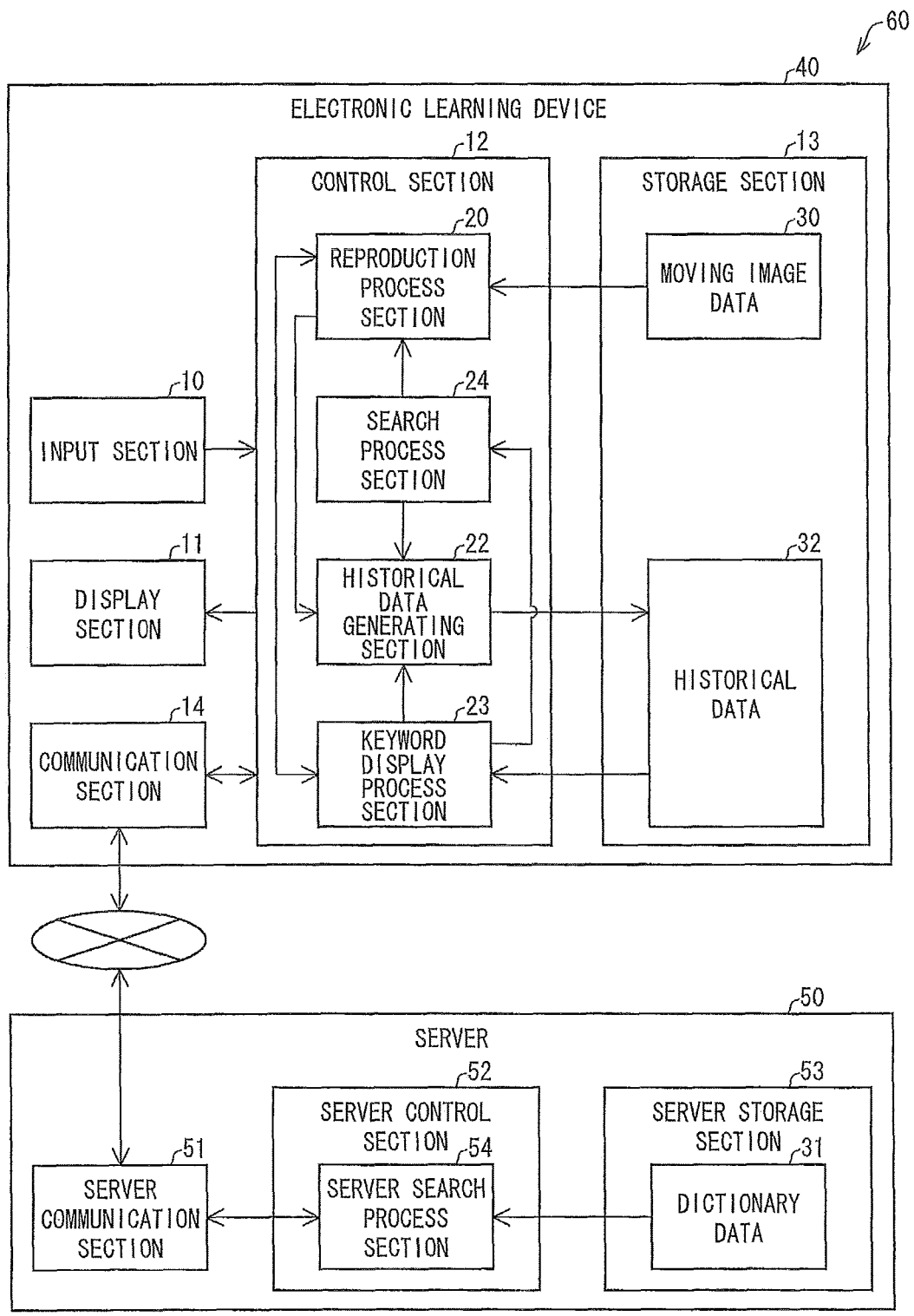
FIG. 10 is a block diagram illustrating respective main configurations of an electronic learning device and a server both included in an electronic learning system of an embodiment of the present invention.

With reference to FIG. 10, the description below deals with an example electronic learning system that causes another device to run a keyword search. FIG. 10 is a block diagram illustrating respective main configurations of an electronic learning device (content reproduction device) 40 and a server 50 both included in the electronic learning system 60. Members of the electronic learning system 60 that are similar to the respective corresponding members of the electronic learning device 1 illustrated in FIG. 1 are each assigned a common reference numeral, and are not described here.

The electronic learning device 40 differs from the electronic learning device 1 of FIG. 1 in that (i) it further includes a communication section 14, (ii) the search process section 21 is replaced by a search process section (search section, search result display section) 24, and (iii) the dictionary data 31 is not stored in the storage section 13.

The communication section 14 is a section through which the electronic learning device 40 communicates with another device. This example assumes that the electronic learning device 40 connects to a communication network through the communication section 14, and communicates with the server 50 over that communication network.

The search process section 24 causes an external device (in this example, the server 50) to run a search by a keyword, and displays the result of that search. Specifically, the search process section 24 causes the display section 11 to display a keyword input screen for input of a keyword. The search process section 24 next transmits, to the external device through the communication section 14, (i) a keyword the input of which has been accepted by the input section 10 while the keyword input screen was being displayed, (ii) information for specifying a database to be searched by that keyword, and (iii) an instruction to run a search by the keyword. The search process section 24 then receives the result of that search from the external device, and causes the display section 11 to display the search result.

The server 50 is a device that (i) runs a keyword search in response to an instruction by the electronic learning device 40 and that (ii) transmits the result of the keyword search to the electronic learning device 40. The server 50, as illustrated in FIG. 10, includes: a server communication section 51; a server control section 52; and a server storage section 53.

The server communication section 51 is a section through which the server 50 communicates with another device. This example assumes that the server communication section 51 communicates with the electronic learning device 40 over a communication network.

The server control section 52 centrally controls the operation of the server 50. The server control section 52 includes a server search process section 54. The server search process section 54 runs a keyword search in response an instruction by the electronic learning device 40.

The server storage section 53 stores various data for use by the server 50. The server storage section 53 stores dictionary data 31.

The electronic learning system 60 is arranged such that in the case where the user of the electronic learning device 40 has, during reproduction of content, performed an input operation for running a keyword search, the search process section 24 causes the display section 11 to display a keyword input screen for input of a keyword.

In the case where the user has inputted a keyword and performed an input operation for running a search, the search process section 24 transmits, to the server 50 through the communication section 14, (i) the keyword inputted, (ii) information for specifying a dictionary to be searched by that keyword, and (iii) an instruction to run a search by the keyword.

Upon receipt of the keyword, the specifying information, and the instruction by the server 50, the server search process section 54 (i) specifies the dictionary, specified by the information received, in the dictionary data 31 and (ii) searches the thus specified dictionary by the keyword received from the electronic learning device 40. The server search process section 54 then transmits the result of that search to the electronic learning device 40 through the server communication section 51.

Upon receipt of the search result by the electronic learning device 40, the search process section 24 causes the display section 11 to display the received search result, which allows the user to recognize the search result.

[Variation of Arrangement for Display of Search Result]

The above example is arranged such that in the case where a displayed keyword has been selected during reproduction of content, the search by the selected keyword is run again for display of the search result. The present embodiment, however, simply needs to be arranged such that the electronic learning device 1 or 40 is capable of displaying, in the case where a displayed keyword has been selected during reproduction of content, the result of a search based on that selected keyword, and is not limited by the above example.

The present embodiment may be arranged such that, for instance, the historical data 32 includes the search result. This arrangement makes it possible to (i) obtain a search result from the historical data 32 in the case where a keyword has been selected, and (ii) display the search result without running a search again. The present embodiment may further be arranged such that, for instance, (i) the search result is stored separately from the historical data 32 and (ii) the historical data 32 includes information (for example, the address or the like of the storage location for the search result) for access to the search result.

In the case where a search is run of an external database in particular, as in the example of FIG. 10, it can take a long time to run such a search again. The search result is thus preferably stored inside the electronic learning device 40.

[Database as Search Target]

The above example is arranged to search, by a keyword, any of the three databases of a Japanese-language dictionary, an English-Japanese dictionary, and a Japanese-English dictionary. The databases for use in a search are, however, not limited to those example databases. The present embodiment may use, for example, (i) a database such as a reference book (for example, an encyclopedia) and a character dictionary or (ii) a database such as a dictionary of a foreign language other than English. The present embodiment may further alternatively, for instance, search a database provided on a network such as the Internet.

In the case where a search is run of a database on a network, the user may, in order to obtain a desired search result, (i) add another keyword for that search or (ii) apply a search condition for that search.

To run such a search, the present embodiment simply needs to be arranged such that the historical data 32 includes information (for example, an address or the like) for access to the final search result. The present embodiment may alternatively be arranged such that the historical data 32 includes the search condition, in which case a search is run again under the search condition included in the historical data 32.

Embodiment 2

The description below deals in detail with another embodiment of the present invention with reference to FIGS. 11 through 25. The following first describes an arrangement of an electronic learning device of the present embodiment with reference to FIG. 11. FIG. 11 is a block diagram illustrating a main configuration of the electronic learning device (content reproduction device) 1.

The electronic learning device 1 is a device for reproducing content, and as illustrated in FIG. 11, includes: an input section 10; a display section 11 for displaying an image; a control section 12; and a storage section 13.

The input section 10 accepts an input operation by the user. The user controls the operation of the electronic learning device 1 through the input section 10. The present embodiment assumes that the input section 10 is a so-called touch panel that (i) detects an input operation performed with respect to a display surface of the display section 11 and (ii) accepts the input operation thus detected. The input section 10 is, needless to say, simply required to be capable of accepting an input operation by the user, and may include, for example, an entry key and/or a keyboard. Further, the present embodiment describes an example in which the input section 10 is included in the electronic learning device 1. The input section 10 may alternatively be a device separate from the electronic learning device 1.

The display section 11 displays an image under control of the control section 12, and may be, for example, a liquid crystal display device or an EL display device. The display section 11 may alternatively be, as with the input section 10, a device separate from the electronic learning device 1.

The control section 12 centrally controls the operation of the electronic learning device 1, and includes: a reproduction process section 20; a search process section (search section, search result display section) 21; a historical data generating section (historical data deleting section) 22; a keyword display process section 23; a dictionary display sequence deciding section (priority data generating section, use history data generating section) 28; a content type determining section (attribute specifying section) 25; and a dictionary key display process section (object display section) 26.

The reproduction process section 20 carries out a process of reproducing content. Specifically, the reproduction process section 20 (i) reads, from the storage section 13, content corresponding to the content of an input operation accepted by the input section 10, and (ii) causes the display section 11 to display that corresponding content. The present embodiment assumes that the reproduction process section 20 reproduces content of a moving image. The reproduction process section 20 may alternatively (i) carry out a slide-show display of content including still images or (ii) reproduce content including a sound. In the case where content to be reproduced includes a sound, the reproduction process section 20 outputs the sound of the content from a loudspeaker (not shown).

The search process section 21 (i) searches a database by a keyword inputted while the reproduction process section 20 is reproducing content, and (ii) displays, as a search result, an image based on data detected. Specifically, the search process section 21 (i) causes the display section 11 to display a keyword input screen for input of a keyword, (ii) searches a database by a keyword the input of which has been accepted by the input section 10 while the keyword input screen was being displayed, and (iii) causes the display section 11 to display the result of the search. The present embodiment assumes that the database to be searched is dictionary data stored in the storage section 13.

The historical data generating section 22 generates historical data indicative of a history of keyword searches. Specifically, the historical data generating section 22 (i) generates historical data that associates (a) position information indicative of a position (reproduction position relative to the top of the content) in the content at which position the content was being reproduced when a keyword search was run with (b) access information for access to the result of the search based on that keyword, and (ii) stores the historical data in the storage section 13. The historical data generating section 22 further associates, in addition to the position information and the access information, the keyword, used in the search, with the above historical data.

The present embodiment assumes that the position information is information on a time point of reproduction of content and that the access information is (i) a dictionary ID indicative of a database as a search target and (ii) a keyword ID indicative of a keyword used in the search.

Needless to say, (i) the position information simply needs to indicate a position in the content at which position the content was being reproduced when a keyword search was run, and is not limited to the above example, and (ii) the access information simply needs to allow access to the search result, and is not limited to the above example. The access information may be, for example, a combination of information for specifying a keyword and information for specifying a dictionary.

The keyword display process section 23, while content is being reproduced, causes the display section 11 to display, at the timing of a past keyword search, the keyword used in the search. Specifically, the keyword display process section 23 (i) refers to historical data, stored by the historical data generating section 22, to specify the timing of a past keyword search and the keyword used in the search, and (ii) carries out the above display.

The keyword display process section 23, in the case where a displayed keyword has been selected, (i) refers to the access information in the historical data to obtain the result of the search based on that keyword, and (ii) displays the search result. Specifically, the keyword display process section 23, in the case where a displayed keyword has been selected, (i) notifies the search process section 21 of the selected keyword and the database searched by that keyword, (ii) causes the search process section 21 to search the database by the keyword, and (iii) causes the search process section 21 to display the result of the keyword search.

The dictionary display sequence deciding section 28 decides on a sequence for providing, to the user of the electronic learning device 1, one of the dictionaries to be used for a search by the search process section 21. Specifically, the dictionary display sequence deciding section 28 (i) generates and updates use history compilation data indicative of a use history of dictionaries, and (ii) with use of the use history compilation data, generates dictionary display sequence data for defining priority of display of the dictionaries. The use history compilation data and the dictionary display sequence data will be described later in detail.

The content type determining section 25 determines the type of content being reproduced by the reproduction process section 20, and notifies the dictionary key display process section 26 of the result of the determination. The type of content refers to an attribute of that content which attribute serves as a criterion for determining what dictionaries are to be presented to the user during reproduction of the content.

Specifically, the present embodiment assumes that the type of content refers to the subject to which that content belongs. On the basis of the subject, the electronic learning device 1 can specify, to some extent, dictionaries to be presented during reproduction of the content. Needless to say, the content type that is determined by the content type determining section 25 simply needs to be a content attribute that allows the electronic learning device 1 to specify, to some extent, dictionaries to be presented during reproduction of the content, and is not limited to the above example.

The dictionary key display process section 26 decides, in correspondence with the content type determined by the content type determining section 25, on a dictionary to be assigned to a dictionary key. The dictionary key display process section 26 displays dictionary keys (objects) in a display sequence decided on by the dictionary display sequence deciding section 28.

Specifically, the dictionary key display process section 26 (i) specifies, with reference to type-dictionary correspondence data that associates content types with dictionaries, dictionaries corresponding to the content type determined by the content type determining section 25 and (ii) presents the user preferentially with dictionary keys corresponding to the respective dictionaries. The dictionary key display process section 26, with reference to dictionary display sequence data generated by the dictionary display sequence deciding section 28, displays preferentially (i) a dictionary key corresponding to a dictionary that is early in the display sequence over (ii) a dictionary key corresponding to a dictionary that is later in the display sequence.

The storage section 13 stores various data for use by the electronic learning device 1. The storage section 13 stores moving image data (content) 30, dictionary data (database) 31, historical data 32, use history compilation data (use history data) 33, dictionary display sequence data (priority data) 34, and type-dictionary correspondence data (correspondence information) 35.

The moving image data 30 is moving image data of content to be reproduced by the reproduction process section 20. The reproduction process section 20 reads and reproduces the moving image data 30. The present embodiment describes an example in which the moving image data 30 is stored in the storage section 13. The moving image data 30, however, simply needs to be stored such that the reproduction process section 20 can reproduce it. The moving image data 30 may be stored in, for example, an external memory device connected to the electronic learning device 1. The moving image data 30 may alternatively be stored in, for example, a device, such as a server, that is communicably connected to the electronic learning device 1. In this alternative case, the moving image data 30 may be (i) downloaded to the electronic learning device 1 for reproduction or (ii) reproduced by streaming without being downloaded.

The dictionary data 31 is a database to be searched by the search process section 21 by a keyword. The present embodiment assumes that the storage section 13 stores, as the dictionary data 31, respective databases of a plurality of dictionaries such as an English-Japanese dictionary and a Japanese-language dictionary. These databases each include (i) entry words (that is, words as a target of a keyword search) and (ii) data indicative of the meaning and/or the like of each entry word, the entry words and the data being associated with each other. This makes it possible to, by running a search by a keyword identical to an entry word, access data associated with that entry word and indicative of the meaning and/or the like of the entry word.

The historical data 32 is, as described above, data generated and stored by the historical data generating section 22. The historical data 32 is data including, in association with each other, (i) information on a time point of reproduction of content at which time point a keyword search was run and (ii) access information for access to the result of the search based on that keyword.

The use history compilation data 33 indicates a use history for a dictionary. The present embodiment assumes that the electronic learning device 1 (i) refers to the use history compilation data 33 to specify the use frequency for each dictionary and (ii) decides on a sequence of display of dictionaries on the basis of the use frequency. The use history compilation data 33 thus simply needs to include frequency information indicative of the use frequency for each dictionary.

The dictionary display sequence data 34 is data indicative of a sequence of display of dictionaries. The dictionary display sequence data 34 is, as described above, generated on the basis of the use history compilation data 33. Specifically, the dictionary display sequence data 34 is so generated that a dictionary with a higher count in the use history compilation data 33 has a higher value for a sequence.

The electronic learning device 1 decides on a sequence of display of dictionaries with reference to the dictionary display sequence data 34. The dictionary display sequence data 34 can thus be described as priority data that sets, for each dictionary, priority in presenting the user with that dictionary.

The type-dictionary correspondence data 35 is data that associates content types with dictionaries. The electronic learning device 1, as described above, refers to the type-dictionary correspondence data 35 to specify dictionaries corresponding to the type of content being reproduced.

[Historical Data 32]

The historical data 32 may be, for example, data as shown in FIG. 3 referred to in the embodiment above. FIG. 3 is a diagram illustrating an example of the historical data 32. The historical data 32 of FIG. 2 is data generated for content named "Training Moving Image 1-1", and is data that associates the items "Number", "Reproduction Time Point", "Dictionary Used", "Keyword", "Dictionary ID", and "Keyword ID" with one another.

The use of the above historical data 32 makes it possible to, when the "Training Moving Image 1-1" is reproduced, display, at the timing of a past keyword search, the keyword used in that keyword search. This in turn makes it possible to, in the case where a displayed keyword has been selected, run a search by that keyword again to display the result of the search.

The historical data 32 simply needs to allow the electronic learning device 1 to (i) display, at the timing of a past keyword search, the keyword used in that search and (ii) in the case where a displayed keyword has been selected, display the result of the search based on that keyword. The historical data 32 is thus not limited to the example of FIG. 3.

Specifically, FIG. 3 shows an example in which the historical data 32 includes a dictionary ID and a keyword ID as information for access to the result of a search based on a keyword. The historical data 32, however, simply needs to include (i) position information indicative of a reproduction position reached when a search was run and (ii) access information for access to the result of the search, and is not limited to the above example. The access information may, for example, be only information indicative of a keyword and a dictionary used, or may be information (for example, an address) indicative of a storage position for a search result.

[Use History Compilation Data 33]

The use history compilation data 33 may be data as shown in FIG. 12. FIG. 12 is a diagram illustrating an example of the use history compilation data 33. The use history compilation data 33 shown in FIG. 12 is data that associates dictionary IDs with respective counts. In other words, the use history compilation data 33 shown in FIG. 12 is a counter that counts the number of use of each dictionary.

With reference to the use history compilation data 33 as above, the electronic learning device 1 can specify a dictionary having a high use frequency. This arrangement allows the electronic learning device 1 to present the user with preferentially (i) a dictionary having a high use frequency over (ii) a dictionary having a low use frequency.

The use history compilation data 33 simply needs to associate (i) information for specifying each dictionary with (ii) information indicative of the use frequency for that dictionary, and is not limited to the above example shown in FIG. 12. The use history compilation data 33 may include, for example, dictionary names instead of dictionary IDs. Further, the use history compilation data 33 may, for example, include, instead of information on use counts, information indicative of how high or low the use frequency is, such as "high", "middle", and "low".

The present embodiment assumes that the electronic learning device 1 generates use history compilation data 33 with use of historical data 32. Specifically, the electronic learning device 1 generates use history compilation data 33 as shown in FIG. 12 by (i) counting, for each "Dictionary ID" included in the historical data 32, instances of "Reproduction Time Point" recorded and (ii) associating the dictionary ID with the count of the instances.

[Dictionary Display Sequence Data 34]

The dictionary display sequence data 34 may be data as shown in FIG. 13. FIG. 13 is a diagram illustrating an example of the dictionary display sequence data 34. The dictionary display sequence data 34 shown in FIG. 13 is data that associates (i) a numerical value indicative of the order (priority) of display of a dictionary with (ii) a dictionary name.

The example illustrated in FIG. 13 assumes that the electronic learning device 1 presents dictionaries (that is, assigns dictionaries to respective dictionary keys) in ascending order of the numerical value indicative of the display sequence. The dictionary display sequence data 34 simply needs to allow the display order for each dictionary to be specified, and is not limited to the example shown in FIG. 13. The dictionary names may, for instance, be replaced by information, such as a dictionary ID, for specifying each dictionary.

The present embodiment assumes that the dictionary display sequence deciding section 28 generates dictionary display sequence data 34 with use of use history compilation data 33. The present embodiment may alternatively be arranged such that the dictionary display sequence data 34 is stored in advance in the storage section 13 to deal with the case in which no search has been run before with the electronic learning device 1.

The present embodiment may further alternatively be arranged such that the dictionary display sequence data 34 has values that can be set or changed through the user's operation. This arrangement allows the electronic learning device 1 to present dictionaries in a display sequence preferred by the user.

[Type-Dictionary Correspondence Data 35]

The type-dictionary correspondence data 35 may be data as shown in FIG. 14. FIG. 14 is a diagram illustrating an example of the type-dictionary correspondence data 35. The type-dictionary correspondence data 35 illustrated in FIG. 14 is data that associates content types with dictionary names.

The example shown in FIG. 14 includes "Japanese", "English", and "Social" as the type. This example assumes that the content type refers to a "subject". Each subject is associated with reference books each having a high use frequency for that subject.

Specifically, (i) the type "Japanese" is associated with "Japanese-Language Dictionary K", "Japanese-Language Dictionary D", and "Japanese-Language Dictionary M", (ii) the type "English" is associated with "English-Japanese Dictionary G", "English-Japanese Dictionary P", and "English-English Dictionary O", and (iii) the type "Social" is associated with "People Reference Book A", "Map B", and "Map C". Data of these dictionaries and reference books is stored in the storage section 13 as dictionary data 31. Data of the above maps is also stored in the storage section 13 as dictionary data 31. The database of a map is a database that is searched by a keyword such as a place name so that a map including that keyword such as a place name is presented as the result of the search.

The use of the type-dictionary correspondence data 35 allows the electronic learning device 1 to specify, for example, dictionaries corresponding to the type of content being reproduced. In the case where, for instance, the content being reproduced is content of "Japanese", the electronic learning device 1 can specify that dictionaries to be displayed are "Japanese-Language Dictionary K", "Japanese-Language Dictionary D", and "Japanese-Language Dictionary M".

The example shown in FIG. 14 associates each dictionary with a number. This number is used to manage dictionaries associated with each subject.

[Example Operation of Electronic Learning Device 1 (Generation and Recording of Historical Data)]

Figure 15:
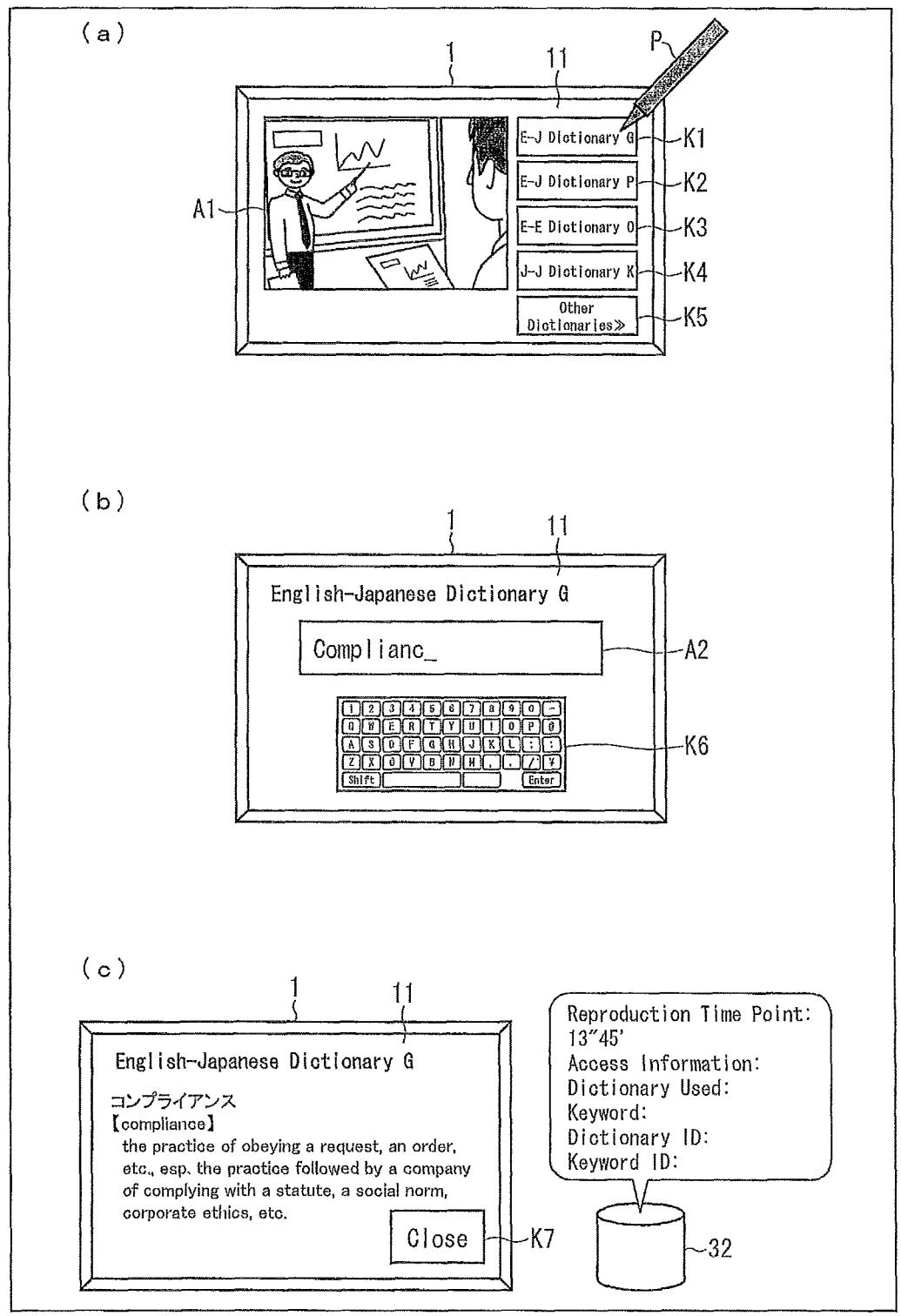
FIG. 15 shows diagrams illustrating an example operation of the electronic learning device, where (a) illustrates an operation example observed before a dictionary is selected, (b) illustrates an operation example observed when a keyword search is run with use of a selected dictionary, and (c) illustrates an operation example observed after a keyword search is run.

The description below deals with an example operation of the electronic learning device 1 with reference to FIG. 15. FIG. 15 shows diagrams illustrating an example operation of the electronic learning device 1, where (a) illustrates an operation example observed before a dictionary is selected, (b) illustrates an operation example observed when a keyword search is run with use of a selected dictionary, and (c) illustrates an operation example observed after a keyword search is run.

The example of (a) of FIG. 15 displays an image of content in an image display region A1. This example assumes that (i) the content being reproduced is content for learning English conversation and that (ii) an image of that content is displayed in the image display region A1.

The example of (a) of FIG. 15 further displays keys K1 to K5 next to the image display region A1. The keys K1 to K5 are so-called software keys: Performing a touching operation with respect to the keys K1 to K5 with use of, for example, a touch pen P or a finger can cause the electronic learning device 1 to carry out respective processes assigned in advance to the keys K1 to K5.

The keys K1 to K4 are each a dictionary key for calling a dictionary. Dictionaries assigned to the respective dictionary keys are determined in correspondence with the content being reproduced, and are each assigned as such to a dictionary key on the basis of priority corresponding to the use frequency for that dictionary.

Since this example assumes that the content being reproduced is content related to English, the English-Japanese dictionary G, the English-Japanese dictionary P, the English-English dictionary O, and the Japanese-language dictionary K, which are all likely to be consulted for English studies, are assigned to the keys K1 to K4, respectively. These dictionaries are assigned in a sequence of use frequency.

This example, in other words, assigns a dictionary with the highest use frequency (that is, the English-Japanese dictionary G) to the key K1, which is displayed at the top of the screen and which can thus be easily noticed and selected by the user. This example further assigns the English-Japanese dictionary P, the English-English dictionary O, and the Japanese-language dictionary K to the keys K2 to 4, respectively, in the sequence of use frequency.

The dictionary keys simply need to be so displayed that a dictionary key corresponding to a dictionary having high display priority is more easily selected by the user than a dictionary key corresponding to a dictionary having low priority. The display of the dictionary keys is thus not limited to the example shown in FIG. 15. The dictionary key corresponding to a dictionary having high priority may be highlighted when displayed. The dictionary key may, for instance, (i) be varied in color from other dictionary keys, (ii) blink, or (iii) be displayed to be larger in size than other dictionary keys.

A touching operation performed with respect to a dictionary key causes the electronic learning device 1 to display a screen for running a keyword search in the dictionary associated with that dictionary key. This arrangement allows the user to, in the case where the user has, during a study, encountered, for example, a term or word of which the user wants to look up the meaning, easily run a search by that term or word. Further, the above arrangement, which displays dictionaries corresponding to the currently reproduced content in a sequence of use frequency, allows the user to easily select the user's desired dictionary.

The key K5 is a switch key for switching dictionaries each serving as a selection target. A touching operation performed with respect to this switch key causes the electronic learning device 1 to display dictionary keys for other candidate dictionaries usable for the search. Performing an operating with respect to this switch key allows the user to select (i) a dictionary having low relevance to the content being reproduced or (ii) a dictionary having low use frequency.

Performing a touching operation with respect to the key K1 causes the electronic learning device 1 to (i) temporarily stop reproduction of content and (ii) display a screen as illustrated in (b) of FIG. 15. The example illustrated in (b) of FIG. 15 displays (i) the name ("English-Japanese Dictionary G") of the dictionary to be used for the keyword search and (ii) a keyword display region A2 and a keyboard K6.

The example of (b) of FIG. 15 assumes that the user (i) selects, with use of, for example, a touch pen P, characters and/or the like included in the keyboard K6, and thus (ii) inputs characters constituting a keyword (that is, a term that the user wants to look up in a dictionary) to be used in a search. The inputted characters are displayed in the keyword display region A2. Selecting "Enter" in the keyboard K6 causes the electronic learning device 1 to run a search on the basis of the inputted character string as a keyword.

The example of (b) of FIG. 15 assumes that the user types in "Compliance" and starts a search by that entry (presses the "Enter" key). This operation causes the electronic learning device 1 to carry out a display as illustrated in (c) of FIG. 15. The example of (c) of FIG. 15 displays (i) the name of the dictionary used for the keyword search, (ii) the result of the search for "Compliance" in that dictionary, and (iii) a key K7 for ending the display of the dictionary search result and returning to reproduction of the content.

The electronic learning device 1, in the case where such a keyword search has been run, generates historical data 32 that includes, in association with each other, (i) information on a time point of reproduction of the content which time point was reached when the keyword search was run and (ii) access information for access to data indicative of the result of the keyword search. This example assumes that the access information is a combination of (i) the dictionary ID of the dictionary as a target of the keyword search, (ii) the keyword used in the search, and (iii) the keyword ID of the keyword.

The electronic learning device 1, in the case where the content is reproduced for the next time, (i) refers to the above historical data 32 and (ii) displays, at the timing of the past keyword search, the keyword used in the search. The following describes an example operation carried out in the case where a keyword is displayed.

[Example Operation of Electronic Learning Device 1 (Displaying Keyword)]

Figure 16:
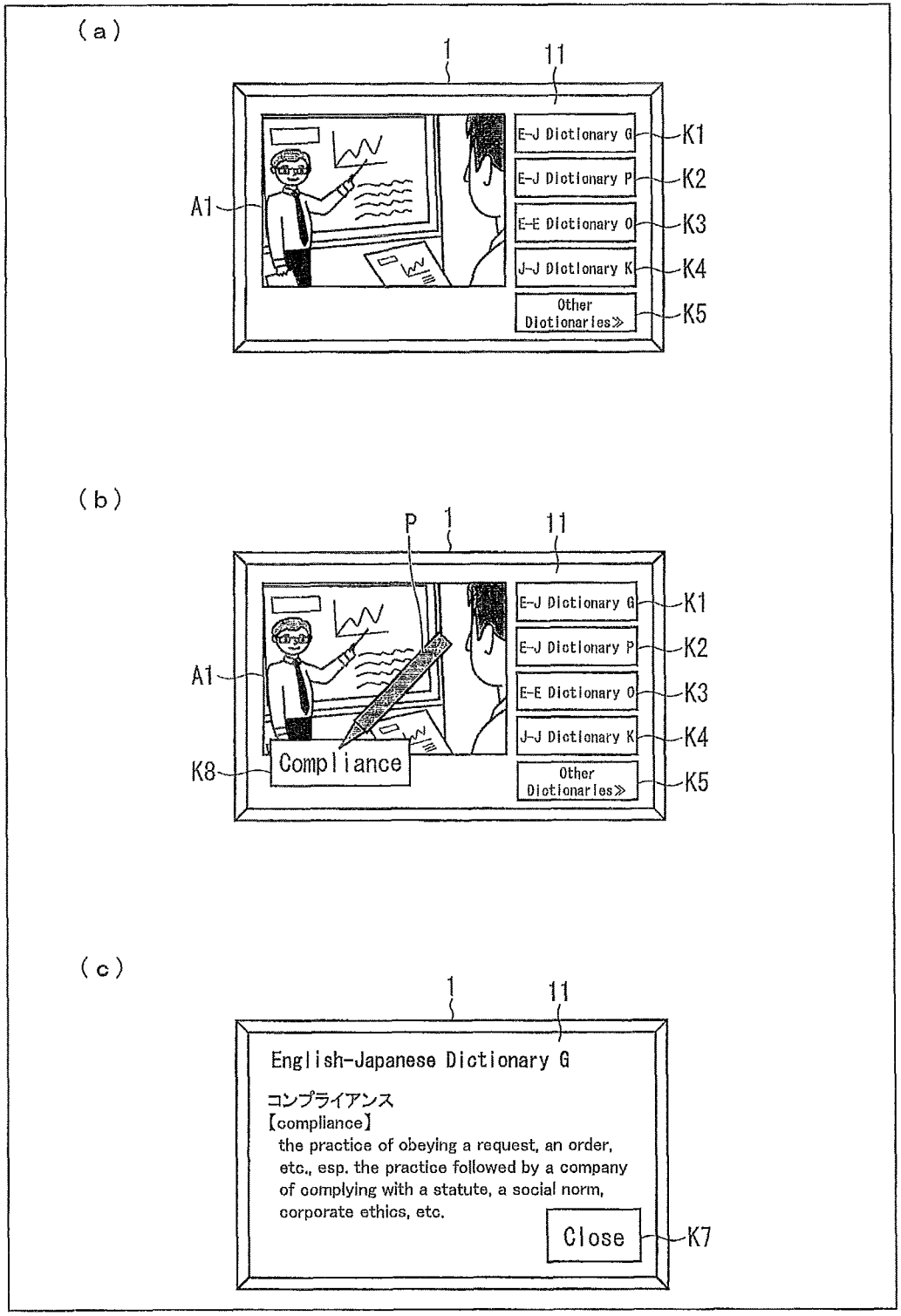
FIG. 16 shows diagrams illustrating an example operation of the electric learning device for displaying a keyword during reproduction of content, where (a) illustrates a screen example observed when no keyword is displayed, (b) illustrates a screen example observed when a keyword is displayed, and (c) illustrates a screen example observed when a displayed keyword has been selected.

With reference to FIG. 16, the description below deals with an example operation of the electronic learning device 1 for displaying a keyword on the basis of historical data 32. FIG. 16 shows diagrams illustrating an example operation of the electronic learning device 1 for displaying a keyword during reproduction of content, where (a) illustrates a screen example observed when no keyword is displayed, (b) illustrates a screen example observed when a keyword is displayed, and (c) illustrates a screen example observed when a displayed keyword has been selected.

As illustrated in (a) of FIG. 16, the electronic learning device 1, when no keyword is displayed, displays (i) an image of content in the image display region A1 and (ii) the keys K1 to K5, as in the example of (a) of FIG. 15.

The electronic learning device 1 monitors a current time point of reproduction of the content for whether the current reproduction time point matches a reproduction time point on which information is stored as historical data 32. The electronic learning device 1, in the case where it has determined that the two reproduction time points match, displays a keyword associated with the reproduction time point that matches the current reproduction time point. When, for instance, the current reproduction time point has reached a reproduction time point associated with the keyword "Compliance", the electronic learning device 1 displays the key K8 showing the keyword "Compliance" as illustrated in (b) of FIG. 16.

In the case where the displayed key K8 has been selected with use of a touch pen P, a finger or the like, the electronic learning device 1 displays the result of the search based on the keyword "Compliance" as illustrated in (c) of FIG. 16.

As described above, the electronic learning device 1 displays, at timing of a past keyword search, the keyword used in that search. This keyword is something by which the user searched the dictionary data 31 in the past. Thus, in the case where the user currently remembers the meaning and/or the like of that keyword, there is no need to display again the result of the search based on that keyword, and reproduction of content is desirably continued. The user may, on the other hand, have forgotten the result of a past search.

In view of the above point, the electronic learning device 1, (i) in the case where a displayed keyword has not been selected, does not display the result of a search based on that keyword, and (ii) in the case where a displayed keyword has been selected, does display the result of a search based on that keyword.

With the above arrangement, the user can, in the case where the user has determined that the search result does not need to be displayed, cause content reproduction to continue. Further, the above arrangement displays only a keyword, and does not prevent content viewing. The above arrangement thus allows the user to, in the case where the user wants to see the search result, see the search result without having to take the trouble of inputting characters as illustrated in (b) of FIG. 15.

The electronic learning device 1 may display a search result instead of a keyword. However, in the case where the search result is a long passage, such a search result will prevent content viewing and make it difficult for the user to determine whether the user remembers the result of the search based on the keyword. The electronic learning device 1 thus preferably displays a keyword and, in the case where that keyword has been selected, displays the corresponding search result.

The electronic learning device 1 is simply required to display a keyword in such a manner as to allow the user to recognize that keyword. The manner is thus not limited to that illustrated in the example of (b) of FIG. 16. The electronic learning device 1 may display a keyword in such a manner that, for instance, the keyword is superimposed on an image of content as in subtitles.

In the case where the electronic learning device 1 stores a plurality of keywords in correspondence with a single reproduction time point or with reproduction time points close to each other, the electronic learning device 1 may display such a plurality of keywords simultaneously as in the example of FIG. 17. FIG. 17 is a diagram illustrating an example of displaying a plurality of keywords simultaneously.

The example of FIG. 17 displays the keyword "CSR" in addition to the keyword "Compliance". The user can select either of those keywords. Selecting a keyword allows the user to see the result of a search based on that keyword.

The user may, after selecting a displayed keyword and seeing the result of a search based on that keyword, determine that the keyword does not need to be displayed when the same content is reproduced for the next time. The user can, as a result of repeated reproduction of the content, acquire firmly established knowledge. Thus, the user can preferably change, in correspondence with how well the user's knowledge is firmly established, keywords to be displayed.

The electronic learning device 1 may, for instance, display a screen as illustrated in FIG. 18 and allow the user to select whether to delete a log from the historical data 32. FIG. 18 is a diagram illustrating an example display screen that allows the user to select whether to delete a log from the historical data 32.

The example of FIG. 18 displays (i) the key K7 showing the word "Close" as in the example of (c) of FIG. 16 and (ii) a key (deletion object) K10 showing the word "Delete". The user can select the key K10 to delete the data on the entry "Compliance" from the historical data 32. The electronic learning device 1 will, in consequence, not display the keyword "Compliance" when the same content is reproduced for the next time.

The timing at which the key K10 for deleting historical data is displayed is not limited to the above example. The key K10 may be displayed at timing at which, for instance, the keyword is displayed. This arrangement allows the user to delete historical data on a keyword even without seeing the corresponding search result.

In the case where a displayed keyword has not been selected, that may indicate that the user has determined that the result of a search based on that keyword does not need to be displayed. The electronic learning device 1 may thus alternatively be arranged to delete historical data 32 on a keyword that has not been selected.

[Process Flow]

Figure 19:
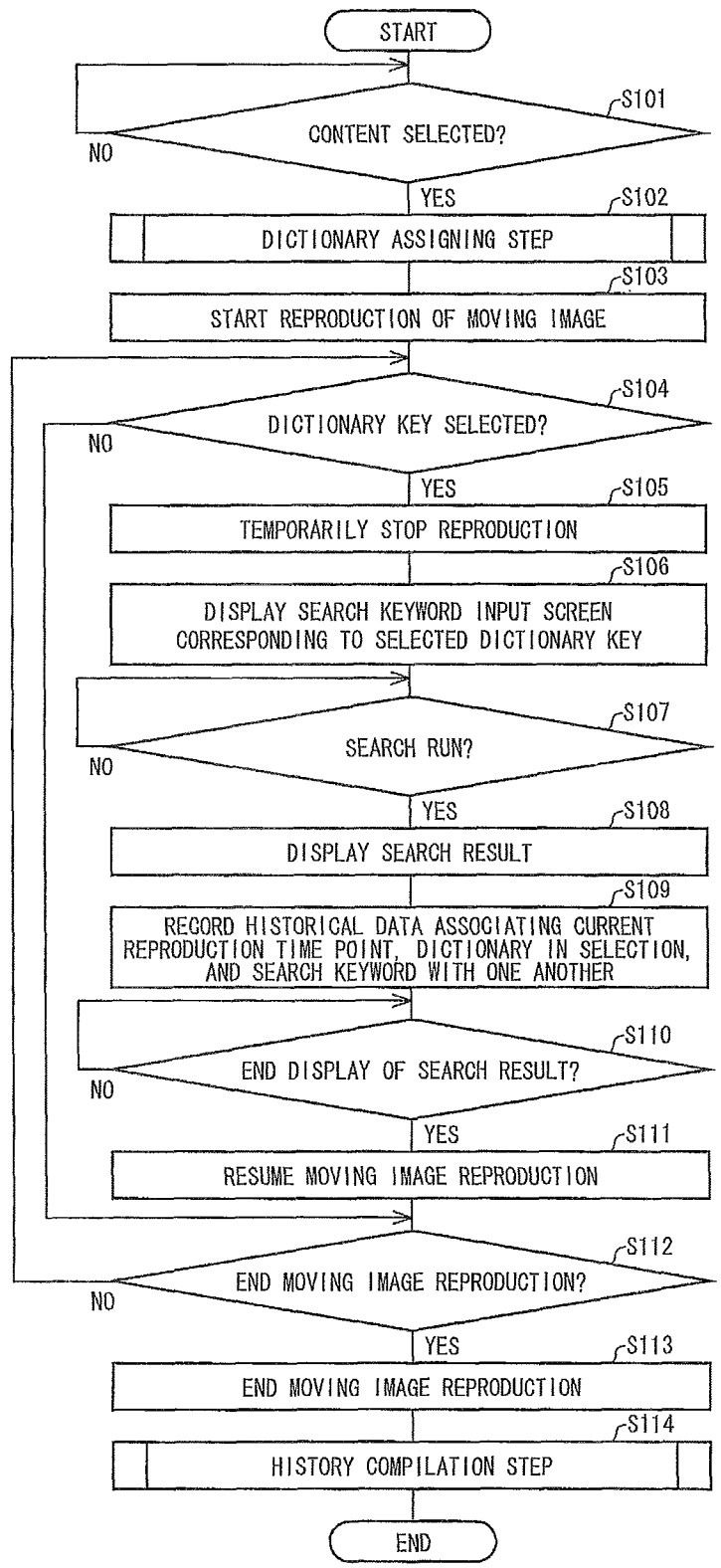
FIG. 19 is a flowchart illustrating an example of a process carried out by the electronic learning device.

With reference to FIG. 19, the description below deals with the flow of a process carried out by the electronic learning device 1. FIG. 19 is a flowchart illustrating an example process carried out by the electronic learning device 1.

The reproduction process section 20 waits for selection of content to be reproduced (S101). Upon recognition of a content reproduction instruction on the basis of an input operation performed with respect to the input section 10

(YES in S101), the reproduction process section 20 notifies the content type determining section 25 to that effect. The content type determining section 25, upon receipt of that notification, carries out a dictionary assigning step to assign dictionaries to respective dictionary keys (S102). The dictionary assigning step will be described later in detail.

The reproduction process section 20, upon recognition of a content reproduction instruction, (i) reads, from the moving image data 30 in the storage section 13, the content that the reproduction process section 20 has been instructed to reproduce and (ii) starts reproduction of the content (S103). This example assumes that the content to be reproduced is content of a moving image.

The search process section 21 waits for selection of a dictionary key to which a dictionary has been assigned in S102 (S104). Upon recognition that a dictionary key has been selected (YES in S104), the search process section 21 causes the reproduction process section 20 to temporarily stop reproduction of the content (S105). The process then proceeds to S106. In the case where the search process section 21 has not recognized that a dictionary key has been selected (NO in S104), the process proceeds to S112.

In S106, the search process section 21 causes the display section 11 to display a keyword input screen corresponding to the dictionary key selected, that is, a keyword input screen for a search that uses the dictionary assigned to the dictionary key selected (S106), and waits for a search to be run (S107).

In the case where, for instance, the user has selected a dictionary key assigned to a dictionary, such as an English-Japanese dictionary, for which a keyword is to be inputted in the English alphabet, the search process section 21 causes the display section 11 in S106 to display a keyword input screen for English alphabet input. Similarly, in the case where the user has selected a dictionary key assigned to a dictionary, such as a Japanese-English dictionary, for which a keyword is to be inputted in the Japanese kana characters, the search process section 21 causes the display section 11 in S106 to display a keyword input screen for Japanese kana input.

Upon input of a keyword and an instruction to run a search, the search process section 21 (i) searches, by that keyword, the dictionary assigned to the dictionary key selected in S104 and (ii) causes the display section 11 to display the result of that search (S108). Further, the search process section 21 notifies the historical data generating section 22 of the keyword used in the search, the keyword ID of the keyword, and the dictionary ID of the dictionary used for the search.

The historical data generating section 22, upon the above notification, obtains from the reproduction process section 20 information on a current time point of reproduction of the content, that is, a reproduction time point at which the reproduction process section 20 temporarily stopped the content reproduction in S105. The historical data generating section 22 then (i) generates historical data 32 including, in association with one another, the obtained reproduction time point and the keyword, keyword ID, and dictionary ID of which the historical data generating section 22 has been notified by the search process section 21, and (ii) stores the historical data 32 in the storage section 13 (S109).

The search process section 21, after displaying the search result in S108, determines whether the display of the search result is to be ended (S110). In the case where the search process section 21 has determined that the display of the search result is to be ended (YES in S110), the search process section 21 instructs the reproduction process section 20 to resume reproduction of the content. This ends the display of the search result and causes the display section 11 to display an image of the content instead (S111).

The reproduction process section 20, after resuming reproduction, determines whether the moving image reproduction is to be ended (S112). In the case where the reproduction process section 20 has determined that the moving image reproduction is not to be ended (NO in S112), the process returns to S104. In the case where the reproduction process section 20 has determined that the moving image reproduction is to be ended (YES in S112), the process proceeds to S113, whereby the reproduction process section 20 ends the reproduction of the moving image. Further, the reproduction process section 20 notifies the dictionary display sequence deciding section 28 to the effect that the moving image reproduction is to be ended.

The reproduction process section 20, in the case where in S112 (i) it has reproduced the currently reproduced content until the content reaches its end time point or (ii) the input section 10 has accepted an input operation to the effect that the reproduction is to be ended, determines that the moving image reproduction is to be ended.

Upon receipt of the notification to the effect that the moving image reproduction is to be ended, the dictionary display sequence deciding section 28 carries out a history compilation step (S114). This allows the use history compilation data 33 to include a history of the search run during reproduction of content. The history compilation step will be described later in detail.

The reproduction process section 20 may resume the reproduction in S111 from a position in the content at which position the reproduction was stopped, or alternatively from a reproduction position before (that is, closer to the top of the content) the position at which the reproduction was stopped (that is, the reproduction position reached when an input operation for starting a search was performed). This alternative arrangement takes into consideration the difference between (i) the timing at which a search becomes needed (for instance, the time at which the user encounters a term that the user does not know) and (ii) the timing at which the user performs an input operation for starting a search. In the case where the content reproduction is resumed from a position before a reproduction position in the content at which position a search became needed, the user can, with the understanding of the search result, go through the scene that necessitated a search (for instance, a scene in which the user encountered a term that the user did not know). This arrangement allows the user to deepen the user's understanding of the content.

[Keyword Display Process]

The description below deals with a keyword display process, through which the electronic learning device 1 displays a keyword. Since this keyword display process is similar to the process of FIG. 9 referred to in the embodiment above, the description below also refers to FIG. 9. The keyword display process is a process that is carried out during reproduction of content.

The reproduction process section 20, upon recognition of a content reproduction instruction on the basis of an input operation performed with respect to the input section 10, (i) reads, from the moving image data 30 in the storage section 13, the content that the reproduction process section 20 has been instructed to reproduce and (ii) starts reproduction of the content (S20).

The keyword display process section 23, after the start of the content reproduction, refers to the historical data 32 to determine whether the historical data 32 includes information on a reproduction time point that matches the current time point of reproduction of the content (S21).

In the case where the keyword display process section 23 has determined that the historical data 32 includes no information on a reproduction time point that matches the current time point of reproduction of the content (NO in S21), the process proceeds to S32. In the case where the keyword display process section 23 has determined that the historical data 32 includes information on a reproduction time point that matches the current time point of reproduction of the content (YES in S21), the keyword display process section 23 specifies a keyword in the historical data 32 which keyword is associated with the reproduction time point that matches the current time point of reproduction of the moving image data. The keyword display process section 23 then causes the display section 11 to display the keyword thus specified (S22). The keyword display process section 23 then determines whether the displayed keyword has been selected (S23).

In the case where the keyword display process section 23 has determined that the displayed keyword has not been selected (NO in S23), the keyword display process section 23 determines whether a predetermined time period has elapsed after the display of the keyword (S24).

In the case where the keyword display process section 23 has determined that the predetermined time period has elapsed (YES in S24), the keyword display process section 23 ends the display of the keyword (S25). The process then proceeds to S32. In the case where the keyword display process section 23 has determined that the predetermined time period has not elapsed (NO in S24), the process returns to S23.

In the case where the keyword display process section 23 has determined in S23 that the displayed keyword has been selected (YES in S23), the keyword display process section 23 instructs the reproduction process section 20 to temporarily stop the reproduction (S26). Further, the keyword display process section 23 notifies the search process section 21 of information on (i) the selected keyword and (ii) the dictionary searched by that keyword. The search process section 21, upon receipt of that notification, searches the dictionary by the keyword, both of which the search process section 21 has been notified of, and causes the display section 11 to display the result of that search (S27).

The search process section 21, after displaying the search result, determines whether the display of the search result is to be ended (S28). In the case where the search process section 21 has determined that the display of the search result is to be ended (YES in S28), the search process section 21 determines whether a log in the historical data 32 is to be erased which log corresponds to the keyword for which the search result has been displayed (S29).

For instance, in the case where the search result has been displayed in S27 with use of a screen as illustrated in FIG. 18, the search process section 21 determines, in the case where the key K10 has been selected, that (i) the display of the search result is to be ended (YES in S28) and that (ii) the log is to be erased (YES in S29). On the other hand, the search process section 21 determines, in the case where the key K7 has been selected in the screen example of FIG. 18, that (i) the display of the search result is to be ended (YES in S28) and that (ii) the log is not to be erased (NO in S29).

In the case where the search process section 21 has determined in S29 that the log is to be erased (YES in S29), the search process section 21 notifies the historical data generating section 22 to that effect. The historical data generating section 22, upon receipt of that notification, deletes the log from the historical data 32. For instance, in the case where the key K10 has been selected in the screen example of FIG. 18, the historical data generating section 22 deletes historical data corresponding to the keyword "Compliance".

In S31, the search process section 21 instructs the reproduction process section 20 to resume reproduction of the content. This ends the display of the search result, and causes an image of the content to be displayed instead.

The reproduction process section 20, after resuming reproduction of the content, determines whether the moving image reproduction is to be ended (S32). In the case where the reproduction process section 20 has determined that the moving image reproduction is not to be ended (NO in S32), the process returns to S21. In the case where the reproduction process section 20 has determined that the content reproduction is to be ended (YES in S32), the process proceeds to S33, whereby the reproduction process section 20 ends the reproduction of the content. This ends the keyword display process.

The above example is arranged such that the electronic learning device 1, in the case where the current time point of reproduction of content matches a reproduction time point on which information is stored as historical data 32, displays the keyword associated with that reproduction time point. The electronic learning device 1 may, however, alternatively display a keyword before such a reproduction time point on which information is stored as historical data 32.

For instance, in the case where a keyword is displayed at timing that occurs shifted to be before the reproduction position in the content at which reproduction position the input section 10 accepted an input operation for starting a search, the electronic learning device 1 can preferably reduce the difference between (i) the reproduction position in the content at which reproduction position a search became needed and (ii) the reproduction position at which a search was actually run.

[Dictionary Assigning Step]

Figure 20:
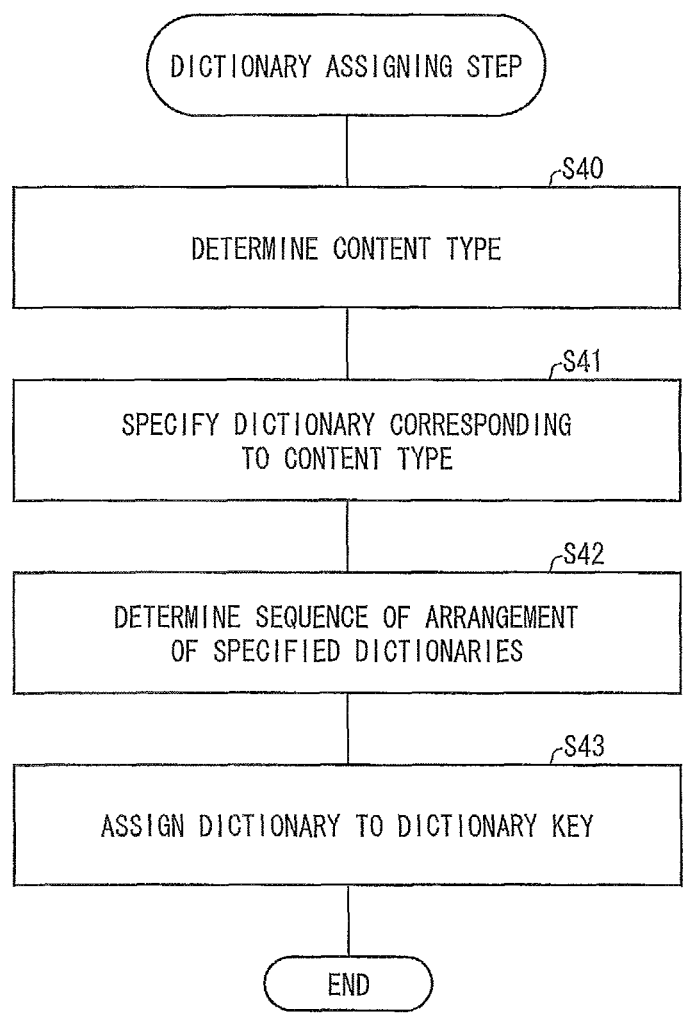
FIG. 20 is a flowchart illustrating an example of a dictionary assigning step carried out by the electronic learning device.

With reference to FIG. 20, the description below deals in detail with the dictionary assigning step carried out in S102 of FIG. 19. FIG. 20 is a flowchart illustrating an example of the dictionary assigning step.

First, the content type determining section 25 determines the type of content being reproduced by the reproduction process section 20 (S40), and notifies the dictionary key display process section 26 of the result of the determination. The content type determining section 25 determines the type of content by a method described later.

The dictionary key display process section 26, upon receipt of the result of the determination of the content type, specifies dictionaries corresponding to the content type of which the dictionary key display process section 26 has been notified (S41). Specifically, the dictionary key display process section 26 refers to the type-dictionary correspondence data 35 to specify dictionaries associated with the content type of which the dictionary key display process section 26 has been notified.

The dictionary key display process section 26 next decides on a sequence of arrangement of the dictionaries (S42). Specifically, the dictionary key display process section 26 refers to the dictionary display sequence data 34 to decide on a dictionary arrangement sequence in which the dictionaries specified in S41 are to be arranged in ascending order of numerical values defined in the dictionary display sequence data 34. The dictionary key display process section 26 then decides on a dictionary arrangement sequence in which dictionaries other than the dictionaries specified in S41 are to be arranged in ascending order to numerical values defined in the dictionary display sequence data 34. This has decided on a sequence (display priority) of arrangement of all the dictionaries.

Finally, the dictionary key display process section 26 assigns the dictionaries to respective dictionary keys in the arrangement sequence decided on in S42 (S43), and ends the dictionary assigning step. Specifically, the dictionary key display process section 26 causes the display section 11 to display (i) a predetermined number of dictionary keys and (ii) in the dictionary keys thus displayed, the names of the dictionaries in the arrangement sequence decided on in S42. For other dictionaries unassigned to the above dictionary keys, the dictionary key display process section 26 causes the display section 11 to display respective corresponding dictionary keys in the case where, for instance, the key K5 has been selected in (a) of FIG. 15 for a switch of dictionary keys to be displayed.

After the end of the dictionary assigning step, the search process section 21, in the case where a dictionary key has been selected, searches the dictionary that the dictionary key display process section 26 has associated with the dictionary key selected.

[Content Type Determining Method]

Figure 21:
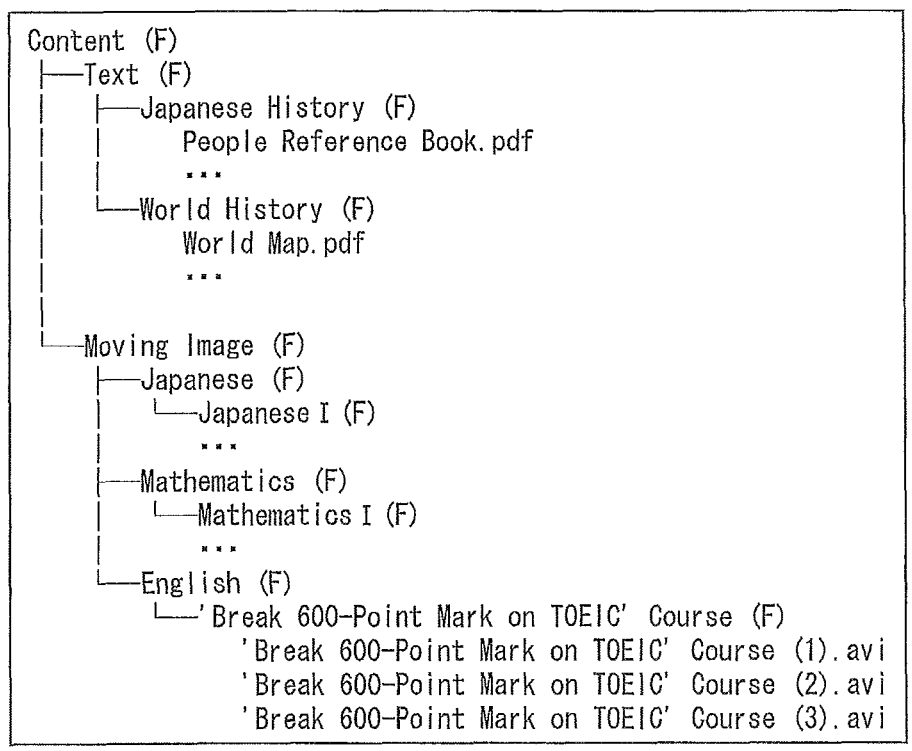
FIG. 21 is a diagram illustrating, in tree view form, a configuration of folders that stores content that the electronic learning device reproduces.

With reference to FIG. 21, the description below deals with a method by which the content type determining section 25 determines the type of content. FIG. 21 is a diagram illustrating, in tree view form, a configuration of folders that store content. FIG. 21 shows the sign "(F)" following the name of each folder to distinguish folders from files.

FIG. 21 shows an example in which the folder named "Content" stores a "Text" folder and a "Moving Image" folder. The "Text" folder stores (i) a "Japanese History" folder, which stores, for example, "People Reference Book.pdf", and (ii) a "World History" folder, which stores, for example, "World Map.pdf".

The "Moving Image" folder stores folders for the respective subjects of "Japanese", "Mathematics", and "English". The folders for the subjects each store folders that classify the subject more specifically, such as "Japanese I", "Mathematics I", and "'Break 600-Point Mark on TOEIC' Course". The "'Break 600-Point Mark on TOEIC' Course" folder stores the three moving image files of "'Break 600-Point Mark on TOEIC' Course (1).avi" through "'Break 600-Point Mark on TOEIC' Course (3).avi".

The example of FIG. 21, as described above, classifies the content on the basis of the "subject" into different folders. This arrangement allows the content type determining section 25 to, by specifying the folder that stores the content being reproduced and checking which "subject" folder the folder belongs to, determine what "subject" the content belongs to.

The method for determining the content type is not limited to the above example. In the case where, for instance, the file storing the content is provided with information, such as a property, that includes the type of the content, the content type determining section 25 can refer to such information to determine the content type. Further, in the case where, for instance, a file (for example, an XML file) other than the file storing the content includes recorded therein, for example, information attendant on the content, the content type determining section 25 can refer to such a file to determine the content type.

[History Compilation Step]

Figure 22:
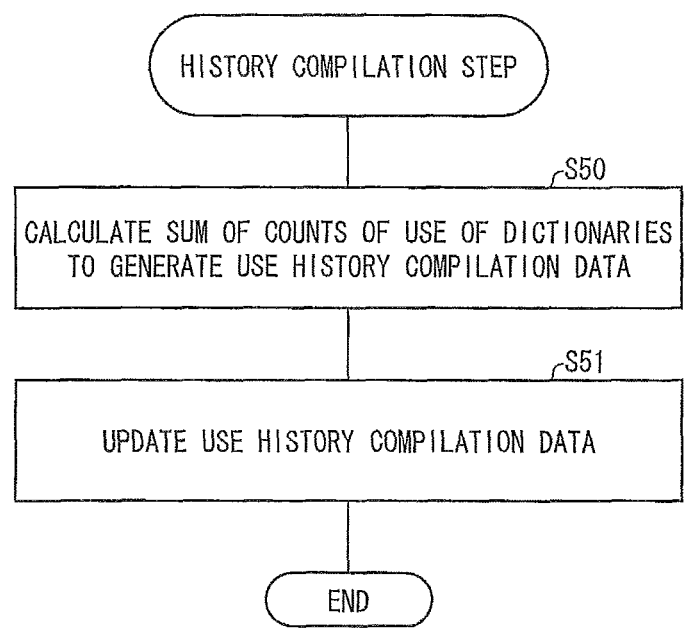
FIG. 22 is a flowchart illustrating an example of a history compilation step carried out by the electronic learning device.

With reference to FIG. 22, the description below deals in detail with the history compilation step carried out in S114 of FIG. 19. FIG. 22 is a flowchart illustrating an example of the history compilation step.

First, the dictionary display sequence deciding section 28 (i) refers to the historical data 32 to count the number of use of each dictionary and (ii) generates use history compilation data 33 that associates the count of use of each dictionary with the dictionary ID of that dictionary (S50).

The dictionary display sequence deciding section 28 next stores the use history compilation data 33, generated in S50, in the storage section 13. In other words, the dictionary display sequence deciding section 28 updates the use history compilation data 33 on the basis of the use number counted in S50 (S51). This ends the history compilation step.

[Example of Compiling History of Search Run at Plurality of Devices]

The description above deals with an example in which the electronic learning device 1 determines a dictionary display sequence on the basis of a history of searches run by the electronic learning device 1 itself. The electronic learning device 1 may alternatively determine a dictionary display sequence on the basis of a history of searches run by a plurality of devices.

Figure 23:
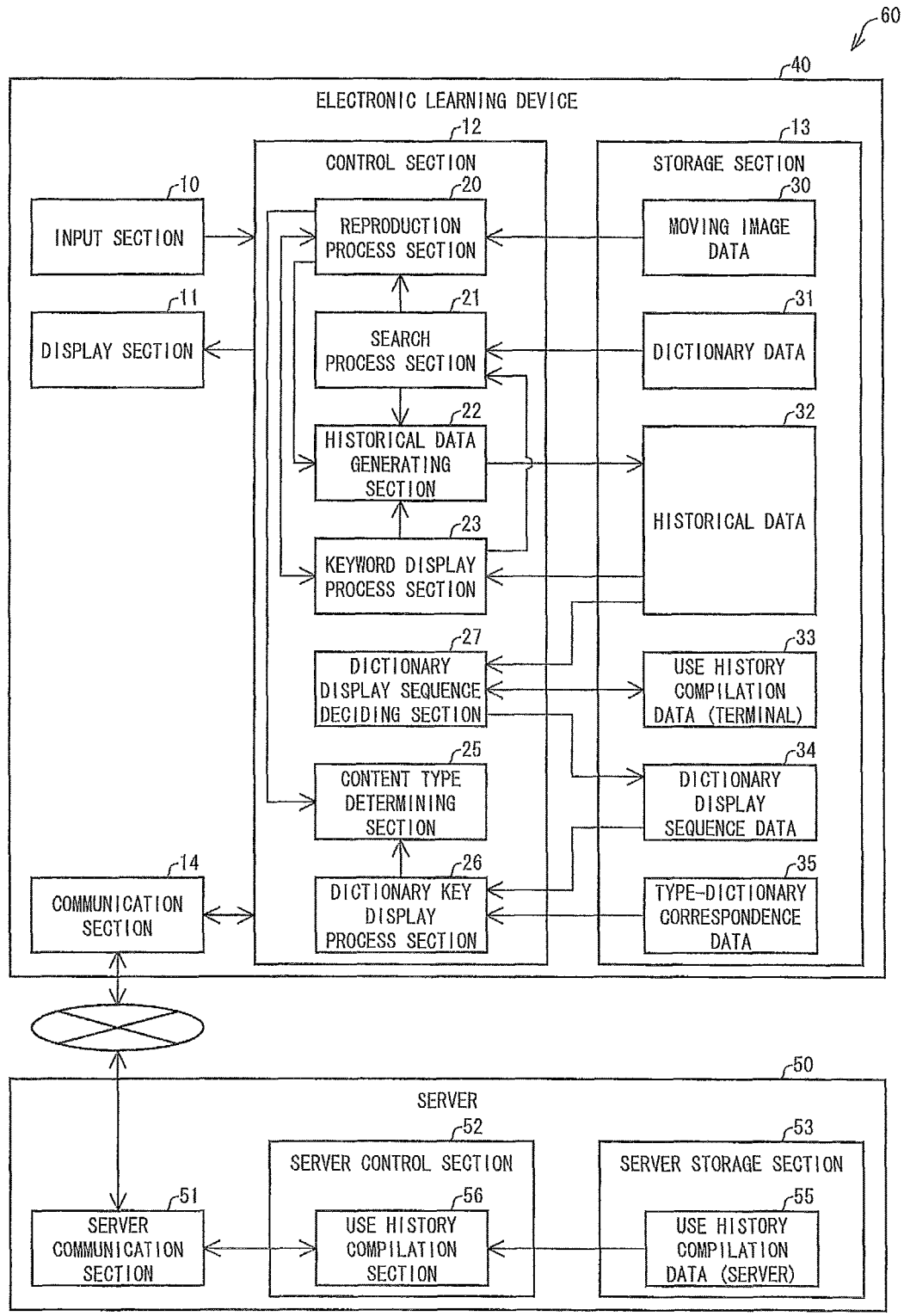
FIG. 23 is a block diagram illustrating respective main configurations of an electronic learning device and a server both included in an electronic learning system of another embodiment of the present invention.

With reference to FIG. 23, the description below deals with an example electronic learning system that determines a dictionary display sequence on the basis of a history of searches run by a plurality of devices. FIG. 23 is a block diagram illustrating respective main configurations of an electronic learning device (content reproduction device) 40 and a server (compilation device) 50 both included in the electronic learning system 60. Members of the electronic learning system 60 that are similar to the respective corresponding members of the electronic learning device 1 illustrated in FIG. 11 are each assigned a common reference numeral, and are not described here.

The electronic learning device 40 differs from the electronic learning device 1 of FIG. 11 in that (i) it further includes a communication section 14 and (ii) the dictionary display sequence deciding section 28 is replaced by a dictionary display sequence deciding section (priority data generating section, use history data generating section) 27. The storage section 13 stores use history compilation data (terminal) 33, which is, although named differently from the use history compilation data 33 of FIG. 11, identical to it in data configuration.

The communication section 14 is a section through which the electronic learning device 40 communicates with another device. This example assumes that the electronic learning device 40 connects to a communication network through the communication section 14, and communicates with the server 50 over that communication network.

The dictionary display sequence deciding section 27 transmits, to the server 50, use history compilation data (terminal) indicative of a history of searches run by the electronic learning device 40. This arrangement allows the server 50 to generate use history compilation data (server) (integrated use history data) that reflects a history of searches run by the electronic learning device 40.

The dictionary display sequence deciding section 27 then receives the use history compilation data (server) generated (updated) by the server 50, and updates the use history compilation data (terminal) 33. Since the use history compilation data (server) includes a history of searches run by another device, the above update causes the use history compilation data (terminal) 33 to reflect such a history of searches run by another device.

The server 50 is a device that (i) receives the use history compilation data (terminal) transmitted by the electronic learning device 40, (ii) updates the use history compilation data (server), and (iii) transmits the updated use history compilation data (server) to the electronic learning device 40. The server 50, as illustrated in FIG. 23, includes: a server communication section 51; a server control section 52; and a server storage section 53.

The server communication section 51 is a section through which the server 50 communicates with another device. This example assumes that the server communication section 51 communicates, over a communication network, with the electronic learning device 40 and a device that generates and transmits use history compilation data (terminal) 33 similarly to the electronic learning device 40.

The server control section 52 centrally controls the operation of the server 50. The server control section 52 includes a use history compilation section 56. The use history compilation section 56 (i) receives the use history compilation data (terminal) transmitted by the electronic learning device 40, (ii) updates the use history compilation data (server), and (iii) transmits the updated use history compilation data (server) to the electronic learning device 40.

The server storage section 53 stores various data for use by the server 50. The server storage section 53 stores use history compilation data (server) 55. The use history compilation data (server) 55 is data that reflects a history of dictionary use at each of a plurality of devices. The use history compilation data (server) 55 simply needs to associate (i) information for specifying each dictionary with (ii) information indicative of the use frequency for that dictionary, and may, for example, be data as shown in FIG. 12.

[History Compilation Step (Terminal Side)]

Figure 24:
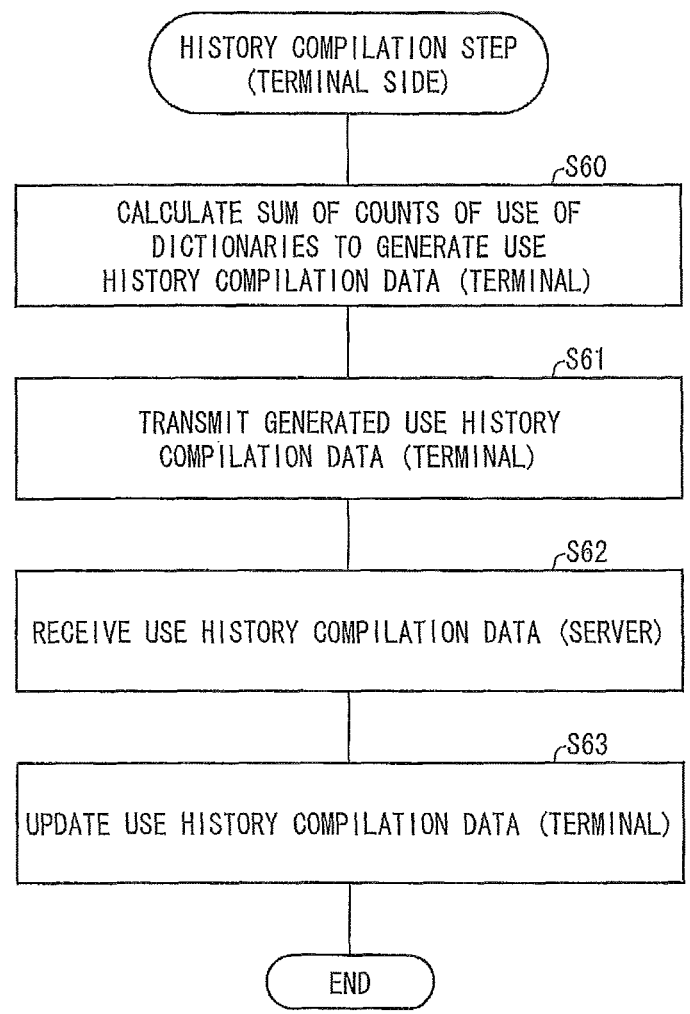
FIG. 24 is a flowchart illustrating an example of a history compilation step (terminal side) carried out by the electronic learning device.

With reference to FIG. 24, the description below deals with a history compilation step (terminal side) carried out by the electronic learning device 40. FIG. 24 is a flowchart illustrating an example of the history compilation step (terminal side) carried out by the electronic learning device 40. This step replaces the step of FIG. 22 for S114 in FIG. 19.

First, the dictionary display sequence deciding section 27 (i) refers to the historical data 32 to count the number of use of each dictionary and (ii) generates use history compilation data (terminal) 33 that associates the count of use of each dictionary with the dictionary ID of that dictionary (S60).

The dictionary display sequence deciding section 27 next transmits, to the server 50 through the communication section 14, the use history compilation data (terminal) 33 generated in S60 (S61). Upon receipt of the use history compilation data (terminal) 33, the server 50 transmits, to the electronic learning device 40, use history compilation data (server) 55 through a history compilation step (server side) described later.

The dictionary display sequence deciding section 27 then receives the use history compilation data (server) 55 (S62), and stores, in the storage section 13, the received use history compilation data (server) 55 as the use history compilation data (terminal) 33. In other words, the dictionary display sequence deciding section 27 updates the use history compilation data (terminal) 33 with use of the use history compilation data (server) 55 (S63). This ends the history compilation step (terminal side).

The electronic learning device 40, which determines a dictionary display sequence with use of use history compilation data (terminal) 33 updated as above, can preferentially assign, to a dictionary key, even a dictionary that a user of another device frequently uses. The electronic learning device 40 can thus recognize what dictionaries a user of another device uses, and allows the user of the electronic learning device 40 to select a dictionary having high frequency of use by another user.

[History Compilation Step (Server Side)]

Figure 25:
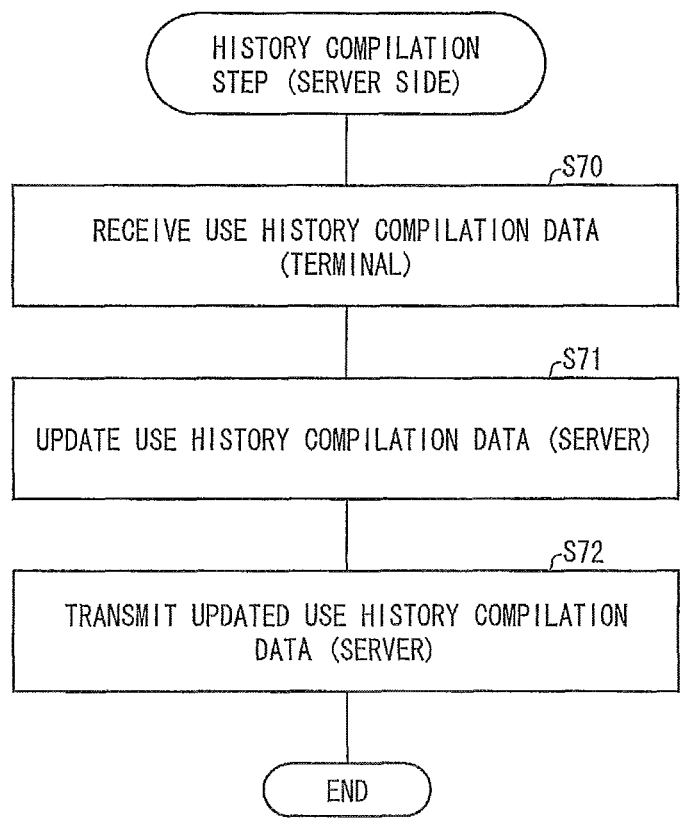
FIG. 25 is a flowchart illustrating an example of a history compilation step (server side) carried out by the server.

With reference to FIG. 25, the description below deals with the history compilation step (server side) carried out by the server 50. FIG. 25 is a flowchart illustrating an example of the history compilation step (server side) carried out by the server 50.

The use history compilation section 56 of the server 50 receives use history compilation data (terminal) 33 transmitted by the dictionary display sequence deciding section 27 of the electronic learning device 40 (S70). The use history compilation section 56 then, with use of the received use history compilation data (terminal) 33, updates use history compilation data (server) 55 stored in the server storage section 53 (S71). Specifically, the use history compilation section 56 updates the use history compilation data (server) 55 by adding (i) the number of each count included in the received use history compilation data (terminal) 33 to (ii) the number of the count for the corresponding dictionary ID in the use history compilation data (server) 55.

The number of each count included in the use history compilation data (server) 55 is a number calculated as the total of the numbers of respective counts indicated in use history compilation data (terminal) 33 received from the electronic learning device 40 and/or another device. The above-updated number of the count denotes the total of the numbers of respective counts indicated in use history compilation data (terminal) 33 received from the electronic learning device 40 and/or another device.

The use history compilation section 56 then transmits the updated use history compilation data (server) 55 to the electronic learning device 40 through the server communication section 51 (S72). This ends the history compilation step (server side).

[Variation of Data for Use]

The description above deals with an example in which the electronic learning device 1 determines a dictionary display sequence with use of dictionary display sequence data 34 generated from use history compilation data 33. The electronic learning device 1 may alternatively determine a dictionary display sequence with direct use of use history compilation data 33. For instance, the electronic learning device 1 can, in the case where it uses the use history compilation data 33 of FIG. 12, determine a display sequence so that dictionaries are arranged in descending order of the count.

The description above deals with an example in which the electronic learning device 1 generates use history compilation data 33 with use of historical data 32. The electronic learning device 1 may, needless to say, alternatively generate use history compilation data 33 without use of historical data 32. For instance, the electronic learning device 1 may additionally include a member for counting the number of searches for each dictionary and generate use history compilation data 33 with use of that member. The use of historical data 32 is, however, preferable because it eliminates the need to additionally include a member in the electronic learning device 1.

[Variation of Storage Location for Dictionary Data]

The arrangement described above is an example in which dictionary data 31 is stored in the storage section 13 included in the electronic learning device 1. The dictionary data 31 may, however, be stored in another device as long as the electronic learning device 1 is arranged to be capable of presenting the user with the result of a search of the dictionary data 31. The present embodiment may further alternately be arranged such that (i) the search of the dictionary data 31 also is carried out by a device other than the electronic learning device 1 and that (ii) the electronic learning device 1 obtains the result of that search.

In the above alternative case, the electronic learning device 1 can simply be arranged such that (i) it includes a communication section 14 similarly to the electronic learning device 40 of FIG. 23 and (ii) the search process section 21 causes an external device to run a search on the basis of a keyword and displays the result of that search.

Specifically, the search process section 21 causes the display section 11 to display a keyword input screen for input of a keyword. The search process section 21 next transmits, to the external device through the communication section 14, (i) a keyword the input of which has been accepted by the input section 10 while the keyword input screen was being displayed, (ii) information for specifying a database to be searched by that keyword, and (iii) an instruction to run a search by the keyword. The search process section 21 then receives the result of that search from the external device, and causes the display section 11 to display the search result.

[Variation of Arrangement for Display of Search Result]

The above example is arranged such that in the case where a displayed keyword has been selected during reproduction of content, the search by the selected keyword is run again for display of the search result. The present embodiment, however, simply needs to be arranged such that the electronic learning device 1 or 40 is capable of displaying, in the case where a displayed keyword has been selected during reproduction of content, the result of a search based on that selected keyword, and is not limited by the above example.

The present embodiment may be arranged such that, for instance, the historical data 32 includes the search result. This arrangement makes it possible to (i) obtain a search result from the historical data 32 in the case where a keyword has been selected, and (ii) display the search result without running a search again. The present embodiment may further be arranged such that, for instance, (i) the search result is stored separately from the historical data 32 and (ii) the historical data 32 includes information (for example, the address or the like of the storage location for the search result) for access to the search result.

In the case where a search is run of an external database in particular, as in the arrangement described under [Variation of Storage Location for Dictionary Data], it can take a long time to run such a search again. The search result is thus preferably stored inside the electronic learning device 1.

[Database as Search Target]

The above example is arranged to search, by a keyword, any of such databases as a Japanese-language dictionary and an English-Japanese dictionary. The databases for use in a search are, however, not limited to those example databases. The present embodiment may use, for example, (i) a database such as a reference book (for example, an encyclopedia) and a character dictionary or (ii) a database such as a dictionary of a foreign language other than English. The present embodiment may further alternatively, for instance, search a database provided on a network such as the Internet.

In the case where a search is run of a database on a network, the user may, in order to obtain a desired search result, (i) add another keyword for that search or (ii) apply a search condition for that search.

To run such a search, the present embodiment simply needs to be arranged such that the historical data 32 includes information (for example, an address or the like) for access to the final search result. The present embodiment may alternatively be arranged such that the historical data 32 includes the search condition, in which case a search is run again with use of the search condition included in the historical data 32.

The search of a database is not limited to a keyword search, and may use any search technique. Even in a case involving such any search technique, the historical data 32 can simply include information for access to the search result in accordance with the search technique involved.

Embodiment 3

Figures 26, 27:
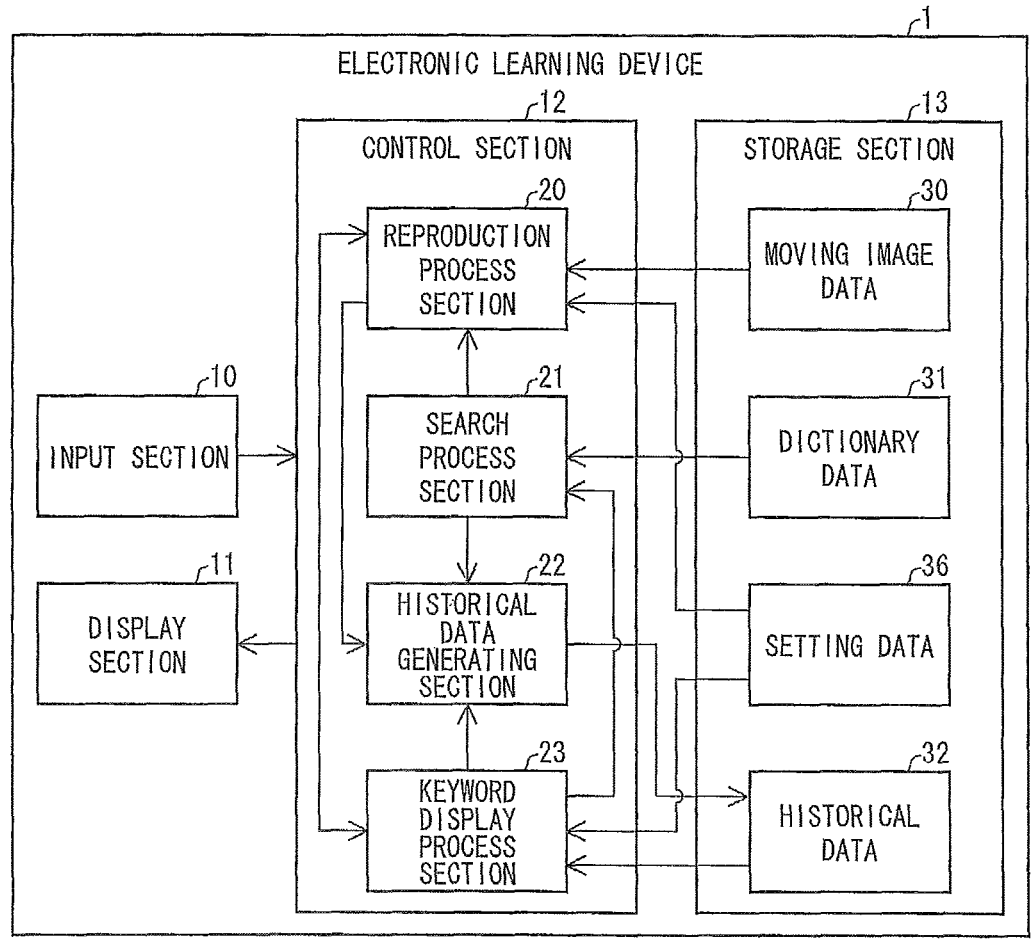
FIG. 26 is a block diagram illustrating a main configuration of an electronic learning device of still another embodiment of the present invention.
FIG. 27 is a diagram illustrating an example of setting data stored in the electronic learning device.

The description below deals in detail with still another embodiment of the present invention with reference to FIGS. 26 through 33. The following first describes an arrangement of an electronic learning device of the present embodiment with reference to FIG. 26. FIG. 26 is a block diagram illustrating a main configuration of the electronic learning device (content reproduction device) 1.

The electronic learning device 1 is a device for reproducing content, and as illustrated in FIG. 26, includes: an input section 10; a display section 11 for displaying an image; a control section 12; and a storage section 13.

The input section 10 accepts an input operation by the user. The user controls the operation of the electronic learning device 1 through the input section 10. The present embodiment assumes that the input section 10 is a so-called touch panel that (i) detects an input operation performed with respect to a display surface of the display section 11 and (ii) accepts the input operation thus detected. The input section 10 is, needless to say, simply required to be capable of accepting an input operation by the user, and may include, for example, an entry key and/or a keyboard. Further, the present embodiment describes an example in which the input section 10 is included in the electronic learning device 1. The input section 10 may alternatively be a device separate from the electronic learning device 1.

The display section 11 displays an image under control of the control section 12, and may be, for example, a liquid crystal display device or an EL display device. The display section 11 may alternatively be, as with the input section 10, a device separate from the electronic learning device 1.

The control section 12 centrally controls the operation of the electronic learning device 1, and includes: a reproduction process section (content reproduction section) 20; a search process section (search section, search result display section) 21; a historical data generating section (historical data deleting section) 22; and a keyword display process section (object display section) 23.

The reproduction process section 20 carries out a process of reproducing content. Specifically, the reproduction process section 20 (i) reads, from the storage section 13, content corresponding to the content of an input operation accepted by the input section 10, and (ii) causes the display section 11 to display that corresponding content. The present embodiment assumes that the reproduction process section 20 reproduces content of a moving image. The reproduction process section 20 may alternatively (i) carry out a slideshow display of content including still images or (ii) reproduce content including a sound. In the case where content to be reproduced includes a sound, the reproduction process section 20 outputs the sound of the content from a loudspeaker (not shown).

Further, in the case where (i) the user has inputted a keyword to the input section 10 during reproduction of content, (ii) the search process section 21 has run a search and displayed its result, and (iii) the user has ended viewing of the search result (that is, the search process section 21 has ended the display of the search result), the reproduction process section 20 resumes reproduction of the content from a reproduction time point that occurs a predetermined content rewind time period before the time point of reproduction of the content at which time point an instruction to start a search was inputted to the input section 10. Stated differently, the reproduction process section 20, when resuming reproduction of the content, moves the content reproduction position back, by the amount corresponding to a predetermined content rewind time period, from the content reproduction position reached when the input section 10 accepted an input operation for starting a search. The content rewind time period will be described later in detail.

The search process section 21 (i) searches a database by a keyword inputted while the reproduction process section 20 is reproducing content, and (ii) displays, as a search result, an image based on data detected. Specifically, the search process section 21, when an instruction (dictionary selection keys K1 to K3 described later) to start a search has been inputted to the input section 10 during reproduction of content, causes the display section 11 to display a keyword input screen for input of a keyword. The search process section 21 next, when a keyword has been inputted to the input section 10, searches a database by that keyword, the input of which has been accepted by the input section 10 while the keyword input screen was being displayed. The search process section 21 then causes the display section 11 to display the result of the search. The present embodiment assumes that the database to be searched is dictionary data stored in the storage section 13. In other words, the search process section 21, during reproduction of content, (i) searches a database in response to an input operation performed with respect to the input section 10 and (ii) displays the result of that search.

The historical data generating section 22 generates historical data indicative of a history of keyword searches. Specifically, the historical data generating section 22 (i) generates historical data that associates (a) position information (time point information) indicative of a position (reproduction position relative to the top of the content) in the content at which position the content was being reproduced when a keyword search was run, (b) access information for access to the result of the search based on that keyword, and (c) the keyword with one another, and (ii) stores the historical data in the storage section 13. The present embodiment assumes that the position information is information on a time point of reproduction of content and that the access information is a combination of (i) information indicative of a database as a search target and (ii) a keyword used in the search.

The position information that the historical data generating section 22 includes in the historical data is used so that when the same content is reproduced for the next time, the user can, at timing of a past search, access the result of that search. The position information thus simply needs to be so arranged that the timing of a search can be specified. The position information will be described later in detail.

The present embodiment assumes that the position information is information on a time point of reproduction of content at which time point the input section 10 accepted an input operation for starting a search. Needless to say, the position information simply needs to indicate a position in the content at which position the content was being reproduced when a search was run, and is not limited to the above example. The position information may indicate, for example, (i) a time point at which a keyword was inputted, (ii) a time point at which a search was run, (iii) a time point at which a search result was displayed, or (iv) a time point at which the display of a search result was ended. Further, the access information simply needs to allow access to the search result, and is not limited to the above example.

The keyword display process section 23, while content is being reproduced, causes the display section 11 to display, at timing that occurs a predetermined time period before the timing of a past keyword search, the keyword used in that search. Specifically, the keyword display process section 23, with reference to a display timing correction time period indicated in setting data 36 and to historical data generated by the historical data generating section 22, specifies (i) the timing that occurs the display timing correction time period before the timing at which a past keyword search was run and (ii) the keyword used in that search, and carries out the above display. More specifically, while the reproduction process section 20 is reproducing content for which the search process section 21 ran a search in the past, the keyword display process section 23, when the current position of reproduction of the content has reached a reproduction position that occurs a predetermined display timing correction time period before the position of reproduction of the content at which position the input section 10 accepted an input operation for starting the above search, displays an object (keyword) for displaying the result of the search.

The keyword display process section 23, in the case where a displayed keyword has been selected, (i) refers to the access information in the historical data to obtain the result of the search based on that keyword, and (ii) displays the search result. Specifically, the keyword display process section 23, in the case where a displayed keyword has been selected, (i) notifies the search process section 21 of the selected keyword and the database searched by that keyword, (ii) causes the search process section 21 to search the database by the keyword, and (iii) causes the search process section 21 to display the result of the keyword search.

The storage section 13 stores various data for use by the electronic learning device 1. The storage section 13 stores moving image data (content) 30, dictionary data (database) 31, historical data 32, and setting data 36.

The moving image data 30 is moving image data of content to be reproduced by the reproduction process section 20. The reproduction process section 20 reads and reproduces the moving image data 30. The present embodiment describes an example in which the moving image data 30 is stored in the storage section 13. The moving image data 30, however, simply needs to be stored such that the reproduction process section 20 can reproduce it. The moving image data 30 may be stored in, for example, an external memory device connected to the electronic learning device 1. The moving image data 30 may alternatively be stored in, for example, a device, such as a server, that is communicably connected to the electronic learning device 1. In this alternative case, the moving image data 30 may be (i) downloaded to the electronic learning device 1 for reproduction or (ii) reproduced by streaming without being downloaded.

The dictionary data 31 is a database to be searched by the search process section 21 by a keyword. The present embodiment assumes that the storage section 13 stores, as the dictionary data 31, respective databases of three dictionaries, namely a Japanese-language dictionary, an English-Japanese dictionary, and a Japanese-English dictionary. These databases each include (i) entry words (that is, words as a target of a keyword search) and (ii) data indicative of the meaning and/or the like of each entry word, the entry words and the data being associated with each other. This makes it possible to, by running a search by a keyword identical to an entry word, access data associated with that entry word and indicative of the meaning and/or the like of the entry word.

The historical data 32 is, as described above, data generated and stored by the historical data generating section 22. The historical data 32 is data including, in association with one another, (i) information on a time point of reproduction of content at which time point a keyword search was run, (ii) access information for access to the result of the search based on that keyword, and (iii) the keyword.

The setting data 36 is data indicative of respective values of (i) the content rewind time period and (ii) the display timing correction time period which values are currently set in the electronic learning device 1. The respective values of the content rewind time period and the display timing correction time period, the respective values being included in the setting data 36, may each default to a predetermined value, or alternatively the user may set the respective values of the content rewind time period and the display timing correction time period.

[Historical Data 32]

The historical data 32 may be, for example, data as shown in FIG. 2 referred to in the embodiment above. FIG. 2 is a diagram illustrating an example of the historical data 32. The historical data 32 of FIG. 2 is data generated for content named "Training Moving Image 1-1", and is data that associates the items "Number", "Reproduction Time Point", "Dictionary Used", and "Keyword" with one another.

The historical data 32 simply needs to allow the electronic learning device 1 to (i) specify the timing of a past keyword search and the keyword and (ii) specify information for access to the result of the search based on that keyword. The historical data 32 is thus not limited to the example of FIG. 2.

The historical data 32 may be, for example, data as shown in FIG. 3 referred to in the embodiment above. The historical data 32 of FIG. 3 differs from the historical data 32 of FIG. 2 in that it further includes data on the items "Dictionary ID" and "Keyword ID".

As described above, the examples of FIGS. 2 and 3 each show historical data 32 including, as information for access to the result of a search by a keyword, (i) information on a keyword and a dictionary used or (ii) a dictionary ID and a keyword ID. The historical data 32, however, simply needs to include (i) information on a reproduction time point and (ii) access information for access to the result of a search by a keyword, and is not limited to the above examples. The access information may be, for example, information (for example, an address) indicative of a storage position for a search result.

[Setting Data 36]

The setting data 36 may be, for example, data as shown in FIG. 27. FIG. 27 is a diagram illustrating an example of the setting data 36. The setting data 36 shown in FIG. 27 sets (i) the content rewind time period to 60 seconds and (ii) the display timing correction time period to 30 seconds.

The example shown in FIG. 27 sets the content rewind time period to 60 seconds and the display timing correction time period to 30 seconds. The respective values of the content rewind time period and the display timing correction time period are, however, not limited to those. The value of the content rewind time period is desirably set, in order to allow the user to first check the meaning of the target term and then view the content, to a time period longer than the time period extending from (i) when the target term appeared during the reproduction of the content (that is, the timing at which a search became needed) to (ii) when the user inputted an instruction to start a search based on the target term.

The value of the display timing correction time period is desirably set, in order to display, at the latest when the term targeted for a search appears, a key indicative of that term, to a time period longer than the time period extending from (i) when the target term appeared during the immediately previous reproduction of the content (that is, the timing at which a search became needed) to (ii) when the user inputted an instruction to start a search based on the target term.

The example shown in FIG. 27 sets the content rewind time period and the display timing correction time period to respective different values, namely 60 seconds and 30 seconds. These values are, however, not limited to values different from each other, and may be set to, for example, an equal value (common value).

The timing of displaying a keyword is preferably close to the timing at which that keyword is used in the content. In the case where the user has, while viewing content, encountered a term for which the user wants to run a search, the user may not have understood a portion of the content which portion occurs immediately before the above encounter. The electronic learning device 1 thus preferably resumes the reproduction from a position that occurs before the timing at which the keyword is used. Consequently, the content rewind time period is preferably set to be longer than the display timing correction time period as in this example.

The use of (i) the historical data 32 and (ii) the display timing correction time period included in the setting data 36 both described above makes it possible to, when the "Training Moving Image 1-1" is reproduced, display, at timing that occurs a display timing correction time period before the timing of a past keyword search, the keyword used in that keyword search. This in turn makes it possible to, in the case where a displayed keyword has been selected, run a search by that keyword again to display the result of the search.

[Example Operation of Electronic Learning Device 1 (Generation and Recording of Historical Data and Content Rewind Reproduction)]

The description below deals with an example operation of the electronic learning device 1. Since screens displayed during this operation are similar to those of FIG. 4 referred to in the embodiment above, the description below also refers to FIG. 4. FIG. 4 shows diagrams illustrating an example operation of the electronic learning device 1, where (a) illustrates an operation example observed before a dictionary is selected, (b) illustrates an operation example observed when a keyword search is run with use of a selected dictionary, and (c) illustrates an operation example observed after a keyword search is run.

The example of (a) of FIG. 4 displays (i) an image of content in an image display region A1 and (ii) keys K1 to K3 next to the image display region A1. The keys K1 to K3 are so-called software keys: Performing a touching operation with respect to the keys K1 to K3 with use of, for example, a touch pen P or a finger can cause the electronic learning device 1 to carry out respective processes assigned in advance to the keys K1 to K3. Specifically, selecting any of the keys K1 to K3 starts a search.

Specifically, the key K1 is a key for calling a Japanese-language dictionary. In response to a touching operation with respect to the key K1, the electronic learning device 1 displays a screen for a keyword search that uses a Japanese-language dictionary. This allows the user to, in the case where the user has, during a study, encountered a term of which the user wants to check the meaning, easily run a search for that term.

The key K2 is a key for calling an English-Japanese dictionary. In response to a touching operation with respect to the key K2, the electronic learning device 1 displays a screen for a keyword search that uses an English-Japanese dictionary. This allows the user to, in the case where the user has, during a study, encountered an English term of which the user wants to check the meaning, easily run a search for a Japanese translation of that English term.

The key K3 is a key for calling a Japanese-English dictionary. In response to a touching operation with respect to the key K3, the electronic learning device 1 displays a screen for a keyword search that uses a Japanese-English dictionary. This allows the user to, in the case where the user has, during a study, encountered a term that the user wants to translate into English, easily translate that term into English.

As described above, the keys K1 to K3 are each a key for calling a dictionary. The user selects any of the keys K1 to K3 to start a search. In other words, the keys K1 to K3 each accept an input operation for starting a search.

A touching operation with respect to the key K1 causes the electronic learning device 1 to (i) temporarily stop reproduction of content and (ii) display a screen as illustrated in (b) of FIG. 4. The example in (b) of FIG. 4 displays (i) the name (XYZ Japanese-language dictionary) of the dictionary to be used for the keyword search, (ii) a keyword display region A2, and (iii) a keyboard K4.

The example of (b) of FIG. 4 assumes that the user (i) selects, with use of, for example, a touch pen P, characters and/or the like included in the keyboard K4, and thus (ii) inputs characters constituting a keyword (that is, a term that the user wants to look up in a dictionary) to be used in a search. The inputted characters are displayed in the keyword display region A2. Selecting 決定 (Enter) in the keyboard K4 causes the electronic learning device 1 to run a search on the basis of the inputted character string as a keyword.

The example of (b) of FIG. 4 assumes that the user types in "こんぷらいあんす" (Japanese phonetic hiragana characters for "compliance") and starts a search by that entry. This operation causes the electronic learning device 1 to carry out a display as illustrated in (c) of FIG. 4. The example of (c) of FIG. 4 displays (i) the name of the dictionary used for the keyword search, (ii) the result of the search for "こんぷらいあんす" in that dictionary, and (iii) a key K5 for ending the display of the dictionary search result and returning to reproduction of the content.

A touching operation with respect to the key K5 causes the electronic learning device 1 to (i) end the display of the dictionary search result, (ii) move the content reproduction time point back, by the amount corresponding to the content rewind time period, from the content reproduction time point at which the electronic learning device 1 temporarily stopped the content reproduction, and (iii) resume reproduction of the content from the consequent reproduction time point. This arrangement allows the electronic learning device 1 to, after displaying a dictionary search result, reproduce again the scene in which occurs the term of which the user has checked the meaning. The above arrangement thus allows the user to, in the case where the user has, during reproduction of content, encountered a term of which the user wants to check the meaning, first check the meaning of the term and then view the scene in the content again.

The electronic learning device 1, in the case where such a keyword search has been run, generates historical data 32 that includes, in association with one another, (i) information on a time point of reproduction of the content which time point was reached when the keyword search was started, (ii) information on the dictionary as a target of the keyword search, and (iii) the keyword used in the search. The electronic learning device 1 thus stores the historical data 32.

The electronic learning device 1, in the case where the content is reproduced for the next time, (i) refers to the above historical data 32 and the display timing correction time period included in the setting data 36 and (ii) displays, at timing that occurs the display timing correction time period before the timing of the past keyword search, the keyword used in the search. An example operation carried out to display a keyword is described later.

Figure 28:
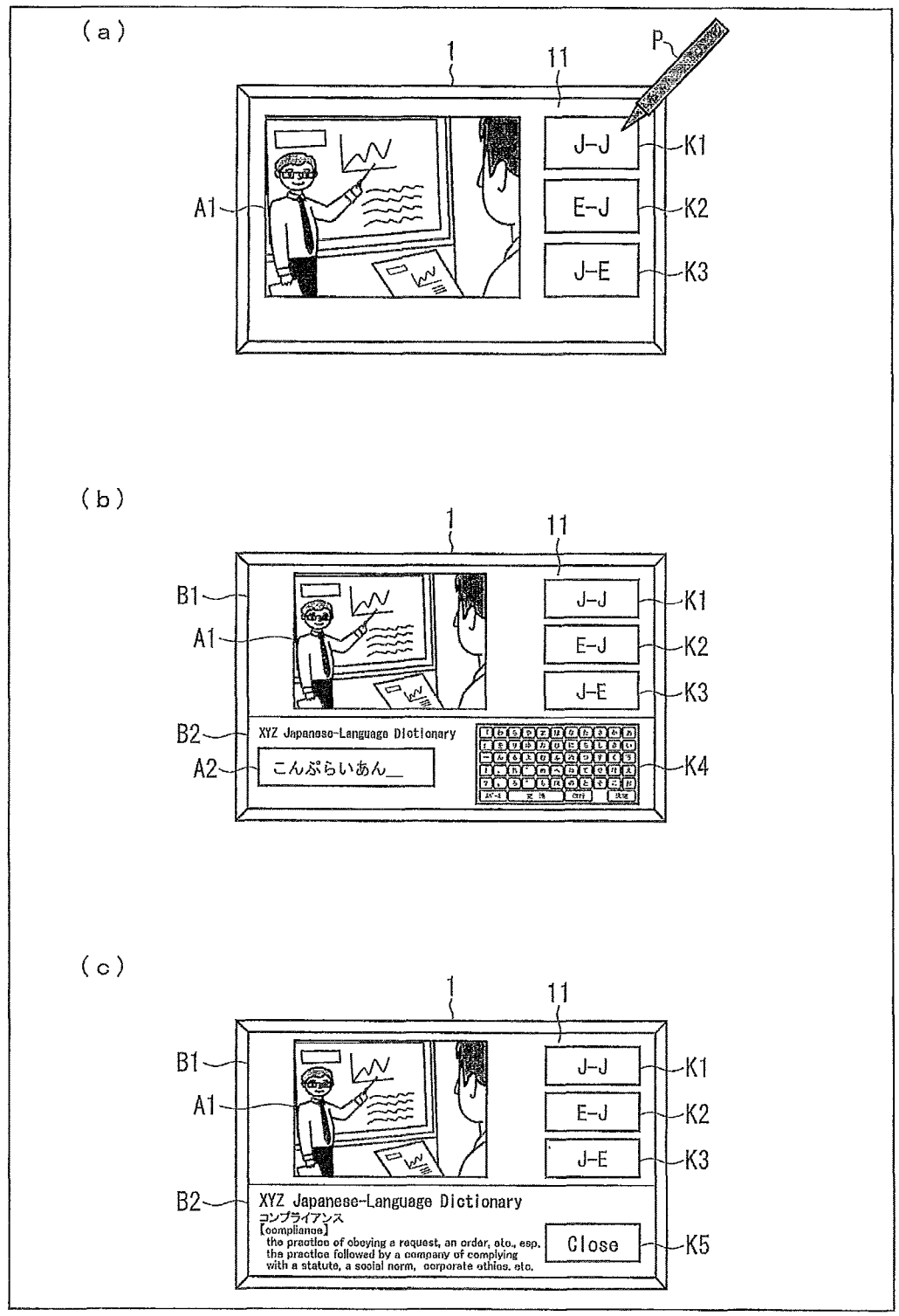
FIG. 28 shows diagrams illustrating another example operation of the electronic learning device, where (a) illustrates an operation example observed before a dictionary is selected, (b) illustrates an operation example observed when a keyword search is run with use of a selected dictionary, and (c) illustrates an operation example observed after a keyword search is run.

The description below deals with another example operation of the electronic learning device 1 with reference to FIG. 28. FIG. 28 shows diagrams illustrating an example operation of the electronic learning device 1, where (a) illustrates an operation example observed before a dictionary is selected, (b) illustrates an operation example observed when a keyword search is run with use of a selected dictionary, and (c) illustrates an operation example observed after a keyword search is run. The example operation illustrated in FIG. 28 differs from the example operation of FIG. 4 in that it does not temporarily stop reproduction of content when a keyword search is run, that is, the example operation of FIG. 28 runs a keyword search while reproducing content.

The example of (a) of FIG. 28 is identical to that of (a) of FIG. 4, and displays (i) an image of content in an image display region A1 and (ii) keys K1 to K3 next to the image display region A1.

A touching operation with respect to the key K1 causes the electronic learning device 1 to (i) divide the screen of the display section 11 into two portions and (ii) display an image for a search while displaying an image of the content for reproduction of the content. Specifically, the electronic learning device 1 divides the screen of the display section 11 into two portions to create a content display region B1 and a search display region B2 for display of a screen as illustrated in (b) of FIG. 28.

The example illustrated in (b) of FIG. 28 displays (i) in the content display region B1, the image display region A1 and the keys K1 to K3 and (ii) in the search display region B2, the name (XYZ Japanese-language dictionary) of the dictionary to be used for the keyword search, (ii) a keyword display region A2, and (iii) a keyboard K4.

In the case where the user has typed in "こんぷらいあんす" and run a keyword search on the screen illustrated in (b) of FIG. 28, the electronic learning device 1 displays a screen as illustrated in (c) of FIG. 28. The example illustrated in (c) of FIG. 28 reproduces content in the content display region B1, and simultaneously in the search display region B2, displays (i) the name of the dictionary used for the keyword search, (ii) the result of the search for "こんぷらいあんす" in that dictionary, and (iii) a key K5 for ending the display of the dictionary search result and returning to reproduction of the content (that is, resuming reproduction of the content).

A touching operation with respect to the key K5 causes the electronic learning device 1 to (i) end the display of the dictionary search result, (ii) move the content reproduction time point back, by the amount corresponding to the content rewind time period, from the content reproduction time point at which an input operation was performed with respect to the key K1, and (iii) resume reproduction of the content from the consequent reproduction time point. This arrangement allows the electronic learning device 1 to, after displaying a dictionary search result, reproduce again the scene in which occurs the term of which the user has checked the meaning. The above arrangement thus allows the user to, in the case where the user has, during reproduction of content, encountered a term of which the user wants to check the meaning, first check the meaning of the term and then view the scene in the content.

The electronic learning device 1 may resume reproduction of content while continuing to display a search result in the search display region B2. In this case, the electronic learning device 1 may, for instance, (i) additionally display a "Search Result Checked" key (not shown in FIG. 28) in the search display region B2 on the screen of (c) of FIG. 28 and (ii) in response to selection of the "Search Result Checked" key, resume reproduction of the content in the content display region B1 from a reproduction time point that occurs the content rewind time period before the content reproduction time point at which an input operation was carried out with respect to the key K1. Alternatively, the electronic learning device 1 may, while displaying a search result in the search display region B2, automatically resume, when a predetermined time period has elapsed after the start of the display of the search result, reproduction of the content in the content display region B1 from a reproduction time point that occurs the content rewind time period before the content reproduction time point at which an input operation was carried out with respect to the key K1.

[Example Operation of Electronic Learning Device 1 (Displaying Keyword)]

The electronic learning device 1 displays a keyword on the basis of historical data 32 through an operation similar to that described in the embodiment above. The description below thus deals with an example of such an operation with reference to FIG. 5 referred to in the embodiment above. FIG. 5 shows diagrams illustrating an example operation of the electronic learning device 1 for displaying a keyword during reproduction of content, where (a) illustrates a screen example observed when no keyword is displayed, (b) illustrates a screen example observed when a keyword is displayed, and (c) illustrates a screen example observed when a displayed keyword has been selected.

As illustrated in (a) of FIG. 5, the electronic learning device 1, when no keyword is displayed, displays (i) an image of content in the image display region A1 and (ii) the keys K1 to K3, as in the example of (a) of FIG. 4.

The electronic learning device 1 monitors a current time point of reproduction of the content for whether the current reproduction time point matches a reproduction time point that occurs a display timing correction time period before a reproduction time point on which information is stored as historical data 32. The electronic learning device 1, in the case where it has determined that the two reproduction time points match, displays a keyword associated with the reproduction time point that occurs the display timing correction time period after the reproduction time point that matches the current reproduction time point.

For instance, as in the example of (c) of FIG. 4, when the current reproduction time point reaches 13 minutes 15 seconds, which is a reproduction time point that occurs the display timing correction time period before a reproduction time point associated with the keyword "コンプライアンス" (Japanese phonetic katakana characters for "compliance"), the electronic learning device 1 displays the key K6 (object) showing the keyword "コンプライアンス" as illustrated in (b) of FIG. 5.

In the case where the displayed key K6 has been selected with use of a touch pen P, a finger or the like, the electronic learning device 1 displays the result of the search based on the keyword "コンプライアンス" as illustrated in (c) of FIG. 5.

As described above, the electronic learning device 1 displays, at timing at which a term occurs during reproduction of content, the keyword used in a search for that term. This keyword is something on the basis of which the user looked up the meaning of the term in the dictionary data 31 in the past. Thus, in the case where the user currently remembers the meaning and/or the like of that keyword, there is no need to display again the result of the search based on that keyword, and reproduction of content is desirably continued. The user may, on the other hand, have forgotten the result (for example, the meaning and/or the like of the term) of a past search.

In view of the above point, the electronic learning device 1, (i) in the case where a displayed keyword has not been selected, does not display the result of a search based on that keyword, and (ii) in the case where a displayed keyword has been selected, does display the result of a search based on that keyword.

With the above arrangement, the user can, in the case where the user has determined that the search result does not need to be displayed, cause content reproduction to continue. Further, the above arrangement displays only a keyword, and does not prevent content viewing. The above arrangement thus allows the user to, in the case where the user wants to see the search result, see the search result without having to take the trouble of inputting characters as illustrated in (b) of FIG. 4.

The electronic learning device 1 may display a search result instead of a keyword. However, in the case where the search result is a long passage, such a search result will prevent content viewing and make it difficult for the user to determine whether the user remembers the result of the search based on the keyword. The electronic learning device 1 thus preferably displays a keyword and, in the case where that keyword has been selected, displays the corresponding search result.

The electronic learning device 1 is simply required to display a keyword in such a manner as to allow the user to recognize that keyword. The manner is thus not limited to that illustrated in the example of (b) of FIG. 5. The electronic learning device 1 may display a keyword in such a manner that, for instance, the keyword is superimposed on an image of content as in subtitles.

In the case where the electronic learning device 1 stores, in the historical data 32, a plurality of keywords in correspondence with a single reproduction time point or with reproduction time points close to each other, the electronic learning device 1 may display such a plurality of keywords simultaneously as in the example of FIG. 6 referred to in the embodiment above. FIG. 6 is a diagram illustrating an example of displaying a plurality of keywords simultaneously.

The example of FIG. 6 displays, in addition to the key K6 showing the keyword "コンプライアンス", the key K7 (object) showing the keyword "CSR". The user can select either of those keys (keywords). Selecting a keyword allows the user to see the result of a search based on that keyword.

The user may, after selecting a displayed keyword and seeing the result of a search based on that keyword, determine that the keyword does not need to be displayed when the same content is reproduced for the next time. The user can, as a result of repeated reproduction of the content, acquire firmly established knowledge. Thus, the user can preferably change, in correspondence with how well the user's knowledge is firmly established, keywords to be displayed.

The electronic learning device 1 may, for instance, (i) display a screen as illustrated in FIG. 7 referred to in the embodiment above and (ii) allow the user to select whether to delete a log from the historical data 32. FIG. 7 is a diagram illustrating an example display screen that allows the user to select whether to delete a log from the historical data 32.

The example of FIG. 7 displays (i) the key K5 showing the word "Close" as in the example of (c) of FIG. 5 and (ii) a key (deletion object) K8 showing the word "Delete". The user can select the key K8 to delete the data on the keyword "コンプライアンス" from the historical data 32. The electronic learning device 1 will, in consequence, not display the keyword "コンプライアンス" when the same content is reproduced for the next time.

The timing at which the key K8 for deleting historical data is displayed is not limited to the above example. The key K8 may be displayed at timing at which, for instance, the keyword is displayed. This arrangement allows the user to delete historical data on a keyword even without seeing the corresponding search result.

In the case where a displayed keyword has not been selected, that may indicate that the user has determined that the result of a search based on that keyword does not need to be displayed. The electronic learning device 1 may thus alternatively be arranged to delete historical data 32 on a keyword that has not been selected.

[Example Screen for Setting Setting Data 36]

Figure 29:
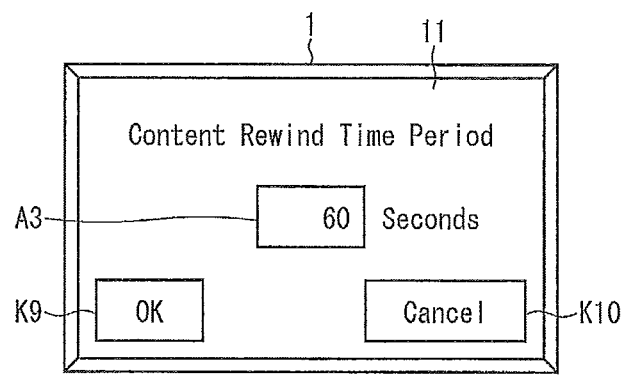
FIG. 29 is a diagram illustrating an example display screen displayed by the electronic learning device for letting the user input a content rewind time period.

With reference to FIG. 29, the description below deals with an example setting screen displayed when the electronic learning device 1 lets the user input a content rewind time period. FIG. 29 is a diagram illustrating an example setting screen displayed when the electronic learning device 1 lets the user input a content rewind time period. This example assumes that the electronic learning device 1, upon receipt of an instruction from the user to start a process of setting a content rewind time period, displays a screen of FIG. 29 for setting a content rewind time period.

The example illustrated in FIG. 29 displays, in the display section 11, (i) the character string "Content Rewind Time Period", (ii) a content rewind time period display region A3, and (iii) the keys K9 and K10. This example displays, in the content rewind time period display region A3, a numerical value that the user has inputted for the content rewind time period.

In the case where the user has selected "OK" on the key K9 while the content rewind time period display region A3 is displaying a numerical value for the content rewind time period, the electronic learning device 1 (i) sets the content rewind time period, included in the setting data 36 stored in the storage section 13, to the numerical value (in the example illustrated in FIG. 29, 60 seconds) displayed in the content rewind time period display region A3 and (ii) ends the process for setting the content rewind time period. In the case where the user has selected "Cancel" on the key K10 in the state illustrated in FIG. 29, the electronic learning device 1, without updating the setting data 36, ends the process for setting the content rewind time period.

Figure 30:
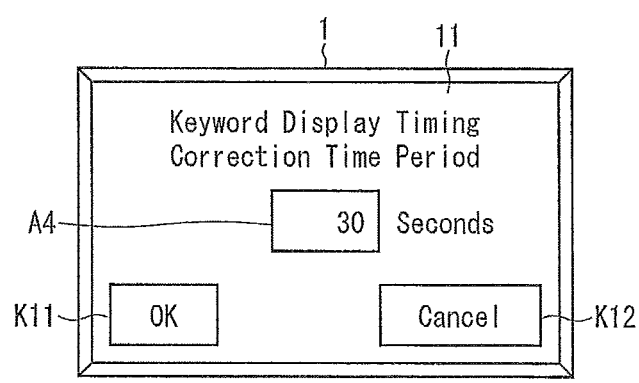
FIG. 30 is a diagram illustrating an example display screen displayed by the electronic learning device for letting the user input a display timing correction time period.

With reference to FIG. 30, the description below deals with an example setting screen displayed when the electronic learning device 1 lets the user input a display timing correction time period. FIG. 30 is a diagram illustrating an example setting screen displayed when the electronic learning device 1 lets the user input a display timing correction time period. This example assumes that the electronic learning device 1, upon receipt of an instruction from the user to start a process of setting a display timing correction time period, displays a screen of FIG. 30 for setting a display timing correction time period.

The example illustrated in FIG. 30 displays, in the display section 11, (i) the character string "Display Timing Correction Time Period", (ii) a display timing correction time period display region A4, and (iii) keys K11 and K12. This example displays, in the display timing correction time period display region A4, a numerical value that the user has inputted for the display timing correction time period.

In the case where the user has selected "OK" on the key K11 while the display timing correction time period display region A4 is displaying a numerical value for the display timing correction time period, the electronic learning device 1 (i) sets the display timing correction time period, included in the setting data 36 stored in the storage section 13, to the numerical value (in the example illustrated in FIG. 30, 30 seconds) displayed in the display timing correction time period display region A4 and (ii) ends the process for setting the display timing correction time period. In the case where the user has selected "Cancel" on the key K12 in the state illustrated in FIG. 30, the electronic learning device 1, without updating the setting data 36, ends the process for setting the display timing correction time period.

[Historical Data Generating Process]

Figure 31:
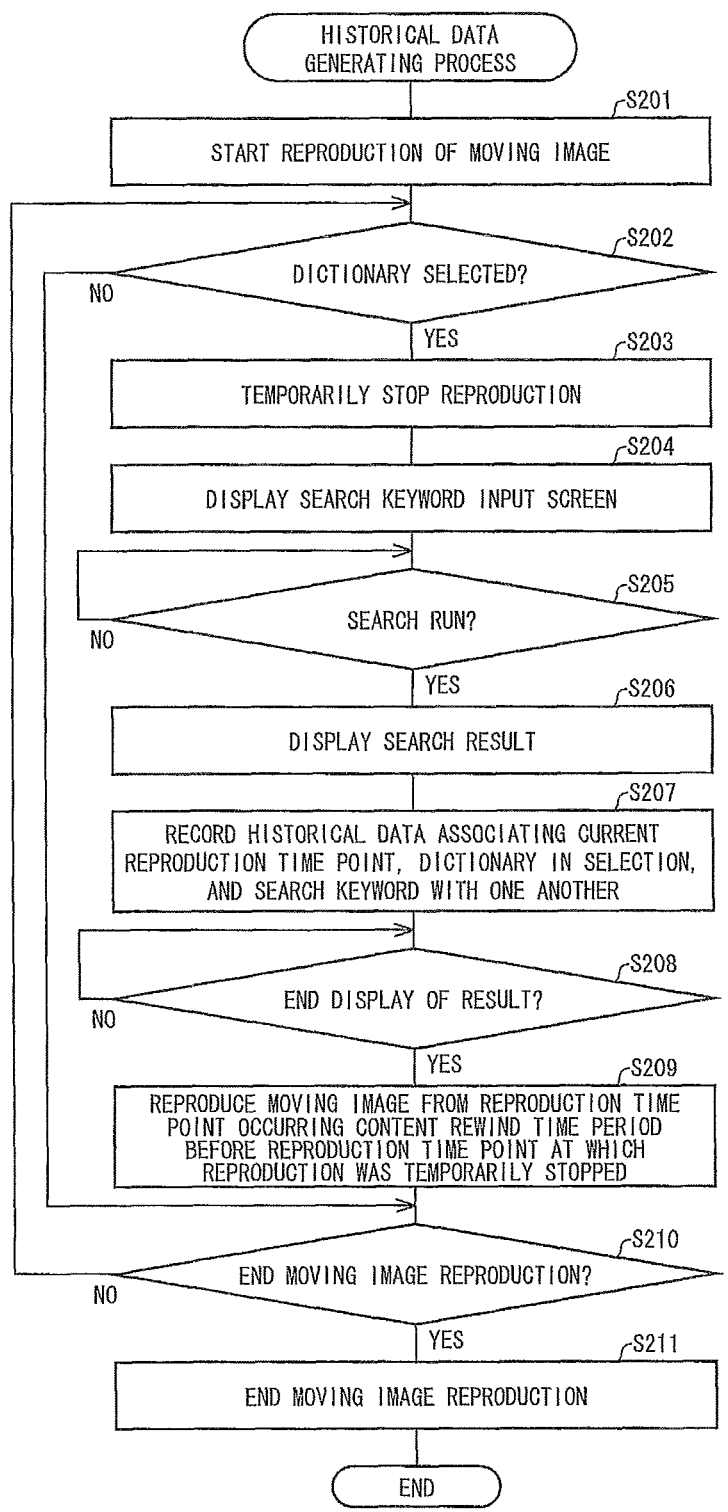
FIG. 31 is a flowchart illustrating an example of a historical data generating process carried out by the electronic learning device.

With reference to FIG. 31, the description below deals with a historical data generating process, through which the electronic learning device 1 generates historical data 32. FIG. 31 is a flowchart illustrating an example of the historical data generating process. The historical data generating process is a process that is carried out during reproduction of content. The historical data generating process shown in FIG. 31, as well as the example shown in FIG. 4, temporarily stops reproduction of content in the case where a keyword search is run during reproduction of the content.

The reproduction process section 20, upon recognition of a content reproduction instruction on the basis of an input operation performed with respect to the input section 10, (i) reads, from the moving image data 30 in the storage section 13, the content that the reproduction process section 20 has been instructed to reproduce and (ii) starts reproduction of the content (S201). This example assumes that the content to be reproduced is content of a moving image.

The search process section 21 is, at this stage, waiting for selection of a dictionary (S202). In the case where the search process section 21 has recognized that a dictionary has been selected (YES in S202), the search process section 21 causes the reproduction process section 20 to temporarily stop the content reproduction (S203). The process then proceeds to S204. In the case where the search process section 21 has not recognized that a dictionary has been selected (NO in S202), the process proceeds to S210.

The search process section 21, in S204, causes the display section 11 to display a keyword input screen (S204) and waits for a search to be run (S205). Characters to be inputted vary according to the dictionary (as for the case of an English-Japanese dictionary and the case of a Japanese-English dictionary, for example) to be used for the search. The above keyword input screen is thus preferably a keyword input screen that uniquely corresponds to the dictionary to be used.

The search process section 21, upon input of a keyword and an instruction to run a search, searches the dictionary, selected in S202, by the keyword, and causes the display section 11 to display the result of the search (S206). Further, the search process section 21 notifies the historical data generating section 22 of the keyword and dictionary used for the search.

The historical data generating section 22, upon notification of the keyword and dictionary, obtains from the reproduction process section 20 information on a current time point of reproduction of the content, that is, a reproduction time point at which the reproduction process section 20 temporarily stopped the content reproduction in S203. The historical data generating section 22 then generates historical data 32 including, in association with each other, (i) the obtained reproduction time point and (ii) the keyword and dictionary of which the historical data generating section 22 has been notified by the search process section 21, and stores the historical data 32 in the storage section 13 (S207).

The search process section 21, after displaying the search result in S206, determines whether the display of the search result is to be ended (S208). In the case where the search process section 21 has determined in S208 that the display of the search result is to be ended (YES in S208), the search process section 21 instructs the reproduction process section 20 to resume the reproduction of the content. The reproduction process section 20, in response to that instruction, starts reproduction of the content from a reproduction time point that occurs a content rewind time period before the time point of reproduction of the currently reproduced content at which time point the reproduction process section 20 temporarily stopped the content reproduction. This ends the display of the search result and causes the display section 11 to display an image of the content instead (S209).

The reproduction process section 20, after resuming the reproduction, determines whether the moving image reproduction is to be ended (S210). In the case where the reproduction process section 20 has determined that the moving image reproduction is not to be ended (NO in S210), the process returns to S202. In the case where the reproduction process section 20 has determined that the moving image reproduction is to be ended (YES in S210), the process proceeds to S211, whereby the reproduction process section 20 ends the reproduction of the moving image. This ends the historical data generating process.

The reproduction process section 20, in the case where (i) it has reproduced the currently reproduced content until the content reaches its end time point or (ii) the input section 10 has accepted an input operation to the effect that the reproduction is to be ended, determines that the moving image reproduction is to be ended.

[Keyword Display Process]

Figure 32:
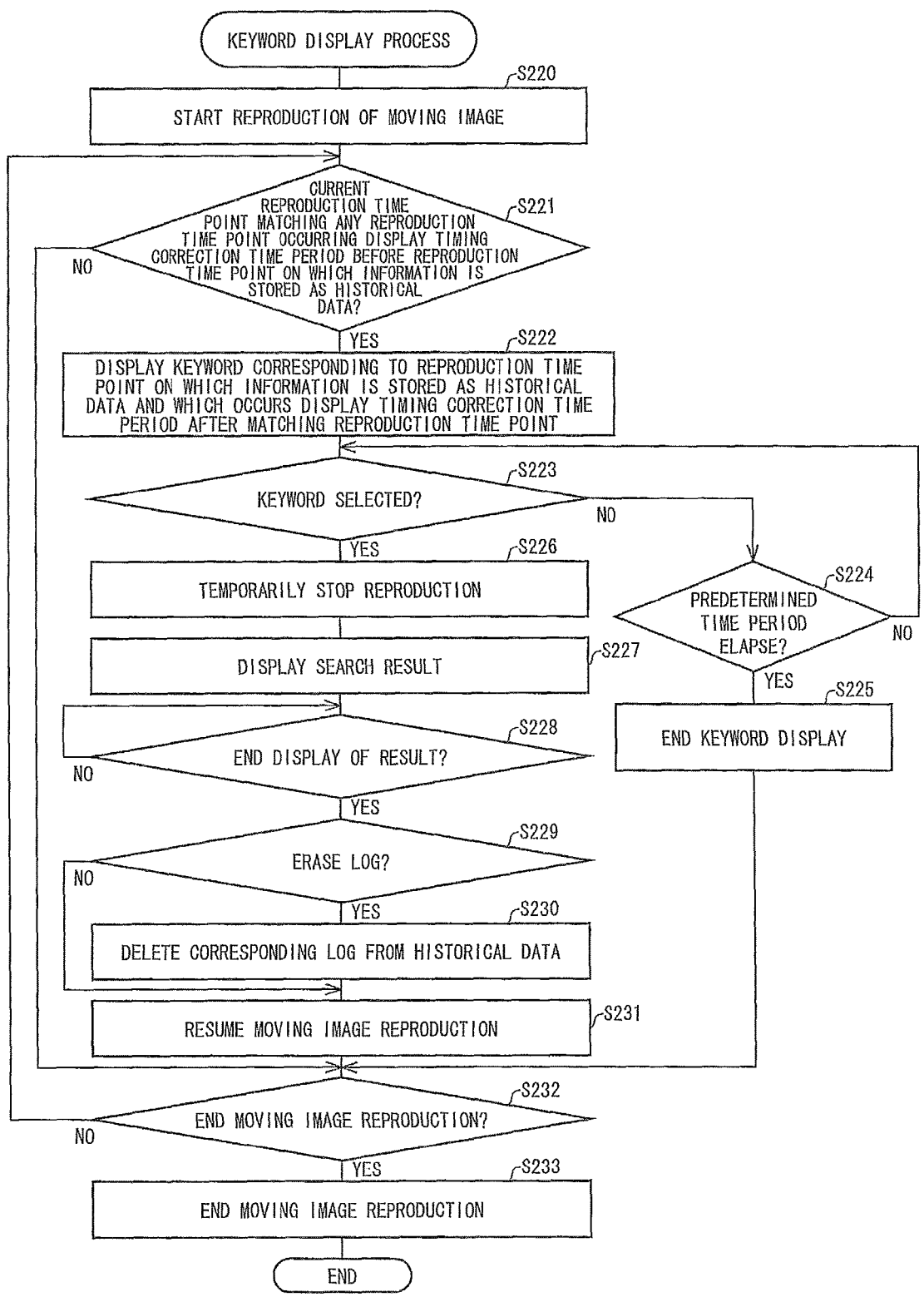
FIG. 32 is a flowchart illustrating an example of a keyword display process carried out by the electronic learning device.

With reference to FIG. 32, the description below deals with a keyword display process, through which the electronic learning device 1 displays a keyword. FIG. 32 is a flowchart illustrating an example of the keyword display process. The keyword display process is, as well as the historical data generating process, a process that is carried out during reproduction of content.

The reproduction process section 20, upon recognition of a content reproduction instruction on the basis of an input operation performed with respect to the input section 10, (i) reads, from the moving image data 30 in the storage section 13, the content that the reproduction process section 20 has been instructed to reproduce and (ii) starts reproduction of the content (S220).

The keyword display process section 23, after the start of the content reproduction, refers to the historical data 32 to determine whether the historical data 32 includes information on a reproduction time point that occurs a display timing correction time period before a reproduction time point that matches the current time point of reproduction of the content (S221).

In the case where the keyword display process section 23 has determined that the historical data 32 includes no information on a reproduction time point that occurs the display timing correction time period before the reproduction time point that matches the current time point of reproduction of the content (NO in S221), the process proceeds to S232. In the case where the keyword display process section 23 has determined that the historical data 32 includes information on a reproduction time point that occurs the display timing correction time period before the reproduction time point that matches the current time point of reproduction of the content (YES in S221), the keyword display process section 23 specifies a keyword in the historical data 32 which keyword is associated with the reproduction time point that matches the reproduction time point that occurs the display timing correction time period after the current time point of reproduction of the moving image data. The keyword display process section 23 then causes the display section 11 to display the keyword thus specified (S222). The keyword display process section 23 then determines whether the displayed keyword has been selected (S223).

In the case where the keyword display process section 23 has determined that the displayed keyword has not been selected (NO in S223), the keyword display process section 23 determines whether a predetermined time period has elapsed after the display of the keyword (S224).

In the case where the keyword display process section 23 has determined that the predetermined time period has elapsed (YES in S224), the keyword display process section 23 ends the display of the keyword (S225). The process then proceeds to S232. In the case where the keyword display process section 23 has determined that the predetermined time period has not elapsed (NO in S224), the process returns to S223.

In the case where the keyword display process section 23 has determined in S223 that the displayed keyword has been selected (YES in S223), the keyword display process section 23 instructs the reproduction process section 20 to temporarily stop the reproduction (S226). Further, the keyword display process section 23 notifies the search process section 21 of information on (i) the selected keyword and (ii) the dictionary searched by that keyword. The search process section 21, upon receipt of that notification, searches the dictionary by the keyword, both of which the search process section 21 has been notified of, and causes the display section 11 to display the result of that search (S227).

The search process section 21, after displaying the search result, determines whether the display of the search result is to be ended (S228). In the case where the search process section 21 has determined that the display of the search result is to be ended (YES in S228), the search process section 21 determines whether a log in the historical data 32 is to be erased which log corresponds to the keyword for which the search result has been displayed (S229).

For instance, in the case where the search result has been displayed in S227 with use of a screen as illustrated in FIG. 7, the search process section 21 determines, in the case where the key K8 has been selected, that (i) the display of the search result is to be ended (YES in S228) and that (ii) the log is to be erased (YES in S229). On the other hand, the search process section 21 determines, in the case where the key K5 has been selected in the screen example of FIG. 7, that (i) the display of the search result is to be ended (YES in S228) and that (ii) the log is not to be erased (NO in S229).

In the case where the search process section 21 has determined in S229 that the log is to be erased (YES in S229), the search process section 21 notifies the historical data generating section 22 to that effect. The historical data generating section 22, upon receipt of that notification, deletes the log from the historical data 32. For instance, in the case where the key K5 has been selected in the screen example of FIG. 7, the historical data generating section 22 deletes historical data corresponding to the keyword "コンプライアンス".

In S231, the search process section 21 instructs the reproduction process section 20 to resume reproduction of the content. This ends the display of the search result, and causes an image of the content to be displayed instead.

The reproduction process section 20, after resuming reproduction of the content, determines whether the moving image reproduction is to be ended (S232). In the case where the reproduction process section 20 has determined that the moving image reproduction is not to be ended (NO in S232), the process returns to S221. In the case where the reproduction process section 20 has determined that the content reproduction is to be ended (YES in S232), the process proceeds to S233, whereby the reproduction process section 20 ends the reproduction of the content. This ends the keyword display process.

[Variation of Storage Location for Dictionary Data]

The arrangement described above is an example in which dictionary data 31 is stored in the storage section 13 included in the electronic learning device 1. The dictionary data 31 may, however, be stored in another device as long as the electronic learning device 1 is arranged to be capable of presenting the user with the result of a search of the dictionary data 31. The present embodiment may further alternately be arranged such that (i) the search of the dictionary data 31 also is carried out by a device other than the electronic learning device 1 and that (ii) the electronic learning device 1 obtains the result of that search.

Figure 33:
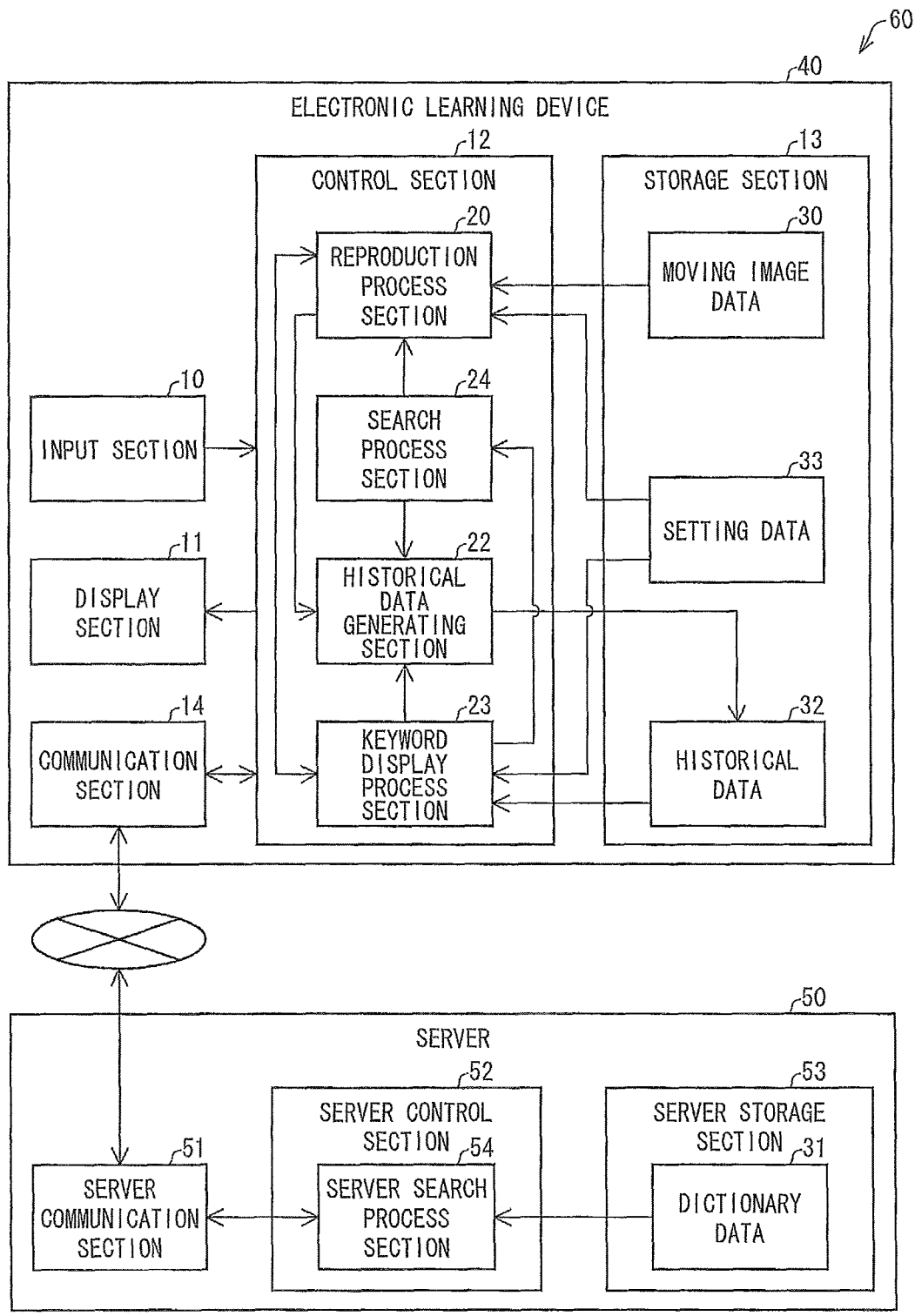
FIG. 33 is a block diagram illustrating respective main configurations of an electronic learning device and a server both included in an electronic learning system of still another embodiment of the present invention.

With reference to FIG. 33, the description below deals with an example electronic learning system that causes another device to run a keyword search. FIG. 33 is a block diagram illustrating respective main configurations of an electronic learning device (content reproduction device) 40 and a server 50 both included in the electronic learning system 60. Members of the electronic learning system 60 that are similar to the respective corresponding members of the electronic learning device 1 illustrated in FIG. 26 are each assigned a common reference numeral, and are not described here.

The electronic learning device 40 differs from the electronic learning device 1 of FIG. 26 in that (i) it further includes a communication section 14, (ii) the search process section 21 is replaced by a search process section (search section, search result display section) 24, and (iii) the dictionary data 31 is not stored in the storage section 13.

The communication section 14 is a section through which the electronic learning device 40 communicates with another device. This example assumes that the electronic learning device 40 connects to a communication network through the communication section 14, and communicates with the server 50 over that communication network.

The search process section 24 causes an external device (in this example, the server 50) to run a search by a keyword, and displays the result of that search. Specifically, the search process section 24 causes the display section 11 to display a keyword input screen for input of a keyword. The search process section 24 next transmits, to the external device through the communication section 14, (i) a keyword the input of which has been accepted by the input section 10 while the keyword input screen was being displayed, (ii) information for specifying a database to be searched by that keyword, and (iii) an instruction to run a search by the keyword. The search process section 24 then receives the result of that search from the external device, and causes the display section 11 to display the search result.

The server 50 is a device that (i) runs a keyword search in response to an instruction by the electronic learning device 40 and that (ii) transmits the result of the keyword search to the electronic learning device 40. The server 50, as illustrated in FIG. 33, includes: a server communication section 51; a server control section 52; and a server storage section 53.

The server communication section 51 is a section through which the server 50 communicates with another device. This example assumes that the server communication section 51 communicates with the electronic learning device 40 over a communication network.

The server control section 52 centrally controls the operation of the server 50. The server control section 52 includes a server search process section 54. The server search process section 54 runs a keyword search in response an instruction by the electronic learning device 40.

The server storage section 53 stores various data for use by the server 50. The server storage section 53 stores dictionary data 31.

The electronic learning system 60 is arranged such that in the case where the user of the electronic learning device 40 has, during reproduction of content, performed an input operation for running a keyword search, the search process section 24 causes the display section 11 to display a keyword input screen for input of a keyword.

In the case where the user has inputted a keyword and performed an input operation for running a search, the search process section 24 transmits, to the server 50 through the communication section 14, (i) the keyword inputted, (ii) information for specifying a dictionary to be searched by that keyword, and (iii) an instruction to run a search by the keyword.

Upon receipt of the keyword, the specifying information, and the instruction by the server 50, the server search process section 54 (i) specifies the dictionary, specified by the information received, in the dictionary data 31 and (ii) searches the thus specified dictionary by the keyword received from the electronic learning device 40. The server search process section 54 then transmits the result of that search to the electronic learning device 40 through the server communication section 51.

Upon receipt of the search result by the electronic learning device 40, the search process section 24 causes the display section 11 to display the received search result, which allows the user to recognize the search result.

[Variation of Arrangement for Display of Search Result]

The above example is arranged such that in the case where a displayed keyword has been selected during reproduction of content, the search by the selected keyword is run again for display of the search result. The present embodiment, however, simply needs to be arranged such that the electronic learning device 1 or 40 is capable of displaying, in the case where a displayed keyword has been selected during reproduction of content, the result of a search based on that selected keyword, and is not limited by the above example.

The present embodiment may be arranged such that, for instance, the historical data 32 includes the search result. This arrangement makes it possible to (i) obtain a search result from the historical data 32 in the case where a keyword has been selected, and (ii) display the search result without running a search again. The present embodiment may further be arranged such that, for instance, (i) the search result is stored separately from the historical data 32 and (ii) the historical data 32 includes information (for example, the address or the like of the storage location for the search result) for access to the search result.

In the case where a search is run of an external database in particular, as in the example of FIG. 33, it can take a long time to run such a search again. The search result is thus preferably stored inside the electronic learning device 40.

[Database as Search Target]

The above example is arranged to search, by a keyword, any of the three databases of a Japanese-language dictionary, an English-Japanese dictionary, and a Japanese-English dictionary. The databases for use in a search are, however, not limited to those example databases. The present embodiment may use, for example, (i) a database such as a reference book (for example, an encyclopedia) and a character dictionary or (ii) a database such as a dictionary of a foreign language other than English. The present embodiment may further alternatively, for instance, search a database provided on a network such as the Internet.

In the case where a search is run of a database on a network, the user may, in order to obtain a desired search result, (i) add another keyword for that search or (ii) apply a search condition for that search.

To run such a search, the present embodiment simply needs to be arranged such that the historical data 32 includes information (for example, an address or the like) for access to the final search result. The present embodiment may alternatively be arranged such that the historical data 32 includes the search condition, in which case a search is run again with use of the search condition included in the historical data 32.

The search of a database is not limited to a keyword search, and may use any search technique. Even in a case involving such any search technique, the historical data 32 can simply include information for access to the search result in accordance with the search technique involved.

[Variation of Arrangement for Display of Keyword]

The above example is arranged such that the keyword display process section 23 specifies timing for display of a keyword on the basis of (i) a reproduction time point indicated in the historical data 32 at which time point a keyword search was run and (ii) a display timing correction time period indicated in the setting data 36. The method for specifying timing for display of a keyword is, however, not limited to that.

The electronic learning device 40 may store, for example, information on a "keyword display time point" instead of a reproduction time point as historical data 32. Specifically, the historical data generating section 22 may (i) when generating historical data 32, calculate a reproduction time point that occurs a display timing correction time period before the time point of reproduction of content at which time point a keyword search was run and (ii) include the calculated reproduction time point as a "keyword display time point" in the historical data 32.

In the case where the historical data generating section 22 has generated historical data 32 including information on a keyword display time point, the keyword display process section 23, when reproducing content, refers to the above historical data 32 to determine whether the historical data 32 includes information on a keyword display time point that matches the current time point of reproduction of the content. The keyword display process section 23 then (i) specifies a keyword in the historical data 32 which keyword is associated with the keyword display time point that matches the current time point of reproduction of the content and (ii) causes the display section 11 to display the keyword thus specified.

The historical data generating section 22 may alternatively generate historical data 32 that includes information on both (i) a time point of reproduction of content at which time point a keyword search was run and (ii) a keyword display time point.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

[Example Configuration Based on Software]

Finally, the blocks (particularly the control section 12) of the electronic learning devices 1 and 40 described in the above embodiments may be implemented by means of (i) hardware with use of a logic circuit formed on an integrated circuit (IC chip) or (ii) software with use of a CPU (central processing unit).

In the latter case, the electronic learning devices 1 and 40 each include a CPU and memory devices (memory media). The CPU (central processing unit) executes instructions in programs realizing the functions. The memory devices include a ROM (read only memory) which contains programs, a RAM (random access memory) to which the programs are loaded, and a memory containing the programs and various data. The object of the present invention can also be achieved by mounting, to each of the electronic learning devices 1 and 40, a computer-readable storage medium containing control program code (executable program, intermediate code program, or source program) for the electronic learning devices 1 and 40, which is software realizing the aforementioned functions, in order for the computer (or CPU, MPU) to retrieve and execute the program code contained in the storage medium.

The storage medium may be, for example, (i) a tape such as a magnetic tape and a cassette tape, (ii) a disk such as a magnetic disk (e.g., a floppy [registered trademark] disk or a hard disk) and an optical disk (e.g., a CD-ROM, an MO, an MD, a DVD, or a CD-R), (iii) a card such as an IC card (memory card) and an optical card, (iv) a semiconductor memory such as a mask ROM, an EPROM, an EEPROM, and a flash ROM, or (v) a logic circuit such as a PLD (programmable logic device) and a FPGA (field programmable gate array).

The electronic learning devices 1 and 40 may each be so configured as to be communicable to a communication network so that the above program code can be supplied over that communication network. Such a communication network simply needs to be capable of transmitting a program code, and is not particularly limited. The communication network can be, for example, the Internet, an intranet, an extranet, a LAN, an ISDN, a VAN, a CATV a communications network, a virtual dedicated network (virtual private network), a telephone line network, a mobile communications network, or a satellite communications network. The transmission medium that forms the above communication network also simply needs to be capable of transmitting a program code, and is not particularly limited in configuration or type. The transmission medium may be, for example, (i) a wired transfer medium such as IEEE 1394, a USB, an electric power line, a cable TV line, a telephone line, and an ADSL (asymmetric digital subscriber line) line, or (ii) a wireless transfer medium such as infrared radiation (IrDA, remote control), Bluetooth (registered trademark), 802.11 wireless, HDR (high data rate), NFC (near field communication), DLNA (digital living network alliance), a mobile telephone network, a satellite line, and a terrestrial digital network.

[Main Points of Invention]

As described above, a content reproduction device of the present invention includes: search means for (i) searching a database by a keyword inputted while the content reproduction device is reproducing content and (ii) displaying a result of the search; and historical data generating means for generating historical data including, in association with each other, (i) position information indicative of a position of the reproduction of the content at which position the search means searched the database and (ii) access information for access to the search result.

As described above, a method of the present invention for controlling a content reproduction device includes: a searching step for (i) searching a database by a keyword inputted while the content reproduction device is reproducing content and (ii) displaying a result of the search; and a historical data generating step for generating historical data including, in association with each other, (i) position information indicative of a position of the reproduction of the content at which position the searching step searched the database and (ii) access information for access to the search result.

The above arrangement thus facilitates a keyword search during content reproduction, and allows the user to, when the content is reproduced for the second or subsequent time, easily access the result of the search based on that keyword.

The content reproduction device may preferably be arranged such that the historical data generating means generates the historical data so that the historical data further includes the keyword that the search means used in the search, the content reproduction device further including: keyword display process means for, in a case where, while the content reproduction device is reproducing the content, a current position of the reproduction of the content matches the reproduction position indicated by the position information included in the historical data generated by the historical data generating means, displaying the keyword, associated with the position information in the historical data, so as to allow a user of the content reproduction device to select the keyword; and search result display means for, in a case where the keyword displayed by the keyword display process means has been selected, displaying the search result obtained with use of the access information associated with the selected keyword in the historical data.

The above arrangement, in the case where the historical data includes position information indicative of a reproduction position that matches the current content reproduction position, displays a keyword associated with that position information. The above arrangement thus allows the user to recognize that the user has run a search based on that keyword before.

The above arrangement, in the case where a displayed keyword has been selected, displays a search result obtained with use of access information associated with that keyword. In other words, the user can, in the case where the user wants to see again the result of the search based on the displayed keyword, cause the search result to be presented through an extremely simple operation of selecting that displayed keyword. Further, the user can, in the case where the user has determined that it is unnecessary to see again the result of the search based on the displayed keyword, continue, for example, viewing the content.

The method for obtaining a search result depends on what information the access information is. In the case where, for instance, the access information is information for specifying a database searched by a keyword, the content reproduction device can obtain a search result by searching the database by that keyword again. In the case where, for instance, the access information is information (for example, an address) indicative of a storage position for a search result, the content reproduction device can obtain a search result from the storage position specified by that information.

The function of the search result display means may be carried out by the search means. In other words, the search means may obtain a search result with use of access information.

The content reproduction device may preferably be arranged such that the historical data generating means generates the historical data so that the historical data includes, as the access information, the keyword that the search means used in the search.

In the case where the historical data generating means has, as in the above arrangement, generated historical data including a keyword used in a search, the content reproduction device can access the result of the search by searching the database by the keyword included in the historical data.

The content reproduction device may preferably further include: historical data deleting means for, in a case where (i) the keyword display process means has displayed the keyword or (ii) the search result display means has displayed the search result, displaying a deletion object, which is for deleting a portion of the historical data which portion corresponds to the keyword, so as to allow the user to select the deletion object.

The above arrangement displays a deletion object for deleting a portion of the historical data which portion corresponds to a keyword. The above arrangement thus allows the user to select the deletion object to delete such a portion of the historical data, which portion corresponds to a keyword, so that when the content is reproduced for the next or subsequent time, that keyword is not displayed. This arrangement is useful in the case where, for instance, the user has already remembered the result of the search based on that keyword.

Recent years have witnessed a drop in prices of memory devices such as a hard disk. This has made it easy to store a plurality of dictionaries in a terminal device. The user, in the case where the user has a plurality of dictionaries stored in a terminal device, needs to select, from among such a plurality of dictionaries, a dictionary to be used for a search. Such selection is an operation that is more troublesome and more complicated for the user in the case where the user has a larger number of dictionaries as a selection target.

Patent Literatures 1 and 2, neither of which assumes searching a dictionary during content reproduction, unfortunately fail to disclose an arrangement that allows the user to easily select a dictionary.

Such a problem arises in not only a terminal device used in a learning system, but also any content reproduction device for reproducing content such as a moving image, a still image, and a sound. This is because the need to search a database in relation to content during reproduction of that content exists not only for learning content.

The present invention has been accomplished in view of the above problem. It is an object of the present invention to provide, for example, a content reproduction device that allows the user to easily search a desired database.

In order to solve the above problem, a content reproduction device of the present invention is a content reproduction device for reproducing content, the content reproduction device including: object display means for, with reference to priority data setting priorities for a plurality of respective databases, displaying, during content reproduction, preferentially (i) an object corresponding to a database having a high priority over (ii) an object corresponding to a database having a low priority; and search means for, in a case where an object displayed by the object display means has been selected, searching a database corresponding to the selected object.

In order to solve the above problem, a method of the present invention for controlling a content reproduction device is a method for controlling a content reproduction device for reproducing content, the method including: an object display step for, with reference to priority data setting priorities for a plurality of respective databases, displaying, during content reproduction, preferentially (i) an object corresponding to a database having a high priority over (ii) an object corresponding to a database having a low priority; and a search step for, in a case where an object displayed in the object display step has been selected, searching a database corresponding to the selected object.

The above arrangement, with reference to priority data, displays preferentially (i) an object corresponding to a database having a high priority over (ii) an object corresponding to a database having a low priority. Further, the above arrangement, in the case where a displayed object has been selected, searches a database corresponding to the selected object.

The above arrangement thus allows the user to (i) easily select an object corresponding to a database having a high priority set in the priority data and (ii) causes the content reproduction device to search that database.

The above arrangement consequently allows the user to, by setting a high priority for a database that the user is likely to select, easily search a desired database.

Preferentially displaying an object refers to displaying an object in such a manner that the user is more likely to see or select that object than other objects In order to solve the above problem, a content reproduction device of the present invention is a content reproduction device for reproducing content, the content reproduction device including: attribute specifying means for specifying an attribute of content that the content reproduction device is reproducing; object display means for, with reference to correspondence information including, in association with each other, information on an attribute and information on a database, displaying, during the content reproduction, preferentially (i) an object corresponding to a database associated with the attribute specified by the attribute specifying means over (ii) an object corresponding to a database unassociated with the specified attribute; and search means for, in a case where an object displayed by the object display means has been selected, searching a database corresponding to the selected object.

In order to solve the above problem, a method of the present invention for controlling a content reproduction device is a method for controlling a content reproduction device for reproducing content, the method including: an attribute specifying step for specifying an attribute of content that the content reproduction device is reproducing; an object display step for, with reference to correspondence information including, in association with each other, information on an attribute and information on a database, displaying, during the content reproduction, preferentially (i) an object corresponding to a database associated with the attribute specified in the attribute specifying step over (ii) an object corresponding to a database unassociated with the specified attribute; and a search step for, in a case where an object displayed in the object display step has been selected, searching a database corresponding to the selected object.

The above arrangement preferentially displays an object corresponding to a database associated with an attribute of content that the content reproduction device is reproducing. The above arrangement thus allows the user to (i) easily select an object corresponding to a database associated with an attribute of content being reproduced and (ii) search that database.

The above arrangement consequently allows the user to easily search a desired database by use of correspondence information that associates (i) a database which corresponds to an attribute of the content and which the user is likely to select with (ii) the attribute of the content.

The content reproduction device may preferably further include: priority data generating means for, with reference to use history data including, in association with each other, (i) information on the plurality of databases and (ii) frequency information indicative of a frequency of searches run with use of each of the plurality of databases, generating the priority data so that the priority data sets a higher priority for a database having a higher frequency of searches.

The above arrangement, with reference to use history data including, in association with each other, (i) information on a database and (ii) frequency information indicative of the frequency of searches run with use of that database, generates the priority data so that the priority data sets a high priority for a database having a higher frequency of searches.

A database having a high frequency of searches can be regarded as a database that the user is likely to select. The above arrangement consequently allows the user to easily search a desired database.

The content reproduction device may preferably further include: use history data generating means for generating the use history data by counting, for each of the plurality of databases, the number of searches run by the search means.

The above arrangement generates the use history data by counting, for each database, the number of searches run. In other words, the above arrangement uses the counted number of searches as the frequency information. The above arrangement thus displays an object on the basis of use history data that reflects the number of searches run at the content reproduction device.

Since a database of which the count of use is high is likely to be selected by the user, the above arrangement allows the user to easily search a desired database.

The content reproduction device may preferably be arranged such that the use history data generating means transmits the use history data, generated by the use history data generating means, to a compilation device for compiling use history data; and the priority data generating means (i) obtains, from the compilation device, integrated use history data generated by the compilation device calculating, for each of the plurality of databases, a sum of search counts included in each of the use history data received from the use history data generating means and use history data received from a device other than the content reproduction device and (ii) generates the priority data with reference to the integrated use history data.

The above arrangement displays an object on the basis of priority data generated with reference to integrated use history data generated by compiling (i) use history data received from the content reproduction device and (ii) use history data received from another device. The integrated use history data reflects the number of searches run at the content reproduction device. The above arrangement thus allows the user to easily select a database that the user frequently uses.

The integrated use history data further reflects the number searches run at another device. The above arrangement thus also preferentially displays an object corresponding to a database that a user of another device frequently uses. The above arrangement consequently allows the user of the content reproduction device to (i) recognize what database a user of another device uses and (ii) easily select a database having a high frequency of use by another user.

The content reproduction device may preferably further include: attribute specifying means for specifying an attribute of the content that the content reproduction device is reproducing, wherein: the object display means, with reference to correspondence information including, in association with each other, information on attributes and information on the plurality of databases, displays preferentially (i) an object corresponding to a database associated with the attribute specified by the attribute specifying means over (ii) an object corresponding to a database unassociated with specified attribute.

The above arrangement preferentially displays an object corresponding to a database associated with an attribute of content that the content reproduction device is reproducing. The above arrangement thus allows the user to (i) easily select an object corresponding to a database that corresponds to an attribute of content being reproduced and (ii) search that database.

The above arrangement, in other words, allows the user to easily search a desired database by use of correspondence information that associates (i) a database which corresponds to an attribute of the content and which the user is likely to select with (ii) the attribute of the content.

The content reproduction device may preferably further include: historical data generating means for generating historical data including, in association with each other, (i) position information indicative of a position of the reproduction of the content at which position the search means searched the database and (ii) access information for access to a result of the search run by the search means, wherein: the use history data generating means, with reference to the historical data generated by the historical data generating means, generates the use history data by counting, for each of the plurality of databases, the number of searches run by the search means.

The above arrangement generates historical data including, in association with each other, (i) position information indicative of a content reproduction position at which a search was run, (ii) the keyword used in that search, and (iii) access information for access to the result of the search.

With the use of the historical data, when the content is reproduced, the user can, at a reproduction position at which a past search was run, access the result of that search. The above arrangement thus allows the user to, when the content is reproduced for the second or subsequent time, easily access the result of a past search.

The historical data includes position information and access information, and thus makes it possible to specify (i) the number of searches and (ii) a database used for each search. The above arrangement thus generates use history data with use of the historical data.

The above arrangement can consequently generate use history data without separately including a member for obtaining a database used for each search and the number of searches.

The content reproduction device may preferably be arranged such that the search means searches, by the keyword inputted to the content reproduction device, the database corresponding to the selected object; and the historical data generating means generates the historical data so that the historical data further includes the keyword that the search means used in the search; the content reproduction device further including: keyword display process means for, in a case where, while the content reproduction device is reproducing the content, a current position of the reproduction of the content matches the reproduction position indicated by the position information included in the historical data generated by the historical data generating means, displaying the keyword, associated with the position information in the historical data, so as to allow a user of the content reproduction device to select the keyword; and search result display means for, in a case where the keyword displayed by the keyword display process means has been selected, displaying the search result obtained with use of the access information associated with the selected keyword in the historical data.

The above arrangement, in the case where the historical data includes position information indicative of a reproduction position that matches the current content reproduction position, displays a keyword associated with that position information. The above arrangement thus allows the user to recognize that the user has run a search based on that keyword before.

The above arrangement, in the case where a displayed keyword has been selected, displays a search result obtained with use of access information associated with that keyword. In other words, the user can, in the case where the user wants to see again the result of the search based on the displayed keyword, cause the search result to be presented through an extremely simple operation of selecting that displayed keyword. Further, the user may, in the case where the user has determined that it is unnecessary to see again the result of the search based on the displayed keyword, continue, for example, viewing the content.

The method for obtaining a search result depends on what information the access information is. In the case where, for instance, the access information is information for specifying a database searched by a keyword, the content reproduction device can obtain a search result by searching the database by that keyword again. In the case where, for instance, the access information is information (for example, an address) indicative of a storage position for a search result, the content reproduction device can obtain a search result from the storage position specified by that information.

The function of the search result display means may be carried out by the search means. In other words, the search means may obtain a search result with use of access information.

The content reproduction device may preferably be arranged such that the historical data generating means generates the historical data so that the historical data includes, as the access information, the keyword that the search means used in the search.

In the case where the historical data generating means has, as in the above arrangement, generated historical data including a keyword used in a search, the content reproduction device can access the result of the search by searching the database by the keyword included in the historical data.

The content reproduction device may preferably further include: historical data deleting means for, in a case where (i) the keyword display process means has displayed the keyword or (ii) the search result display means has displayed the search result, displaying a deletion object, which is for deleting a portion of the historical data which portion corresponds to the keyword, so as to allow the user to select the deletion object.

The above arrangement displays a deletion object for deleting a portion of the historical data which portion corresponds to a keyword. The above arrangement thus allows the user to select the deletion object to delete such a portion of the historical data, which portion corresponds to a keyword, so that when the content is reproduced for the next or subsequent time, that keyword is not displayed. This arrangement is useful in the case where, for instance, the user has already remembered the result of the search based on that keyword.

Conventional learning systems involve a lag between (i) timing at which the user encounters a term for which the user wants to run a search and (ii) timing at which the user actually records comments. Such comments are thus associated with a reproduction time point that is different from the reproduction time point at which occurs the term for which the user has run a search. Specifically, the reproduction time point associated with the comments is later than the reproduction time point at which occurs the term for which the user has run a search.

Conventional learning systems thus pose the problem started from a reproduction time point associated with the comments, no reproduction is performed of the scene in which occurs the term for which the user has run a search. This problem forces the user to perform an operation of moving the content reproduction position back in order to check the scene in the content which scene necessitated a search. Such an operation hinders smooth learning.

Such a problem arises in not only a terminal device used in a learning system, but also any content reproduction device for reproducing content such as a moving image, a still image, and a sound. This is because the need to search a database in relation to content during reproduction of that content exists not only for learning content.

The present invention has been accomplished in view of the above problem. It is an object of the present invention to provide, for example, a content reproduction device that allows the user to, in the case where the user resumes content reproduction after running a search during the content reproduction, check, without having to perform an operation for moving a reproduction position, a scene in the content which scene necessitated a search.

In order to solve the above problem, a content reproduction device of the present invention is a content reproduction device for reproducing content, the content reproduction device including: an input section for accepting an input operation by a user; search means for, during content reproduction, (i) searching a database in accordance with the input operation performed with respect to the input section and (ii) displaying a result of the search; and content reproduction means for, when resuming the content reproduction, moving back, by an amount corresponding to a predetermined content rewind time period, a position of the content reproduction from a position of the content reproduction at which position the input section accepted the input operation for starting the search.

In order to solve the above problem, a method of the present invention for controlling a content reproduction device is a method for controlling a content reproduction device for reproducing content, the method including: an input step for accepting an input operation by a user; a search step for, while the content reproduction device is reproducing content, (i) searching a database in accordance with the input operation performed in the input step and (ii) displaying a result of the search; and a content reproduction step for, when resuming the content reproduction, moving back, by an amount corresponding to a predetermined content rewind time period, a position of the content reproduction from a position of the content reproduction at which position the input step accepted the input operation for starting the search.

The above arrangement (i) accepts, while the content reproduction device is reproducing content, an input operation for starting a search, (ii) searches a database, and (iii) displays the result of that search. The above arrangement thus allows the user to, during content reproduction, run a search and see the result of that search. In the case where, for instance, the user has, during content reproduction, encountered a point that the user does not know, the user can search a database for that point to check the meaning and/or the like of the point.

Further, the content reproduction device, when resuming reproduction of the content, moves back, by the amount corresponding to a predetermined content rewind time period, a position of the reproduction of the content from the content reproduction position at which the input section accepted an input operation for starting a search.

The above arrangement sets, as the content rewind time period, a time period equal to or longer than a time period extending from (i) a content reproduction position at which a search becomes needed (for example, a position of reproduction of the content at which position is used a point that the user does not know) to (ii) when the user performs an input operation for starting a search. This allows content reproduction to be resumed from a time point that occurs before the content reproduction position at which a search becomes needed.

The above arrangement thus allows the user to, after viewing a search result and checking the meaning and/or the like of a point, see again, without having to perform an operation for moving a content reproduction position, a scene that necessitated a search. In the case where, for instance, the user does not know the meaning of a term that has been used in the content, the user can, after searching a database for the meaning of that term, see, without having to perform an operation for moving a reproduction position, a scene in the content in which scene the term was used.

The above phrase "when resuming the content reproduction" may refer to timing at which the content is reproduced again after the user (i) temporarily stopped reproduction of the content when running a search during the content reproduction and (ii) ended viewing of the result of that search. The above phrase "when resuming the content reproduction" may alternatively refer to timing at which the user, in the case where a search is run during content reproduction while the content is reproduced, ends seeing the result of the search and returns to content viewing.

The content reproduction device may preferably be arranged such that the content reproduction means resumes the content reproduction when the search means has ended the display of the search result.

According to the above arrangement, the content reproduction means resumes the content reproduction when the search means has ended the display of the search result.

The above arrangement allows the user to, when the user has ended seeing a search result, return to content viewing without having to perform any operation. The display of a search result can be ended at timing that is not particularly limited. The timing is, for example, (i) when the user has performed an operation or (ii) when a predetermined time period (that is, a time period sufficient for the user to check the content of the search result) has elapsed after the start of the display of the search result.

The content reproduction device of the present invention may preferably further include: object display means for, in a case where the content reproduction device reproduces content for which the search means ran a search in past, displaying, when the current content reproduction position has reached a reproduction position that occurs a predetermined display timing correction time period before the content reproduction position at which the input section accepted, for the past search, the input operation for starting the search, an object for causing the search result to be displayed.

The user may, when reproducing again content for which the user ran a search in the past, have forgotten the result of that search. It will be convenient for the user to be able to easily see such a search result at the timing of the past search. There is, however, a lag as described above between (i) a content reproduction position at which a search became needed and (ii) a reproduction position at which a search was actually run.

Thus, in the case where the above object is displayed at a reproduction position at which a search was actually run, such a reproduction position may be too far from a content reproduction position at which a search became needed. This will decrease usability. In the case where, for instance, the user has looked up the meaning of a term used in the content, smooth content viewing will be prevented if the above object is displayed a while after the end of the scene in which that term was used.

In view of the above point, the above arrangement, in a case where the content reproduction device reproduces content for which the search means ran a search in the past, displays, when the current content reproduction position has reached a reproduction position that occurs a predetermined display timing correction time period before the content reproduction position at which the input section accepted, for the past search, the input operation for starting the search, an object for causing the search result to be displayed.

In the case where the timing of displaying an object is, as described above, shifted to timing that occurs before a content reproduction position at which an input operation for starting a search was accepted, the lag can be reduced between (i) a content reproduction position at which a search became needed and (ii) a reproduction position at which a search was actually run.

The above arrangement can thus display an object at a reproduction position that is closer to a content reproduction position at which a search became needed, and allows the user to see a search result at more desirable timing. Further, the user may, in the case where the user has determined that it is unnecessary to see the search result again, continue, for example, viewing the content without having to select an object.

The display timing correction time period is preferably set to a time period equal to or longer than a time period extending from (i) a content reproduction position at which a search becomes needed (for example, a position of reproduction of the content at which position, during the reproduction, occurs a point that the user does not know) to (ii) when the user performs an input operation for starting a search.

The above arrangement, in a case where the content reproduction device reproduces content for which the search means ran a search in the past, causes the above object to be displayed at a reproduction position at which a search became needed. This allows the user to see the search result at that reproduction position.

In the case where, for instance, the user, while viewing the scene in which a term is used for which a search was run in the past, wants to see the result of that search again, the search result can be presented to the user through an extremely simple operation of selecting a displayed object. Further, the user may, in the case where the user has determined that it is unnecessary to see the search result again, continue, for example, viewing the content.

The content reproduction device of the present invention may preferably further include: historical data generating means for generating the historical data so that the historical data includes, in association with each other, (i) position information indicative of a position of the reproduction of the content at which position the input section accepted the input operation for starting the search and (ii) the access information for the access to the result of the search by the search means, wherein: the object display means, with reference to the historical data generated by the historical data generating means, specifies timing of displaying the object, the content reproduction device further including: search result display means for, in a case where the object displayed by the object display means has been selected, displaying the search result obtained with use of the access information included in the historical data.

According to the above arrangement, the historical data generating means generates the historical data so that the historical data includes, in association with each other, (i) position information indicative of a position of the reproduction of the content at which position the input section accepted the input operation for starting the search and (ii) the access information for the access to the result of the search by the search means.

The object display means, with reference to the historical data, specifies timing of displaying the object. Since the historical data includes position information indicative of a content reproduction position at which the input section accepted an input operation for starting a search, the object display means can specify, as the timing of displaying the object, a reproduction position that occurs the display timing correction time period before the reproduction position indicated in the position information.

The search result display means, in the case where the object displayed by the object display means has been selected, displays the search result obtained with use of the access information included in the historical data. Since the object is displayed on the basis of the position information included in the historical data, the content reproduction device can specify, on the basis of the selected object, the position information used to display that object, and further specify access information associated with that position information. The content reproduction device can consequently, in the case where an object has been selected, (i) specify access information corresponding to that object, and (ii) with use of that access information, obtain and display the corresponding search result.

The method for obtaining a search result depends on what information the access information is. In the case where, for instance, the access information is information for specifying (i) a database searched and a search condition, the content reproduction device can obtain a search result by searching the database under that condition again. In the case where, for instance, the access information is information (for example, an address) indicative of a storage position for a search result, the content reproduction device can obtain a search result from the storage position specified by that information.

The content reproduction device of the present invention may preferably be arranged such that the search means searches the database by a keyword of which the input section has accepted input; the historical data generating means generates the historical data so that the historical data includes the keyword of which the input section has accepted the input; and the object display means displays the object including the keyword included in the historical data generated by the historical data generating means.

According to the above arrangement, (i) the search means searches the database by a keyword that has been inputted to the input section, (ii) the historical data generating means generates the historical data so that the historical data includes the above keyword, and (iii) the object display means displays the object including the above keyword.

In other words, the above arrangement, in the case where the content reproduction device reproduces content for which the search means ran a search in the past, displays an object including a keyword inputted to the input section. The above arrangement thus allows the user to recognize that the user ran a search by the displayed keyword in the past. The user can, in the case where the user has forgotten the result of that search, select an object including the keyword to see the search result again.

The content reproduction device of the present invention may preferably further include: historical data deleting means for, in a case where (i) the object display means has displayed the object or (ii) the search result display means has displayed the search result, displaying a deletion object for deleting a portion of the historical data which portion corresponds to the object or to the search result.

The above arrangement displays a deletion object for deleting a portion of the historical data which portion corresponds to the object or the search result. The above arrangement thus allows the user to select the deletion object to delete such a portion of the historical data, the portion corresponding to the object or the search result, so that in the case where the content is reproduced for the next or subsequent time, the object or the search result will not be displayed. This arrangement is useful in the case where, for instance, the user has already remembered the search result (which is displayed in the case where the object has been selected).

In order to solve the above problem, a content reproduction device of the present invention is a content reproduction device for reproducing content, the content reproduction device including: an input section for accepting an input operation by a user; search means for, during content reproduction, (i) searching a database in accordance with the input operation performed with respect to the input section and (ii) displaying a result of the search; and object display means for, in a case where the content reproduction device reproduces content for which the search means ran a search in past, displaying, when a current position of the content reproduction has reached a reproduction position that occurs a predetermined display timing correction time period before a content reproduction position at which the input section accepted, for the past search, the input operation for starting the search, an object for causing the search result to be displayed.

The above arrangement, in the case where the content reproduction device reproduces content for which the search means ran a search in the past, displays, when the current reproduction position has reached a reproduction position that occurs a predetermined display timing correction time period before the content reproduction position at which the input section accepted, for the past search, an input operation for starting a search, an object for displaying the result of that search.

The above arrangement can thus display an object at a reproduction position that is closer to a content reproduction position at which a search became needed, and allows the user to see a search result at more desirable timing.

The content reproduction device may be in the form of a computer. In this case, the present invention includes in its scope (i) a control program for causing a computer to operate as each of the means of the content reproduction device to cause the computer to function as the content reproduction device and (ii) a computer-readable recording medium in which the control program is stored.

INDUSTRIAL APPLICABILITY

The present invention presents, during content reproduction, the user with a keyword by which a past search was run, and facilitates running a search by that keyword again. The present invention also facilitates selecting, during content reproduction, a database to be used for a search. The present invention, in the case where content reproduction is resumed after the user runs a search during reproduction of the content, allows the user to see, without having to perform an operation for moving a reproduction position, the scene in the content which scene necessitated the search.

The present invention is therefore applicable to not only a device for reproducing learning content, but also a device for reproducing various other content.

REFERENCE SIGNS LIST

Embodiment 1

1, 40 electronic learning device (content reproduction device)
21, 24 search process section (search section, search result display section)
22 historical data generating section (historical data deleting section)
23 keyword display process section
30 moving image data (content)
31 dictionary data (database)
32 historical data
K8 key (deletion object)

Embodiment 2

1, 40 electronic learning device (content reproduction device)
21 search process section (search section, search result display section)
22 historical data generating section (historical data deleting section)
23 keyword display process section
27, 28 dictionary display sequence deciding section (priority data generating section, use history data generating section)
25 content type determining section (attribute specifying section)
26 dictionary key display process section (object display section)
30 moving image data (content)
31 dictionary data (database)
32 historical data
33 use history compilation data (use history data)
34 dictionary display sequence data (priority data)
35 type-dictionary correspondence data (correspondence information)
K1 to K4 dictionary key (object)
K10 key (deletion object)
50 server (compilation device)

Embodiment 3

1, 40 electronic learning device (content reproduction device)
10 input section
20 reproduction process section (content reproduction section)
21, 24 search process section (search section, search result display section)
22 historical data generating section (historical data deleting section)
23 keyword display process section (object display section)
30 moving image data (content)
31 dictionary data (database)
32 historical data
K6 key (object)
K7 key (object)
K8 key (deletion object)

The invention claimed is:
1. A content reproduction device for reproducing content, the content reproduction device comprising:
one or more processing devices and one or more memory devices storing instructions to:
(i) search a database by a keyword inputted while the content reproduction device is reproducing content and (ii) display a result of the search;
generate historical data including, in association with each other, (i) position information indicative of a position of the reproduction of the content at which position the search step searched the database and (ii) access information for access to the search result; and
in a case where the content reproduction device reproduces the content for a second or subsequent time, at the reproduction position indicated by the position information included in the historical data, display an object to be selected by a user for access again to the search result indicated by the access information associated with position information.

2. The content reproduction device according to claim 1, wherein the historical data further includes the keyword used in the search and wherein the one or more memory devices stores instructions that further cause the one or more processing devices to:
in a case where, while the content reproduction device is reproducing the content, a current position of the reproduction of the content matches the reproduction position indicated by the position information included in the historical data generated by the historical data generating step, display the keyword, associated with the position information in the historical data, so as to allow a user of the content reproduction device to select the keyword; and
in a case where the displayed keyword has been selected, display the search result obtained with use of the access information associated with the selected keyword in the historical data.

3. The content reproduction device according to claim 2, wherein the one or more memory devices stores instructions that further cause the one or more processing devices to:
in a case where (i) the keyword has been displayed or (ii) the search result has been displayed, display a deletion object, which is for deleting a portion of the historical data which portion corresponds to the keyword, so as to allow the user to select the deletion object.

4. The content reproduction device according to claim 1, wherein the one or more memory devices stores instructions that further cause the one or more processing devices to:
generate the historical data so that the historical data includes, as the access information, the keyword used in the search.

5. The content reproduction device according to claim 1, wherein the one or more memory devices stores instructions that further cause the one or more processing devices to:
with reference to priority data setting priorities for a plurality of respective databases, display, during the content reproduction, preferentially (i) an object corresponding to a database having a high priority over (ii) an object corresponding to a database having a low priority,
wherein the one or more memory devices stores instructions that further cause the one or more processing devices to:
in a case where an object displayed has been selected, search a database corresponding to the selected object.

6. The content reproduction device according to claim 5, wherein the one or more memory devices stores instructions that further cause the one or more processing devices to:
with reference to use history data including, in association with each other, (i) information on the plurality of databases and (ii) frequency information indicative of a frequency of searches run with use of each of the plurality of databases, generate the priority data so that the priority data sets a higher priority for a database having a higher frequency of searches.

7. The content reproduction device according to claim 6, wherein the one or more memory devices stores instructions that further cause the one or more processing devices to:
generate the use history data by counting, for each of the plurality of databases, the number of searches run by the search step.

8. The content reproduction device according to claim 7, wherein the one or more memory devices stores instructions that further cause the one or more processing devices to:

transmit the use history data, generated by the use history data generating step, to a compilation device for compiling use history data; and (i) obtain, from the compilation device, integrated use history data generated by the compilation device calculating, for each of the plurality of databases, a sum of search counts included in each of the use history data received from the use history data generating step and use history data received from a device other than the content reproduction device and (ii) generate the priority data with reference to the integrated use history data.

9. The content reproduction device according to claim 7, wherein the one or more memory devices stores instructions that further cause the one or more processing devices to:

with reference to the historical data generated, generate the use history data by counting, for each of the plurality of databases, the number of searches run by the search step.

10. The content reproduction device according to claim 9, wherein the one or more memory devices stores instructions that further cause the one or more processing devices to:

search, by the keyword inputted to the content reproduction device, the database corresponding to the selected object; and generate the historical data so that the historical data further includes the keyword that the search step used in the search, the content reproduction device wherein the one or more memory devices stores instructions that further cause the one or more processing devices to:

in a case where, while the content reproduction device is reproducing the content, a current position of the reproduction of the content matches the reproduction position indicated by the position information included in the historical data generated by the historical data generating step, display the keyword, associated with the position information in the historical data, so as to allow a user of the content reproduction device to select the keyword; and in a case where the displayed keyword has been selected, display the search result obtained with use of the access information associated with the selected keyword in the historical data.

11. The content reproduction device according to claim 10, wherein the one or more memory devices stores instructions that further cause the one or more processing devices to:

generate the historical data so that the historical data includes, as the access information, the keyword that the search step used in the search.

12. The content reproduction device according to claim 10, wherein the one or more memory devices stores instructions that further cause the one or more processing devices to:

in a case where (i) the keyword has been displayed or (ii) the search step has displayed the search result, display a deletion object, which is for deleting a portion of the historical data which portion corresponds to the keyword, so as to allow the user to select the deletion object.

13. The content reproduction device according to claim 5, wherein the one or more memory devices stores instructions that further cause the one or more processing devices to:

specify an attribute of the content that the content reproduction device is reproducing, wherein the one or more memory devices stores instructions that further cause the one or more processing devices to:

with reference to correspondence information including, in association with each other, information on attributes and information on the plurality of databases, display preferentially (i) an object corresponding to a database associated with the attribute specified by the attribute specifying step over (ii) an object corresponding to a database unassociated with specified attribute.

14. The content reproduction device according to claim 1, wherein the one or more memory devices stores instructions that further cause the one or more processing devices to:

specify an attribute of the content that the content reproduction device is reproducing; and with reference to correspondence information including, in association with each other, information on an attribute and information on a database, display, during the content reproduction, preferentially (i) an object corresponding to a database associated with the attribute specified by the attribute specifying step over (ii) an object corresponding to a database unassociated with the specified attribute, wherein:

in a case where an object displayed by the object display step has been selected, search a database corresponding to the selected object.

15. The content reproduction device according to claim 1, wherein the one or more memory devices stores instructions that further cause the one or more processing devices to:

during the content reproduction, (i) search the database in accordance with an input operation performed with respect to an input step for accepting an input operation by a user and (ii) display the search result, the content reproduction device further comprising, wherein the one or more memory devices stores instructions that further cause the one or more processing devices to:

when resuming the content reproduction, move back, by an amount corresponding to a predetermined content rewind time period, a position of the reproduction of the content from a position of the reproduction of the content at which position the input step accepted the input operation for starting the search.

16. The content reproduction device according to claim 15, wherein the one or more memory devices stores instructions that further cause the one or more processing devices to:

resume the content reproduction when the search step has ended the display of the search result.

17. The content reproduction device according to claim 15, wherein the one or more memory devices stores instructions that further cause the one or more processing devices to:

in a case where the content reproduction device reproduces content for which the search step ran a search in past, display, when the current content reproduction position has reached a reproduction position that occurs a predetermined display timing correction time period before the content reproduction position at which the input step accepted, for the past search, the input operation for starting the search, an object for causing the search result to be displayed.

18. The content reproduction device according to claim 17,
wherein the one or more memory devices stores instructions that further cause the one or more processing devices to:
generate the historical data so that the historical data includes, in association with each other, (i) position information indicative of a position of the reproduction of the content at which position the input step accepted the input operation for starting the search and (ii) the access information for the access to the result of the search by the search step; and
with reference to the historical data generated by the historical data generating step, specify timing of displaying the object,
the content reproduction device further comprising, wherein the one or more memory devices stores instructions that further cause the one or more processing devices to:
in a case where the object displayed by the object display step has been selected, display the search result obtained with use of the access information included in the historical data.

19. The content reproduction device according to claim 18,
wherein the one or more memory devices stores instructions that further cause the one or more processing devices to:
search the database by a keyword of which the input step has accepted input;
generate the historical data so that the historical data includes the keyword of which the input step has accepted the input; and
display the object including the keyword included in the historical data generated by the historical data generating step.

20. The content reproduction device according to claim 18, wherein the one or more memory devices stores instructions that further cause the one or more processing devices to:
in a case where (i) the object display step has displayed the object or (ii) the search result display step has displayed the search result, display a deletion object for deleting a portion of the historical data which portion corresponds to the object or to the search result.

21. The content reproduction device according to claim 1, wherein the one or more memory devices stores instructions that further cause the one or more processing devices to:
during the content reproduction, (i) search the database in accordance with an input operation performed with respect to an input step for accepting an input operation by a user and (ii) display the search result,
the content reproduction device further comprising, wherein the one or more memory devices stores instructions that further cause the one or more processing devices to:
in a case where the content reproduction device reproduces content for which the search step ran a search in past, display, when a current position of the reproduction of the content has reached a reproduction position that occurs a predetermined display timing correction time period before the content reproduction position at which the input step accepted, for the past search, the input step for starting the search, an object for causing the search result to be displayed.

22. A method for controlling a content reproduction device for reproducing content,
the method comprising:
a searching step for (i) searching a database by a keyword inputted while the content reproduction device is reproducing content and (ii) displaying a result of the search;
a historical data generating step for generating historical data including, in association with each other, (i) position information indicative of a position of the reproduction of the content at which position the searching step searched the database and (ii) access information for access to the search result; and
an object display step for, in a case where the content reproduction device reproduces the content for a second or subsequent time, displaying, at the reproduction position indicated by the position information, an object to be selected by a user for access again to the search result indicated by the access information associated with the position information.

23. A non-transitory computer-readable recording medium storing a control program for operating a content reproduction device, the control program causing a computer to execute following steps:
a searching step for (i) searching a database by a keyword inputted while the content reproduction device is reproducing content and (ii) displaying a result of the search;
a historical data generating step for generating historical data including, in association with each other, (i) position information indicative of a position of the reproduction of the content at which position the searching step searched the database and (ii) access information for access to the search result; and
an object display step for, in a case where the content reproduction device reproduces the content for a second or subsequent time, displaying, at the reproduction position indicated by the position information, an object to be selected by a user for access again to the search result indicated by the access information associated with the position information.

* * * * *